(12) United States Patent
Min et al.

(10) Patent No.: US 12,340,236 B2
(45) Date of Patent: *Jun. 24, 2025

(54) ELECTRONIC DEVICE FOR PROVIDING EXECUTION SCREEN OF APPLICATION AND METHOD FOR OPERATING THE SAME

(71) Applicant: Samsung Electronics Co., Ltd., Suwon-si (KR)

(72) Inventors: Byungwoo Min, Suwon-si (KR); Nawoong Han, Suwon-si (KR); Seonghoon Choi, Suwon-si (KR); Sangheon Kim, Suwon-si (KR); Jinwan An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,523

(22) Filed: May 12, 2023

(65) Prior Publication Data

US 2023/0281027 A1 Sep. 7, 2023

Related U.S. Application Data

(63) Continuation of application No. 17/167,551, filed on Feb. 4, 2021, now Pat. No. 11,687,350.

(30) Foreign Application Priority Data

Feb. 10, 2020 (KR) ........................ 10-2020-0015942

(51) Int. Cl.
*G06F 9/451* (2018.01)
*G06F 1/16* (2006.01)
(Continued)

(52) U.S. Cl.
CPC ............ *G06F 9/451* (2018.02); *G06F 1/1652* (2013.01); *G06F 3/04886* (2013.01); *G06F 9/4843* (2013.01)

(58) Field of Classification Search
CPC .... G06F 9/451; G06F 9/4853; G06F 3/04886; G06F 1/1652
(Continued)

(56) References Cited

U.S. PATENT DOCUMENTS 9,684,342 B2 6/2017 Kim et al.
9,746,883 B2 8/2017 Lee et al.
(Continued)

FOREIGN PATENT DOCUMENTS

CN 107678661 A 2/2018
CN 107786794 A 3/2018
(Continued)

OTHER PUBLICATIONS

Chinese Office Action dated Nov. 21, 2023, issued in Chinese Application No. 202180005342.0.
(Continued)

*Primary Examiner* — Prabodh M Dharia
(74) *Attorney, Agent, or Firm* — Jefferson IP Law, LLP

(57) ABSTRACT

An electronic device is provided. The electronic device includes a first housing, a second housing foldably connected with the first housing, a flexible display disposed on the first housing and the second housing, at least one sensor, a memory, and at least one processor operatively connected to the flexible display, the at least one sensor, and the memory, wherein the at least one processor is configured, when instructions stored in the memory are executed, to control the flexible display to display a first execution screen of a first application, based on an angle between the first housing and the second housing, which is identified using
(Continued)

the sensor, falling within a predetermined range, identify whether the first application supports changing of an execution screen according to a change in angle, control the flexible display to display a second execution screen of the first application associated with the predetermined range.

18 Claims, 41 Drawing Sheets

(51) Int. Cl.
*G06F 3/04886* (2022.01)
*G06F 9/48* (2006.01)

(58) Field of Classification Search
USPC .......................................................... 361/679
See application file for complete search history.

(56) References Cited

U.S. PATENT DOCUMENTS

| | | | |
|---|---|---|---|
| 10,254,863 B2 | 4/2019 | Shin et al. | |
| 10,509,560 B2 | 12/2019 | Kim et al. | |
| 11,687,350 B2* | 6/2023 | Min | G06F 1/1677 |
| | | | 361/679.02 |
| 2010/0079355 A1 | 4/2010 | Kilpatrick, II et al. | |
| 2010/0182265 A1 | 7/2010 | Kim et al. | |
| 2013/0229324 A1 | 9/2013 | Zhang et al. | |
| 2014/0317542 A1* | 10/2014 | Kim | G06F 3/0486 |
| | | | 715/765 |
| 2014/0351748 A1 | 11/2014 | Xia et al. | |
| 2015/0149942 A1* | 5/2015 | Shimazu | G06F 3/0482 |
| | | | 715/766 |
| 2016/0098063 A1 | 4/2016 | Lee et al. | |
| 2016/0198100 A1 | 7/2016 | Cho et al. | |
| 2016/0357221 A1 | 12/2016 | Huh | |
| 2017/0075640 A1* | 3/2017 | Chun | G06F 3/1423 |
| 2017/0206049 A1 | 7/2017 | Choi et al. | |
| 2017/0206863 A1* | 7/2017 | An | G06F 3/0338 |
| 2017/0308125 A1 | 10/2017 | Chun et al. | |
| 2017/0322597 A1 | 11/2017 | Lee et al. | |
| 2018/0063361 A1 | 3/2018 | Goo et al. | |
| 2018/0181283 A1* | 6/2018 | Jang | G06F 3/0414 |
| 2018/0188910 A1 | 7/2018 | Ko et al. | |
| 2018/0210515 A1 | 7/2018 | Lyles et al. | |
| 2018/0331991 A1 | 11/2018 | Kim et al. | |
| 2019/0205011 A1 | 7/2019 | Li et al. | |
| 2020/0125144 A1 | 4/2020 | Chung et al. | |
| 2020/0364021 A1 | 11/2020 | Park et al. | |
| 2021/0150953 A1 | 5/2021 | Lee et al. | |
| 2021/0216332 A1 | 7/2021 | Li | |
| 2021/0365165 A1 | 11/2021 | Chen | |

FOREIGN PATENT DOCUMENTS

| | | |
|---|---|---|
| CN | 108351697 A | 7/2018 |
| CN | 109814669 A | 5/2019 |
| CN | 109947315 A | 6/2019 |
| CN | 110251941 A | 9/2019 |
| EP | 3591500 A1 | 1/2020 |
| KR | 10-2016-0085190 A | 7/2016 |

OTHER PUBLICATIONS

International Search Report dated May 24, 2021, issued in International Application No. PCT/KR2021/001720.
European Search Report dated May 4, 2022, issued in European Application No. 21753129.2.
Chinese Office Action dated May 4, 2023, issued in a counterpart Chinese Application No. 202180005342.0.
Chinese Decision on Grant dated Mar. 29, 2024, issued in Chinese Patent Application No. 202180005342.0.
European Search Report dated Nov. 22, 2024 issued in European Application No. 24202311.7.
Korean Office Action dated Jan. 17, 2025, issued in Korean Patent Application No. 10-2020-0015942.

* cited by examiner

ELECTRONIC DEVICE FOR PROVIDING EXECUTION SCREEN OF APPLICATION AND METHOD FOR OPERATING THE SAME

CROSS-REFERENCE TO RELATED APPLICATION(S)

This application is a continuation application of prior application Ser. No. 17/167,551, filed on Feb. 4, 2021, which is based on and claimed priority under 35 U.S.C. § 119(a) of a Korean patent application number 10-2020-0015942, filed on Feb. 10, 2020, in the Korean Intellectual Property Office, the disclosure of which is incorporated by reference herein in its entirety.

BACKGROUND

1. Field

The disclosure relates to an electronic device for providing an execution screen of an application and a method of operating the same.

2. Description of Related Art

For many people in modern times, portable digital communication devices have become essential items. Consumers want to be provided with a variety of high-quality services they want anytime and anywhere using portable digital communication devices.

In order to provide various high-quality services, a portable digital communication device stores various applications. A portable digital communication device executes an application so as to provide a specific service and to display graphic elements that are capable of interacting with a user, wherein the graphic elements are displayed on an execution screen of the executed application.

Portable digital communication devices may be placed in various states (e.g., rotating) according to the control of consumers (e.g., gripping) while displaying an execution screen of an application. Accordingly, there is a need to implement a technique for producing and displaying an execution screen of an application having a layout suitable for each of various states of portable digital communication devices and an arrangement state of graphic elements.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device that may execute an application, and may control a flexible display to display an execution screen including at least one graphic element. However, when the states of housings provided in the electronic device (e.g., the angles of the housings) are changed, the flexible display disposed on the housings may be bent, and the electronic device may display the execution screen of the application on the bent flexible display. When the user selects a specific element (e.g., an icon) included in the displayed execution screen of the application in the state in which the flexible display is bent, there may be a problem in that the convenience with which the user uses the element may be deteriorated due to the bent flexible display. Moreover, even if the currently displayed execution screen of an application is changed to another more convenient execution screen of an application, when an application switches from one execution screen to another execution screen, it is necessary every time to perform an operation of switching from the other execution screen of the application, which was just switched to, back to an appropriate and more convenient execution screen, which may increase the operational burden of the electronic device.

With an electronic device according to various embodiments and a method of operating the same, it is possible to address the issue that the convenience with which the user uses an application is deteriorated by allowing an execution screen to be changed to an execution screen on which the application can be more conveniently used in the state in which a flexible display is bent. With an electronic device according to various embodiments and a method of operating the same, it is possible to address the issue that operational burden increases on the electronic device for switching an execution screen by performing control such that, when currently running applications display execution screens, an execution screen corresponding to the current bent state of the flexible display is displayed.

Additional aspects will be set forth in part in the description which follows and, in part, will be apparent from the description, or may be learned by practice of the presented embodiments.

In accordance with an aspect of the disclosure, an electronic device is provided. The electronic device includes a first housing, a second housing foldably connected with the first housing, a flexible display disposed on the first housing and the second housing, at least one sensor, a memory, and at least one processor operatively connected to the flexible display, the at least one sensor, and the memory, wherein the at least one processor is configured, when instructions stored in the memory are executed, to control the flexible display to display a first execution screen of a first application, based on an angle between the first housing and the second housing, which is identified using the at least one sensor, falling within a predetermined range, identify whether the first application supports changing of an execution screen according to a change in angle, and based on the first application supporting the changing of the execution screen according to the change in the angle, control the flexible display to display a second execution screen of the first application associated with the predetermined range instead of the first execution screen.

In accordance with another aspect of the disclosure, a method of operating an electronic device is provided. The method includes a first housing, a second housing, and a flexible display disposed on the first housing and the second housing, the method including displaying a first execution screen of a first application on the flexible display, based on an angle between the first housing and the second housing, which is identified using at least one sensor, falling within a predetermined range, identifying whether the first application supports changing of an execution screen according to a change in the angle, and based on the first application supporting the changing of the execution screen according to the change in the angle, displaying a second execution screen of the first application associated with the predetermined range instead of the first execution screen on the flexible display.

In accordance with another aspect of the disclosure, an electronic device is provided. The electronic device includes a first housing, a second housing foldably connected with the first housing, a flexible display disposed on the first housing and the second housing, at least one sensor, a memory, and at least one processor operatively connected to the flexible display, the at least one sensor, and the memory, wherein the at least one processor is configured, when instructions stored in the memory are executed, to control the flexible display to display a first execution screen of a first application, based on an angle between the first housing and the second housing, which is identified using the at least one sensor, falling within a predetermined range, identify a plurality of graphic elements included in the first application, and control the flexible display to display, among the plurality of graphic elements, a first graphic element having a first attribute in a first area and a second graphic element having a second attribute in a second area, wherein the first area corresponds to the first housing, and the second area corresponds to the second housing.

Solutions according to various embodiments are not limited to the above-described solutions, and a person ordinarily skilled in the art to which the disclosure belongs will be able to clearly understand solutions, which are not disclosed herein, from this specification and the accompanying drawings.

According to various embodiments of the disclosure, an electronic device and a method of operating the same are capable of improving the convenience with which the user uses an application by allowing the application to change an execution screen to another execution screen that can be more conveniently used in the state in which the flexible display is bent. According to various embodiments of the disclosure, an electronic device and a method of operating the same are capable of reducing the operational burden on the electronic device for switching application screens by controlling currently running applications to display execution screens corresponding to the current bent state of the flexible display when the currently running applications display the execution screens.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
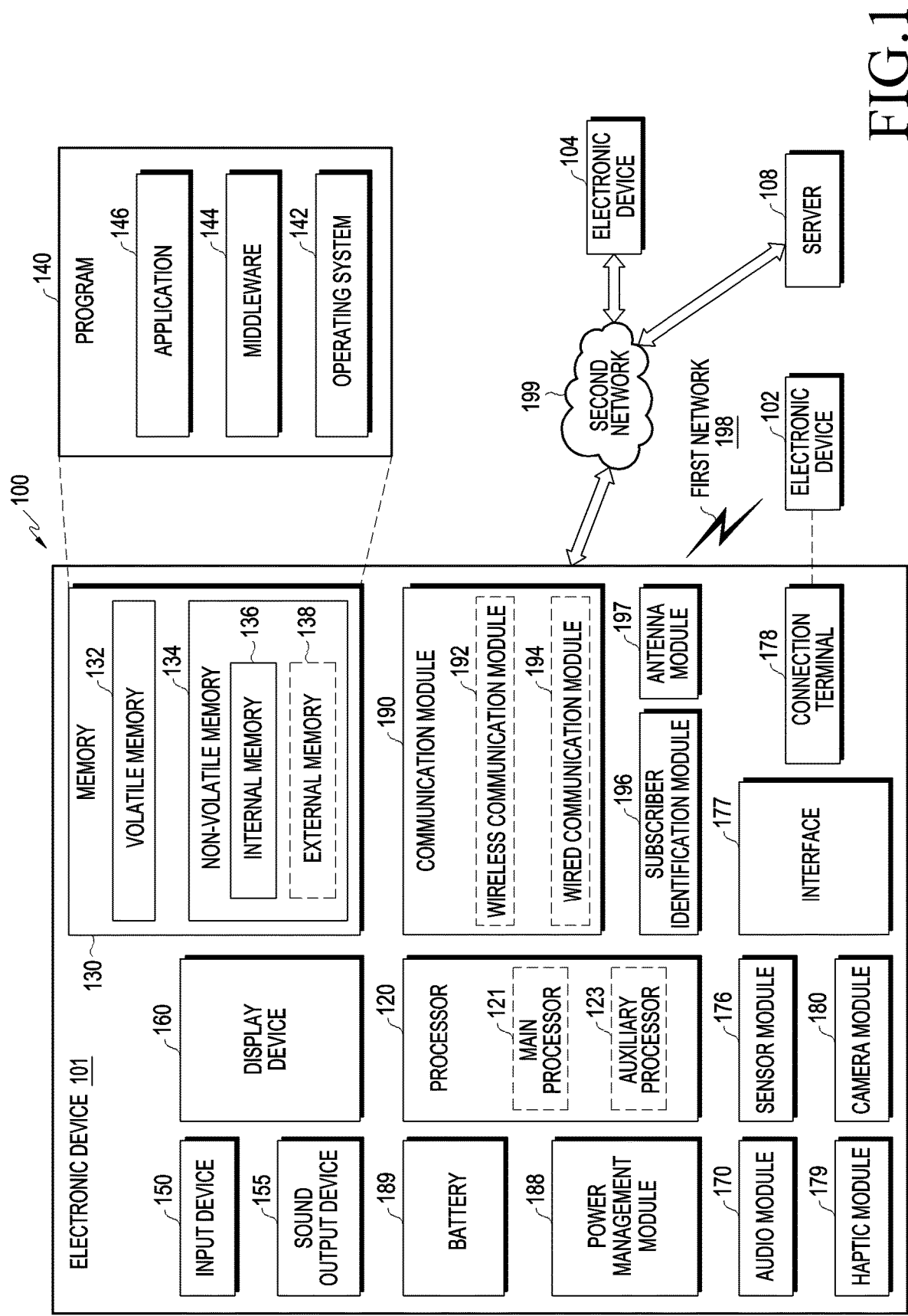
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image and moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element composed of a conductive material or a conductive pattern formed in or on a substrate (e.g., printed circuit board (PCB)). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., a program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Hereinafter, various examples of an electronic device including at least one housing structure, for example, two or more housing structures (or housings) and a flexible display, will be described.

Figure 2F:
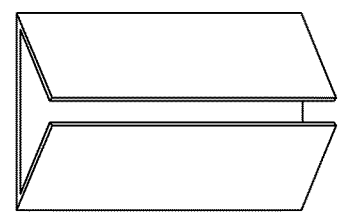
FIG. 2F is a view illustrating an electronic device including at least two housing structures and a flexible display according to an embodiment of the disclosure.
Figure 2E:
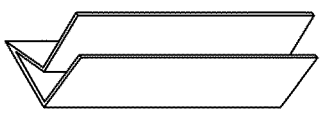
FIG. 2E is a view illustrating an electronic device including at least two housing structures and a flexible display according to an embodiment of the disclosure.
Figure 2D:
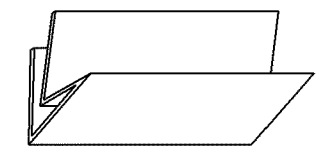
FIG. 2D is a view illustrating an electronic device including at least two housing structures and a flexible display according to an embodiment of the disclosure.
Figure 2C:
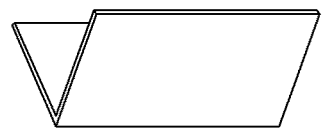
FIG. 2C is a view illustrating an electronic device including at least two housing structures and a flexible display according to an embodiment of the disclosure.
Figure 2B:
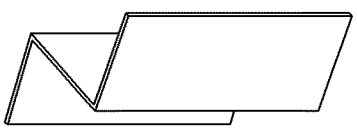
FIG. 2B is a view illustrating an electronic device including at least two housing structures and a flexible display according to an embodiment of the disclosure.
Figure 2A:
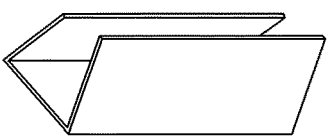
FIG. 2A is a view illustrating an electronic device including at least two housing structures and a flexible display according to an embodiment of the disclosure.
Figure 2K:
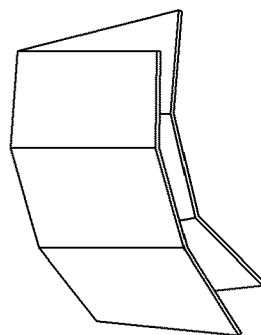
FIG. 2K is a view illustrating an electronic device including at least two housing structures and a flexible display according to an embodiment of the disclosure.
Figure 2J:
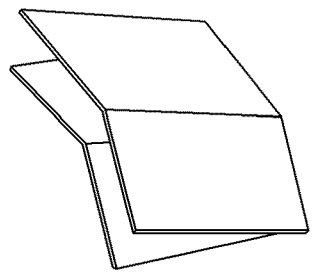
FIG. 2J is a view illustrating an electronic device including at least two housing structures and a flexible display according to an embodiment of the disclosure.
Figure 2I:
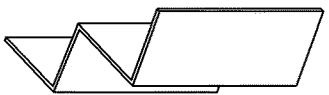
FIG. 2I is a view illustrating an electronic device including at least two housing structures and a flexible display according to an embodiment of the disclosure.
Figure 2H:
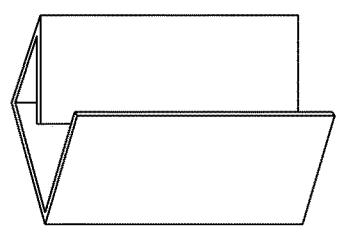
FIG. 2H is a view illustrating an electronic device including at least two housing structures and a flexible display according to an embodiment of the disclosure.
Figure 2G:
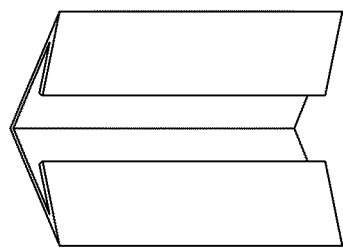
FIG. 2G is a view illustrating an electronic device including at least two housing structures and a flexible display according to an embodiment of the disclosure.

FIG. 2A is a view illustrating an electronic device including at least two housing structures and a flexible display according to an embodiment of the disclosure, FIG. 2B is a view illustrating an electronic device including at least two housing structures and a flexible display according to an embodiment of the disclosure, FIG. 2C is a view illustrating an electronic device including at least two housing structures and a flexible display according to an embodiment of the disclosure, FIG. 2D is a view illustrating an electronic device including at least two housing structures and a flexible display according to an embodiment of the disclosure, FIG. 2E is a view illustrating an electronic device including at least two housing structures and a flexible display according to an embodiment of the disclosure, FIG. 2F is a view illustrating an electronic device including at least two housing structures and a flexible display according to an embodiment of the disclosure, FIG. 2G is a view illustrating an electronic device including at least two housing structures and a flexible display according to an embodiment of the disclosure, FIG. 2H is a view illustrating an electronic device including at least two housing structures and a flexible display according to an embodiment of the disclosure, FIG. 2I is a view illustrating an electronic device including at least two housing structures and a flexible display according to an embodiment of the disclosure, FIG. 2J is a view illustrating an electronic device including at least two housing structures and a flexible display according to an embodiment of the disclosure, and FIG. 2K is a view illustrating an electronic device including at least two housing structures and a flexible display according to an embodiment of the disclosure.

According to various embodiments of the disclosure, an electronic device may include two or more housing structures, each of which is rotatably connected, and a flexible display.

According to various embodiments of the disclosure, the flexible display may be disposed on the two or more housing structures, and may be bent according to the rotated states of the housing structures. The rotational states of the housing structures will be described below.

According to various embodiments of the disclosure, an electronic device having two or more housing structures and a flexible display provided therein may be formed in various shapes depending on the rotated states of the housing structures. For example, referring to FIGS. 2A to 2K, the various shapes include a shape in which two areas are formed in an electronic device (e.g., a flexible display) (half fold), a shape in which three areas are formed in an electronic device (e.g., a flexible display) (e.g., tri fold, Z fold, or single open gate fold), a shape in which four areas are formed in an electronic device (e.g., a flexible display) (e.g., double parallel reverse fold, double parallel fold, double gate fold, roll fold, accordion fold, or half fold then half fold), and a shape in which a larger number of areas are formed in an electronic device (e.g., a flexible display) (e.g., half fold then tri fold). An electronic device may include housing structures that are rotatably connected to each other and a flexible display, and the housing structures may be rotated to form a corresponding shape.

Hereinafter, an electronic device according to various embodiments and a method of operating the same will be described taking an electronic device including two housings and a flexible display as an example.

Accordingly, the description of an electronic device according to various embodiments described below and a method of operating the same are also applicable mutatis mutandis to an electronic device including three or more housings and a flexible display.

Accordingly, the description of an electronic device according to various embodiments described below and a method of operating the same are also applicable mutatis mutandis to an electronic device including two or more housings and two or more displays, which are disposed on the housings, respectively. According to an embodiment of the disclosure, in the case of an electronic device including two or more housings and two or more displays disposed in each of the housings, respective displays of the electronic device may form an angle with each other according to the rotated states of the housings.

An electronic device 101 will be described.

Figure 3A:
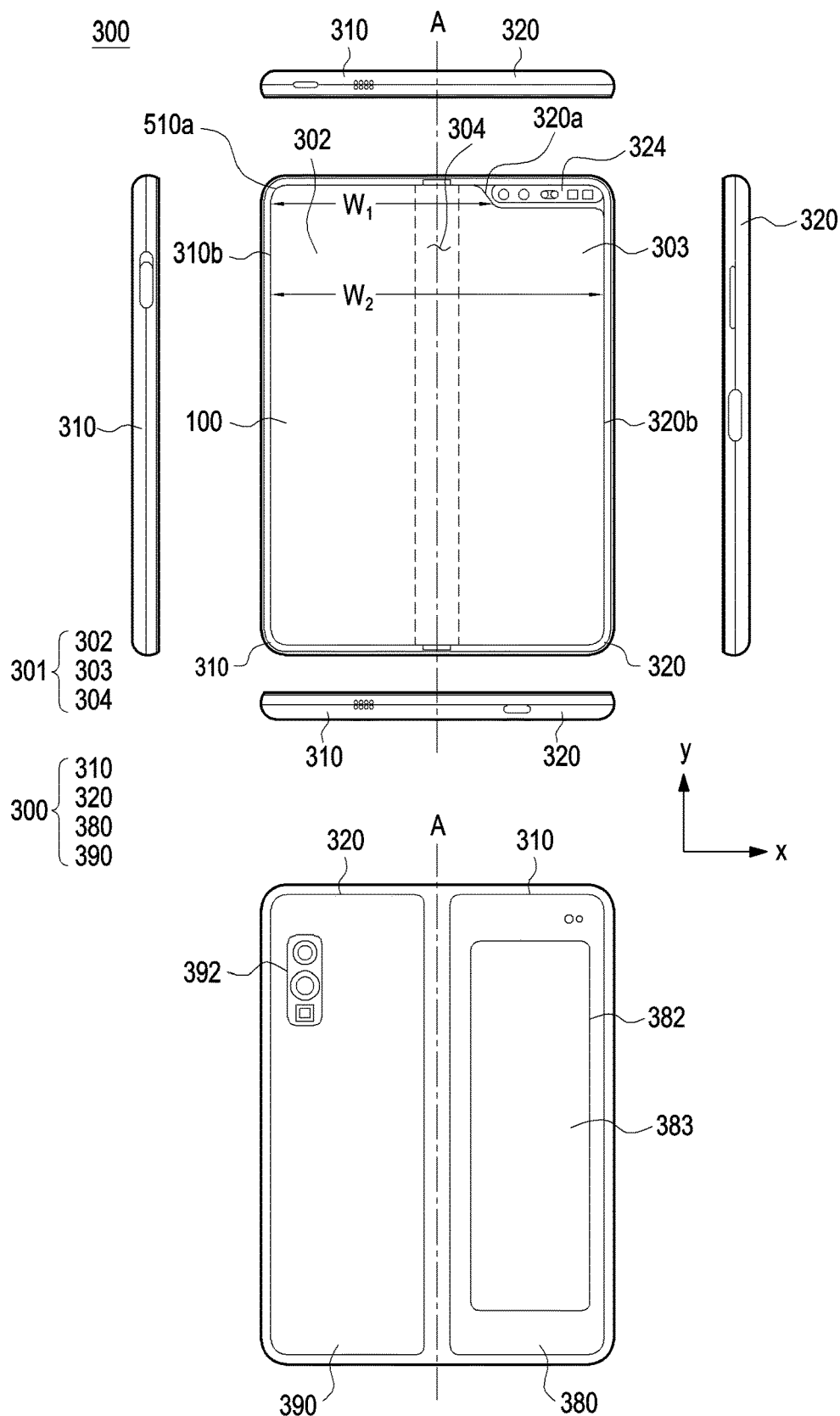
FIG. 3A is a view illustrating an electronic device in an unfolded state according to an embodiment of the disclosure.
Figure 3B:
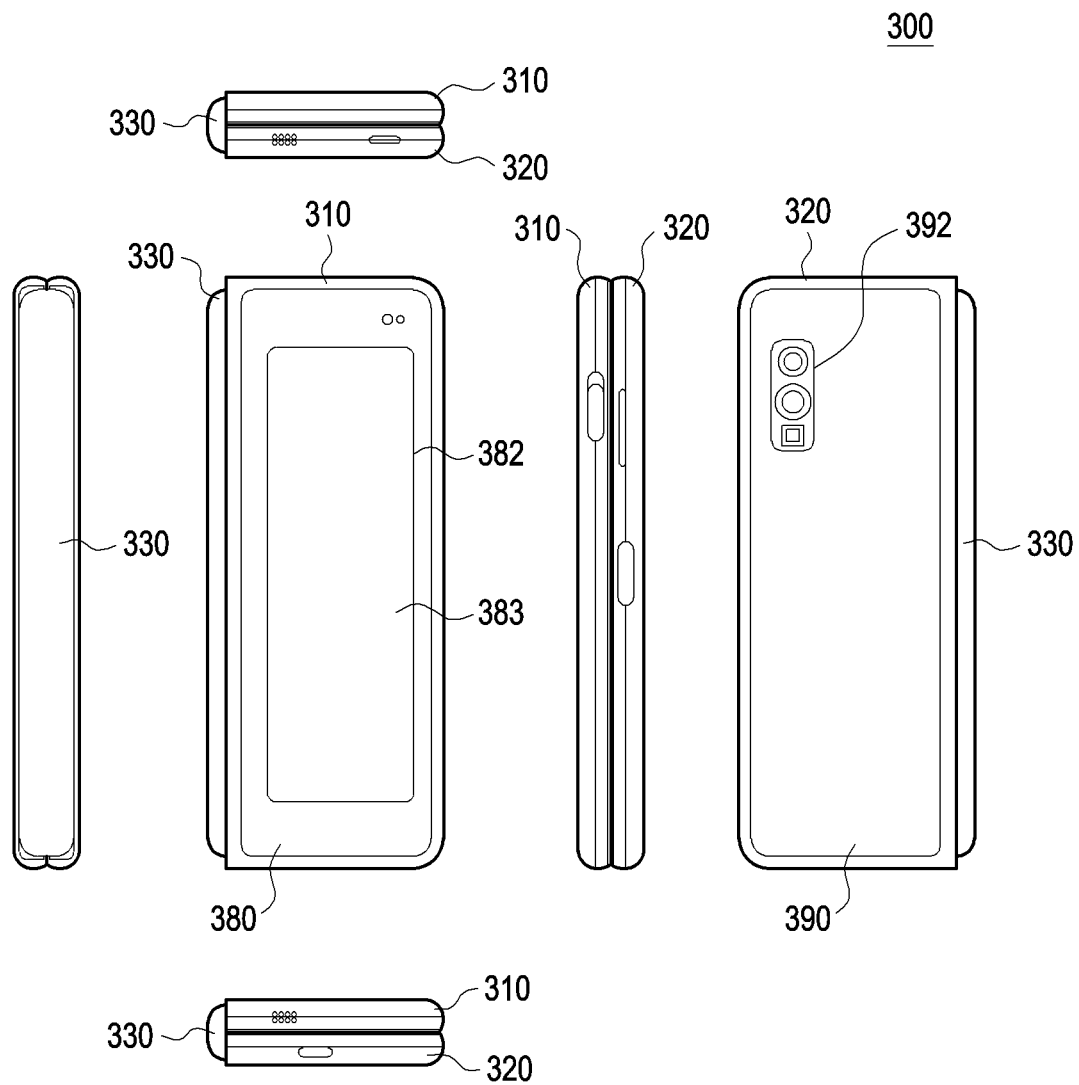
FIG. 3B is a view illustrating an electronic device in a folded state according to an embodiment of the disclosure.

FIG. 3A is a view illustrating an electronic device in an unfolded state according to an embodiment of the disclosure. FIG. 3B is a view illustrating the electronic device in a folded state according to an embodiment of the disclosure.

Referring to FIGS. 3A and 3B, in an embodiment of the disclosure, an electronic device 300 may include a foldable housing 305, a hinge cover 330 configured to cover the foldable portion of the foldable housing, and a flexible or foldable display 301 (hereinafter, simply referred to as a "display" 301) disposed in a space defined by the foldable housing 305. Herein, the surface on which the display 301 is disposed is defined as a first surface or the front surface of the electronic device 300. In addition, the surface opposite the front surface is defined as a second surface or the rear surface of the electronic device 300. In addition, the surface surrounding the space between the front surface and the rear surface is defined as a third surface or the side surface of the electronic device 300.

In an embodiment of the disclosure, the foldable housing 305 may include a first housing structure 310, a second housing structure 320 including a sensor area 324, a first rear cover 380, and a second rear cover 390. The foldable housing 305 of the electronic device 300 is not limited to the shape and assembly illustrated in FIGS. 3A and 3B, and may be implemented by combinations and/or assemblies of other shapes or components. For example, in another embodiment of the disclosure, the first housing structure 310 and the first rear cover 380 may be integrally formed, and the second housing structure 320 and the second rear cover 390 may be integrally formed.

In the illustrated embodiment of the disclosure, the first housing structure 310 and the second housing structure 320 may be disposed on opposite sides about a folding axis (axis A), and may have generally symmetrical shapes about the folding axis A. As will be described later, the first housing structure 310 and the second housing structure 320 may have different angles or distances therebetween depending on whether the electronic device 300 is in the unfolded state, in the folded state, or in the intermediate state. In the illustrated embodiment of the disclosure, unlike the first housing structure 310, the second housing structure 320 may further include the sensor area 324 in which various sensors are disposed. However, the first housing structure 310 and the second housing structure 320 may have mutually symmetrical shapes in other areas.

In an embodiment of the disclosure, as illustrated in FIG. 3A, the first housing structure 310 and the second housing structure 320 may together form a recess that accommodates the display 301 therein. In the illustrated embodiment of the disclosure, due to the sensor area 324, the recess may have two or more different widths in a direction perpendicular to the folding axis A.

For example, the recess may have (1) a first width $w_1$ between a first portion 310a parallel to the folding axis A in the first housing structure 310 and a first portion 320a formed at an edge of the sensor area 324 in the second housing structure 320, and (2) a second width $w_2$ between a second portion 310b in the first housing structure 310 and a second portion 320b, which is parallel to the folding axis A but does not correspond to the sensor area 324, in the second housing structure 320. In this case, the second width $w_2$ may be greater than the first width $w_1$. In other words, the first portion 310a of the first housing structure 310 and the first portion 320a of the second housing structure 320, which are asymmetrical with each other, may form the first width $w_1$ of the recess, and the second portion 310b of the first housing structure 310 and the second portion 320b of the second housing structure 320, which are symmetrical with each other, may form the second width $w_2$ of the recess. In an embodiment of the disclosure, the first portion 320a and the second portion 320b of the second housing structure 320 may be located at different distances from the folding axis A. The widths of the recess are not limited to the illustrated example. In various embodiments of the disclosure, the recess may have a plurality of widths due to the shape of the sensor area 324 and due to the asymmetric portions of the first housing structure 310 and the second housing structure 320.

In an embodiment of the disclosure, at least a portion of the first housing structure 310 and at least a portion of the second housing structure 320 may be formed of a metal material or a non-metal material having rigidity of a level selected in order to support the display 301.

According to an embodiment of the disclosure, the sensor area 324 may be formed to have a predetermined area adjacent to one corner of the second housing structure 320. However, the arrangement, shape, and size of the sensor area 324 are not limited to those in the illustrated example. For example, in another embodiment of the disclosure, the sensor area 324 may be provided at another corner of the second housing structure 320 or in any area between the upper and lower end corners. In an embodiment of the disclosure, components embedded in the electronic device 300 to perform various functions may be exposed to the front surface of the electronic device 300 through the sensor area 324 or one or more openings provided in the sensor area 324. In various embodiments of the disclosure, the components may include various sensors. The sensors may include at least one of, for example, a front camera, a receiver, or a proximity sensor.

The first rear cover 380 may be disposed at one side of the folding axis on the rear surface of the electronic device, and may have, for example, a substantially rectangular periphery. The periphery may be enclosed by the first housing structure 310. Similarly, the second rear cover 390 may be disposed at the other side of the folding axis on the rear surface of the electronic device, and the periphery of the second rear cover 390 may be enclosed by the second housing structure 320.

In the illustrated embodiment of the disclosure, the first rear cover 380 and the second rear cover 390 may have substantially symmetrical shapes about the folding axis (the axis A). However, the first rear cover 380 and the second rear cover 390 do not necessarily have mutually symmetrical shapes, and in another embodiment of the disclosure, an electronic device 300 may include a first rear cover 380 and a second rear cover 390 having any of various shapes. In a still another embodiment of the disclosure, the first rear cover 380 may be integrally formed with the first housing structure 310, and the second rear cover 390 may be integrally formed with the second housing structure 320.

In an embodiment of the disclosure, the first rear cover 380, the second rear cover 390, the first housing structure 310, and the second housing structure 320 may define a space in which various components (e.g., a printed circuit board or a battery) of the electronic device 300 may be disposed. In an embodiment of the disclosure, one or more components may be disposed or visually exposed on the rear surface of the electronic device 300. For example, at least a portion of a sub-display 383 may be visually exposed through a first rear area 382 of the first rear cover 380. In another embodiment of the disclosure, one or more components or sensors may be visually exposed through a second rear area 392 of the second rear cover 390. In various embodiments of the disclosure, the sensors may include a proximity sensor and/or a rear camera.

Referring to FIG. 3B, the hinge cover 330 may be disposed between the first housing structure 310 and the second housing structure 320 so as to cover an internal component (e.g., the hinge structure). In an embodiment of the disclosure, the hinge cover 330 may be covered by a portion of the first housing structure 310 and a portion of the second housing structure 320, or may be exposed to the outside depending on whether the electronic device 300 is in the unfolded state (flat state) or in the folded state.

For example, as illustrated in FIG. 3A, when the electronic device 300 is in the unfolded state, the hinge cover 330 may not be exposed by being covered by the first housing structure 310 and the second housing structure 320. As an example, as illustrated in FIG. 3B, when the electronic device 300 is in the folded state (e.g., the fully folded state), the hinge cover 330 may be exposed to the outside between the first housing structure 310 and the second housing structure 320. As an example, when the first housing structure 310 and the second housing structure 320 are in the intermediate state in which the first housing structure 310 and the second housing structure 320 are folded to form a predetermined angle therebetween, the hinge cover 330 may be exposed to the outside between the first housing structure 310 and the second housing structure 320. In this case, however, the exposed area may be less than that in the fully folded state. In an embodiment of the disclosure, the hinge cover 330 may include a curved surface.

The display 301 may be disposed in a space defined by the foldable housing 305. For example, the display 301 may be seated in the recess defined by the foldable housing 305, and may constitute most of the front surface of the electronic device 300.

Accordingly, the front surface of the electronic device 300 may include the display 301, and a portion of the first housing structure 310 and a portion of the second housing structure 320, which are adjacent to the display 301. In addition, the rear surface of the electronic device 300 may include the first rear cover 380, a portion of the first housing structure 310 adjacent to the first rear cover 380, the second rear cover 390, and a portion of the second housing structure 320 adjacent to the second rear cover 390.

The display 301 may be a display in which at least a portion is deformable into a planar surface or a curved surface. In an embodiment of the disclosure, the display 301 may include a folding area 304, a first area 302 disposed on one side of the folding area 304 (e.g., the left side of the folding area 304 illustrated in FIG. 3A), and a second area 303 disposed on the other side of the folding area 304 (e.g., the right side of the folding area 304 illustrated in FIG. 3A).

The area division of the display 301 illustrated in FIG. 3A is illustrative, and the display 301 may be divided into a plurality of areas (e.g., four or more areas, or two areas) depending on the structure or functions thereof. For example, in the embodiment illustrated in FIG. 3A, the area of the display 301 may be divided by the folding area 304 or the folding axis (the axis A) extending parallel to the y axis. However, in another embodiment of the disclosure, the area of the display 301 may be divided with reference to another folding area (e.g., a folding area parallel to the x axis) or another folding axis (e.g., a folding axis parallel to the x axis).

The first area 302 and the second area 303 may have generally symmetrical shapes about the folding area 304. However, unlike the first area 302, the second area 303 may include a notch cut due to the presence of the sensor area 324, but may have a shape symmetrical with the first area 302 in areas other than the sensor area. In other words, the first area 302 and the second area 303 may include portions having mutually symmetrical shapes and portions having mutually asymmetrical shapes.

Hereinafter, the operation of the first housing structure 310 and the second housing structure 320 and respective areas of the display 301 according to the states of the electronic device 300 (e.g., the unfolded state (flat state) and the folded state) will be described.

According to an embodiment of the disclosure, when the electronic device 300 is in the unfolded state (flat state) (e.g., FIG. 3A), the first housing structure 310 and the second housing structure 320 may be disposed to form an angle of 180 degrees therebetween and to face the same direction. The surface of the first area 302 and the surface of the second area 303 of the display 301 form an angle of 180 degrees relative to each other, and may face the same direction (e.g., the front direction of the electronic device). The folding area 304 may form the same plane as the first area 302 and the second area 303.

In an embodiment of the disclosure, when the electronic device 300 is in the folded state (e.g., FIG. 3B), the first housing structure 310 and the second housing structure 320 may be disposed to face each other. The surface of the first area 302 and the surface of the second area 303 of the display 301 may face each other while forming a narrow angle (e.g., an angle between 0 degrees and 10 degrees) relative to each other. At least a portion of the folding area 304 may be a curved surface having a predetermined curvature.

According to an embodiment of the disclosure, when the electronic device 300 is in the intermediate state (e.g., FIG. 3B), the first housing structure 310 and the second housing structure 320 may be disposed to form a predetermined angle relative to each other. The surface of the first area 302 and the surface of the second area 303 of the display 301 may form an angle larger than that in the folded state and smaller than that in the unfolded state. At least a portion of the folding area 304 may have a curved face having a predetermined curvature, and the curvature at this time may be smaller than that in the folded state.

Figure 3C:
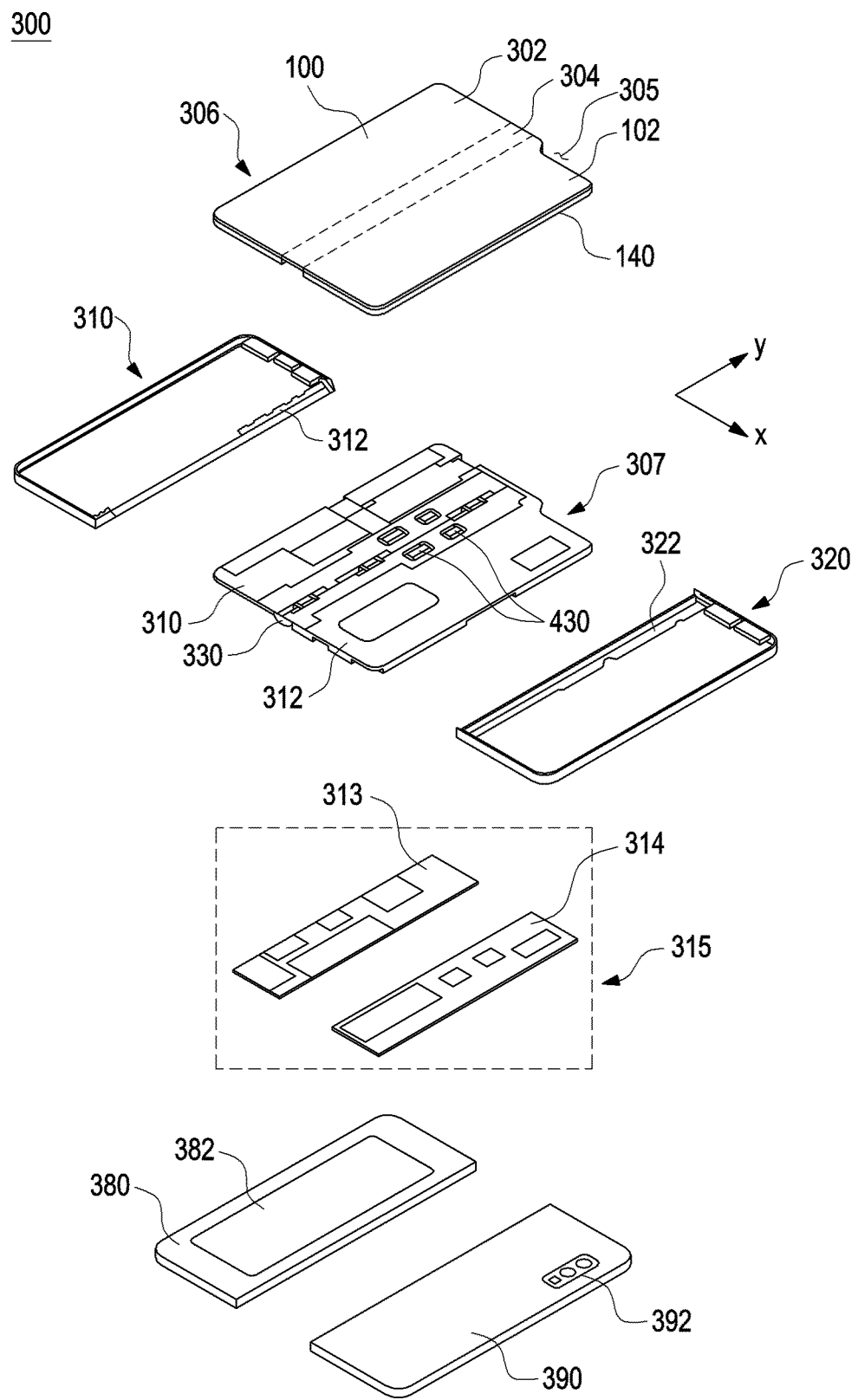
FIG. 3C is an exploded perspective view illustrating an electronic device according to an embodiment of the disclosure.

FIG. 3C is an exploded perspective view of an electronic device according to an embodiment of the disclosure.

Referring to FIG. 3C, in an embodiment of the disclosure, the electronic device 300 may include a display unit 306, a bracket assembly 307, a board unit 315, a first housing structure 310, a second housing structure 320, a first rear cover 380, and a second rear cover 390. Herein, the display unit 306 may be referred to as a display module or a display assembly.

The display unit 306 may include a display 301 and at least one plate or layer 140 on which the display 301 is seated. In an embodiment of the disclosure, the plate 140 may be disposed between the display 301 and the bracket assembly 307. The display 301 may be disposed on at least a portion of one surface (e.g., the top surface referring to FIG. 3C) of the plate 140. The plate 140 may be formed in a shape corresponding to that of the display panel 301. For example, a portion of the plate 140 may be formed in a shape corresponding to a notch 309 in the display 301.

The bracket assembly 307 may include a first bracket 311, a second bracket 312, a hinge structure disposed between the first bracket 311 and the second bracket 312, a hinge cover 330 configured to cover the hinge structure when the hinge structure is viewed from the outside, and a wiring member 430 (e.g., a flexible printed circuit board (FPCB)) extending across the first and second brackets 311 and 312.

In an embodiment of the disclosure, the bracket assembly 307 may be disposed between the plate 140 and the board unit 315. For example, the first bracket 311 may be disposed between the first area 302 of the display 301 and a first board 313. The second bracket 312 may be disposed between the second area 303 and the second board 314 of the display 301.

According to an embodiment of the disclosure, at least a portion of the wiring member 430 and at least a portion of the hinge structure 300 may be disposed inside the bracket assembly 307. The wiring member 430 may be disposed in a direction across the first bracket 311 and the second bracket 312 (e.g., the x-axis direction). The wiring member 430 may be disposed in a direction (e.g., the x-axis direction) perpendicular to the folding axis (e.g., the y axis or the folding axis A in FIG. 3A) of the folding area 304 of the electronic device 300.

As described above, the board unit 315 may include the first board 313 disposed on the first bracket 311 side and the second board 314 disposed on the second bracket 312 side. The first board 313 and the second board 314 may be disposed in a space defined by the bracket assembly 307, the first housing structure 310, the second housing structure 320, the first rear cover 380, and the rear cover 390. Components for implementing various functions of the electronic device 300 may be mounted on the first board 313 and the second board 314.

The first housing structure 310 and the second housing structure 320 may be assembled to each other so as to be coupled to the opposite sides of the bracket assembly 307 in the state in which the display unit 306 is coupled to the bracket assembly 307. As will be described later, the first housing structure 310 and the second housing structure 320 may be coupled to the bracket assembly 307 by sliding on the opposite sides of the bracket assembly 307.

In an embodiment of the disclosure, the first housing structure 310 may include a first rotational support surface 312, and the second housing structure 320 may include a second rotational support surface 322, which corresponds to the first rotational support surface 312. The first rotational support surface 312 and the second rotational support surface 322 may include curved surfaces corresponding to the curved surface included in the hinge cover 330.

In an embodiment of the disclosure, when the electronic device 300 is in the unfolded state (e.g., the electronic device in FIG. 3A), the first rotational support surface 312 and the second rotational support surface 322 may cover the hinge cover 330 so that the hinge cover 330 may not be exposed or may be only minimally exposed to the rear surface of the electronic device 300. Meanwhile, when the electronic device 300 is in the folded state (e.g., the electronic device in FIG. 3B), the first rotational support surface 312 and the second rotational support surface 322 may rotate about the curved surface included in the hinge cover 330 so that the hinge cover 330 may be exposed to the rear surface of the electronic device 300 as much as possible.

Figure 4A:
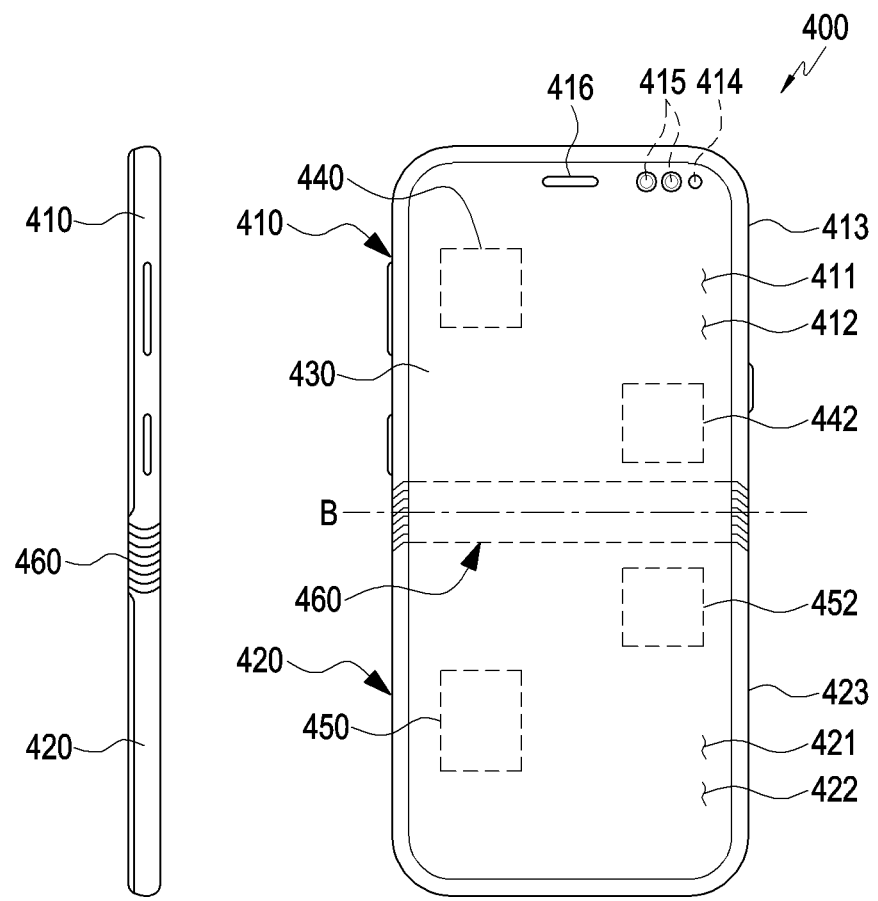
FIG. 4A is a view illustrating an electronic device in an unfolded state with reference to a specific folding direction according to an embodiment of the disclosure.

Hereinafter, another example of the electronic device 101 will be described. FIG. 4A is a view illustrating an electronic device 400 (e.g., the electronic device 101 in FIG. 1) in the unfolded state with reference to a specific folding direction according to an embodiment of the disclosure.

Referring to FIG. 4A, the electronic device 400 may include a pair of housing structures 410 and 420 (e.g., a foldable housing structure), which are coupled to each other via a hinge structure 460 to be rotatable relative to each other about a folding axis B, and a display 330 (e.g., a flexible display or a foldable display) disposed in the space defined by the pair of housing structures 410 and 420. In the following description, the electronic device 400 in the unfolded state illustrated in FIG. 4A differs from the electronic device 300 of FIG. 3A only in the shape of the display 301 due to the folding axes having different directions, and respective components of the electronic device 400 may operate in the same manner as those of the electronic device 300.

According to an embodiment of the disclosure, when the electronic device 400 of FIG. 4A is in the unfolded state, the display 301 may be configured in a second shape different from a first shape. As an example, the second shape may include a second aspect ratio (e.g., 16:9) different from the first aspect ratio (e.g., 4:3).

According to various embodiments of the disclosure, the first housing structure 410 and the second housing structure 420 may be disposed at opposite sides about the folding axis B (e.g., a horizontal folding axis).

According to an embodiment of the disclosure, unlike the second housing structure 420, the first housing structure 410 includes an area in which a camera 414 and various sensors 415 are disposed, but in other areas, the first housing structure 410 may have a symmetrical shape. In another embodiment of the disclosure, the area in which the camera 414 and various sensors 415 are disposed may be additionally disposed in or replaced with at least a portion of the second housing structure 420.

In another embodiment of the disclosure, the camera 414 or at least some of various sensors 415 may be disposed in at least a portion of the first housing 410, and the remaining ones thereof may be disposed in at least a portion of the second housing structure 420.

According to various embodiments of the disclosure, in the state in which the electronic device 400 is unfolded, the first housing structure 410 may include a first surface 411 facing the front side of the electronic device 400, a second surface 412 facing away from the first surface 411, and a first surface member 413 surrounding at least a portion of the space between the first surface 411 and the second surface 412.

According to various embodiments of the disclosure, in the state in which the electronic device 400 is unfolded, the second housing structure 420 may include a third surface 421 facing the front side of the electronic device 400, a fourth surface 422 facing away from the third surface 421, and a second surface member 423 surrounding at least a portion of the space between the third surface 421 and the fourth surface 422.

According to various embodiments of the disclosure, the camera 414 may be exposed on the front surface of the electronic device 400 through an opening provided in one corner of the first housing structure 410. The sensors 415 may include at least one of a proximity sensor, an illuminance sensor, an iris recognition sensor, an ultrasonic sensor, or an indicator. As an example, the sensors 415 may be exposed on the front surface of the electronic device 400 through openings provided in one corner of the first housing structure 410 or may be disposed at the lower end of at least a portion of the display 301.

According to various embodiments of the disclosure, the first housing structure 410 may include a receiver 416 disposed through at least a portion thereof. In an embodiment of the disclosure, although not illustrated, the electronic device 400 may include an ear jack hole disposed through the first housing structure 410 and/or the second housing structure 420, an external speaker module, a SIM card tray, an interface connector port, or at least one key button.

According to various embodiments of the disclosure, the first housing structure 410 and the second housing structure 420 may have different angles or distances therebetween depending on whether the electronic device 400 is in the unfolded state (flat state) (e.g., the state in FIG. 4A), in the folded state (e.g., the state of FIG. 4A, which will be described later), or in the intermediate state. Without being limited to the above description, depending on the angle between the first housing structure 410 and the second housing structure 420, the electronic device may be in a closed state, in an open state, or in a half-folded state, which will be described later. The term "state" may be interchangeable with the term "mode".

According to various embodiments of the disclosure, the state of the electronic device (e.g., the unfolded state, the folded state, or the intermediate state) may be set according to the angle between the first housing structure 410 and the second housing structure 420, and an operation of displaying an execution screen of an application may be performed according to the state of the electronic device (e.g., the states of the housings, the state of the hinge, or the bent state of the flexible display). The operation of displaying an execution screen of an application according to the state of the electronic device will be described later.

According to various embodiments of the disclosure, the electronic device 400 may include a first motion sensor 440 and a magnetic body (e.g., a magnet) 442 disposed in at least a portion of the first housing structure 410. According to an embodiment of the disclosure, the first motion sensor 440 may be configured with a combination of at least two of an acceleration sensor, an angular velocity sensor (e.g., a gyro sensor), or a geomagnetic sensor. For example, the electronic device 400 may detect the orientation and the motion of the first housing structure 410 through the first motion sensor 440. Specifically, the orientation of the first housing structure 410 is detected based on the acceleration sensor of the first motion sensor 440, and the motion of the first housing structure 410 may be detected by the angular velocity sensor of the first motion sensor 440. According to an embodiment of the disclosure, the magnetic body 442 may be disposed in at least a portion of the first housing structure 410 adjacent to the hinge structure 460.

According to various embodiments of the disclosure, the electronic device 400 may include a second motion sensor 450 and a magnetic sensor module 452 disposed in at least a portion of the second housing structure 420. According to an embodiment of the disclosure, the second motion sensor 450 may be configured with a combination of at least two of an acceleration sensor, an angular velocity sensor (e.g., a gyro sensor), or a geomagnetic sensor. As an example, the electronic device 400 may detect the orientation of the second housing structure 420 using the acceleration sensor of the second motion sensor 450 and the motion of the second housing structure 420 using the angular velocity sensor of the second motion sensor 450. According to an embodiment of the disclosure, the magnetic sensor module 452 may be disposed in at least a portion of the second housing structure 420 adjacent to the hinge structure 460. As an example, the magnetic body 442 of the first housing structure 410 and the magnetic sensor module 452 of the second housing structure 420 may be disposed to at least partially face each other in the state in which the electronic device 400 is folded, as illustrated in FIG. 4B.

Figure 4B:
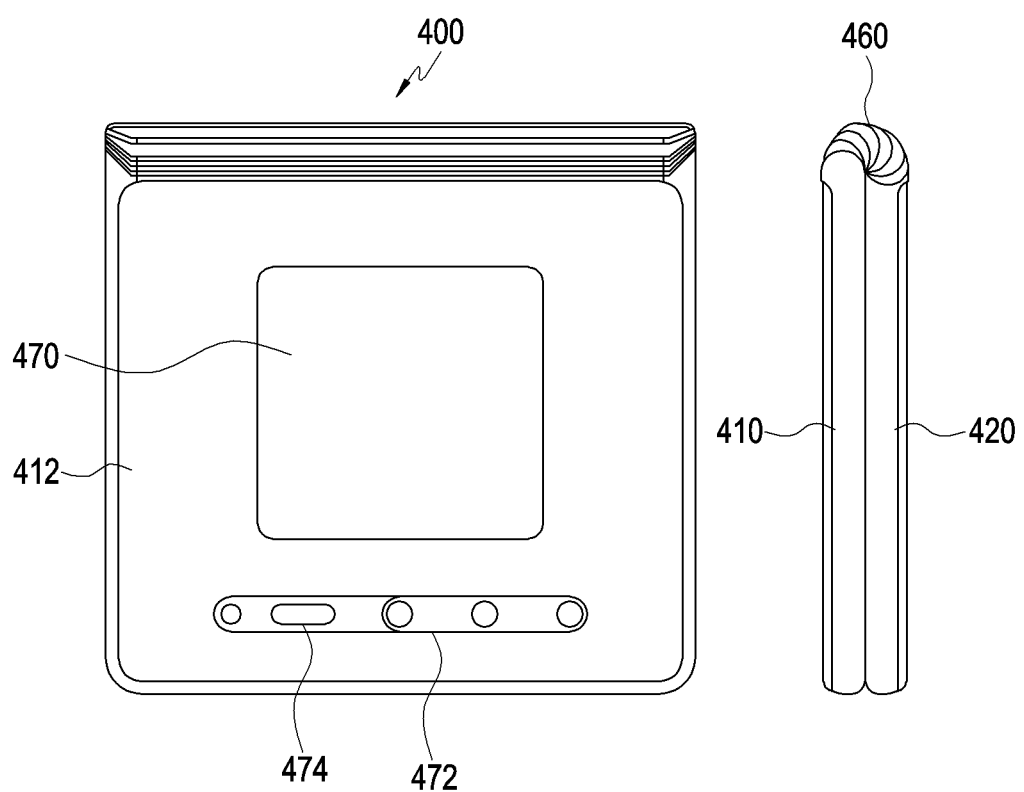
FIG. 4B is a view illustrating an electronic device in a folded state with reference to a second folding direction according to an embodiment of the disclosure.

FIG. 4B is a view illustrating an electronic device (e.g., the electronic device 101 in FIG. 1) in the folded state according to an embodiment of the disclosure.

Referring to FIG. 4B, the electronic device 400 may include a pair of housing structures 410 and 420 (e.g., a foldable housing structure), which are coupled to each other via a hinge structure 460 to be folded relative to each other about the folding axis B (e.g., the horizontal folding axis), and a display (e.g., a flexible display or a foldable display) disposed in a space defined by the pair of housing structures 410 and 420.

According to various embodiments of the disclosure, the sensors may include a rear camera device 472 and/or a proximity sensor 474. According to an embodiment of the disclosure, at least a portion of a sub-display 470 may be visually exposed through the rear surface 412 of the first housing structure 410.

According to various embodiments of the disclosure, one or more components may be disposed or visually exposed on the rear surface of the electronic device 400. According to an embodiment of the disclosure, one or more components or sensors may be visually exposed through the rear surface (a second surface) 412 of the first housing structure 410. The sensors may include a rear camera device 472 and/or a proximity sensor 474. According to an embodiment of the disclosure, at least a portion of a sub-display 470 may be visually exposed through the rear surface 412 of the first housing structure 410.

Figure 5:
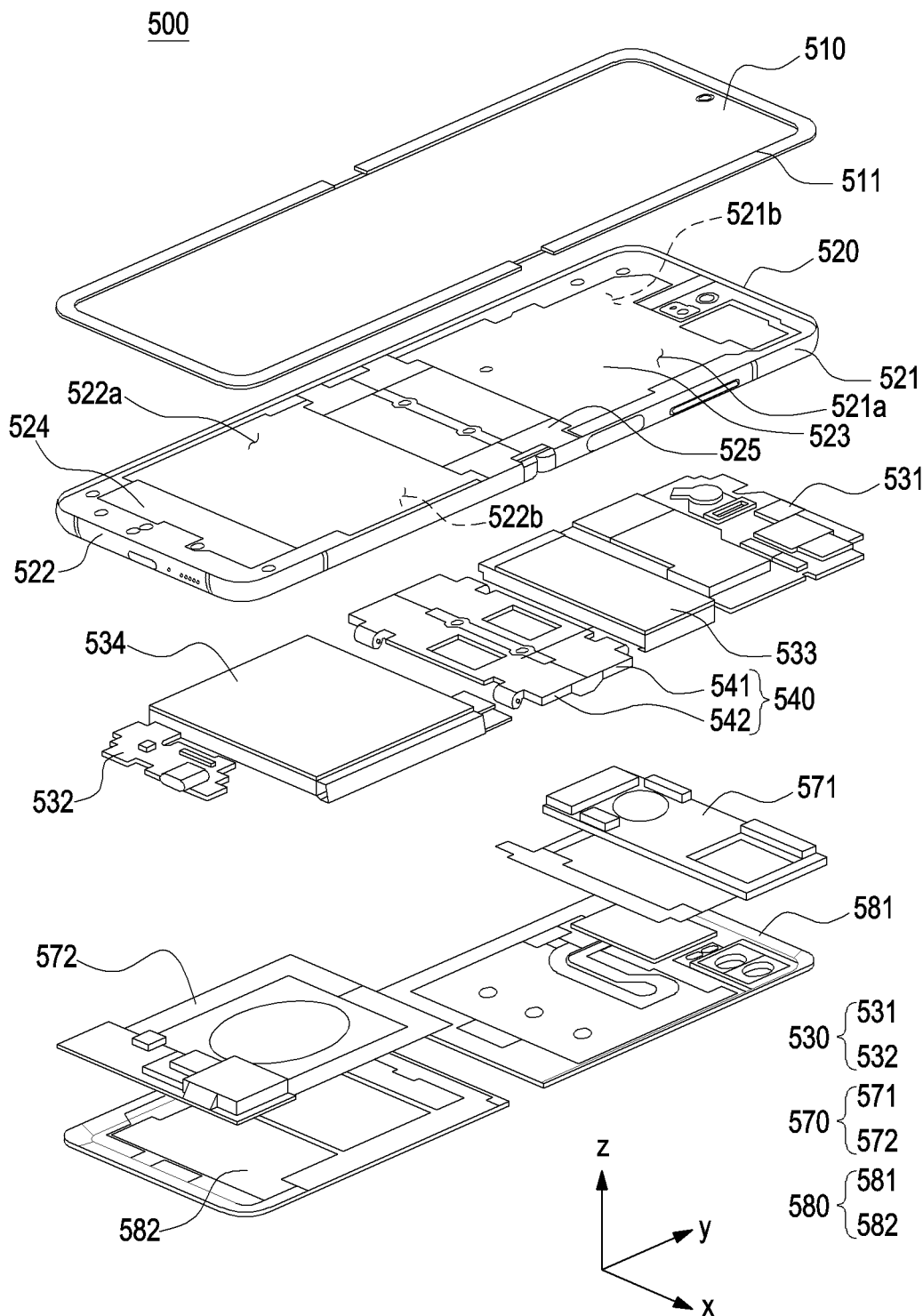
FIG. 5 is an exploded perspective view illustrating an electronic device according to an embodiment of the disclosure.

FIG. 5 is an exploded perspective view illustrating the electronic device 400 (e.g., the electronic device 101 in FIG. 1) according to an embodiment of the disclosure.

Referring to FIG. 5, in various embodiments of the disclosure, the electronic device 500 may include a display 510 (e.g., the display 301 in FIG. 4A), a foldable housing 520 (e.g., the first housing structure 410 and the second housing structure 420 in FIG. 4A), a printed circuit board 530, a hinge structure 540, an antenna module 570, and a rear cover 580. Hereinafter, a detailed description of components overlapping those illustrated in FIGS. 4A and 4B (e.g., the display 510, the foldable housing 520, and the rear cover 580) will be omitted.

According to an embodiment of the disclosure, the display 510 may be exposed through a substantial portion of a front plate 511. In some embodiments of the disclosure, the shape of the display 510 may be substantially the same as the shape of the periphery of the front plate 511.

According to various embodiments of the disclosure, the foldable housing 520 may include a first housing 521 and a second housing 522 (e.g., the first housing structure 410 and the second housing structure 420 in FIG. 4A). According to an embodiment of the disclosure, the first housing structure 521 may include a first surface 521a and a second surface 521b facing away from the first surface 521a, and the second housing structure 522 may include a third surface 522(a) and a fifth surface 522(b) facing away from the third surface 522(a). The foldable housing 520 may additionally or alternatively include a bracket assembly. The bracket assembly may include a first bracket assembly 523 disposed on the first housing structure 521 and a second bracket assembly 524 disposed on the second housing structure 522. At least a portion of the bracket assembly, for example, a portion 525 including at least a portion of the first bracket assembly 523 and at least a portion of the second bracket assembly 524, may serve as a plate for supporting the hinge structure 540.

According to various embodiments of the disclosure, various electric elements may be disposed on the printed circuit board 530. For example, a processor (e.g., the processor 120 in FIG. 1), a memory (e.g., the memory 130 in FIG. 1), and/or an interface (e.g., the interface 177 in FIG. 1) may be mounted on the printed circuit board 530. The processor may include at least one of, for example, a central processing unit, an application processor, a graphics processor, an image signal processor, a sensor hub processor, or a communication processor. The memory may include, for example, a volatile memory or a nonvolatile memory. The interface may include, for example, a high-definition multimedia interface (HDMI), a universal serial bus (USB) interface, an SD card interface, and/or an audio interface. The interface may electrically or physically connect, for example, the electronic device 300 to an external electronic device, and may include a USB connector, an SD card/multimedia card MMC connector, or an audio connector.

According to various embodiments of the disclosure, the printed circuit board 530 may include a first circuit board 531 disposed on the first bracket assembly 523 side and a second printed circuit board 532 disposed on the second bracket assembly 524 side. The first circuit board 531 and the second printed circuit board 532 may be disposed in the space defined by the foldable housing 520, the bracket assembly, the first rear cover 581, and/or the second rear cover 582. Components for implementing various functions of the electronic device 500 may be mounted on the first printed circuit board 531 and the second printed circuit board 532. For example, a processor may be disposed on the first printed circuit board 531, and an audio interface may be disposed on the second printed circuit board 532.

According to various embodiments of the disclosure, a battery may be disposed adjacent to the printed circuit board 530 so as to supply power to the electronic device 500. At least a portion of the battery may be disposed to be substantially flush with, for example, the printed circuit board 530. According to an embodiment of the disclosure, a first battery 533 may be disposed adjacent to the first printed circuit board 531, and a second battery 534 may be disposed adjacent to the second printed circuit board 532. The battery is a device for supplying power to at least one component of the electronic device 500, and may include, for example, a non-rechargeable primary battery, a rechargeable secondary battery, or a fuel cell. The battery may be integrally disposed inside the electronic device 500, or may be detachably disposed on the electronic device 500.

According to various embodiments of the disclosure, the hinge structure 540 may be configured to support the foldable housing 520 and/or the bracket assembly such that the foldable housing 520 can rotate about a folding axis (e.g., the axis B in FIG. 4A). The hinge structure 540 may include a first hinge structure 541 disposed on the first printed circuit board 531 side and a second hinge structure 542 disposed on the second printed circuit board 532 side. The hinge structure 540 may be disposed between the first printed circuit board 531 and the second printed circuit board 532. According to an embodiment of the disclosure, the hinge structure 540 may be formed substantially integrally with a portion 525 including at least a portion of the first bracket assembly 523 and at least a portion of the second bracket assembly 524.

According to various embodiments of the disclosure, the antenna module 570 may include a first antenna module 571 and a second antenna module 572 disposed between the rear cover 580 and the battery. The antenna module 570 may include, for example, a nearfield communication (NFC) antenna, a wireless charging antenna, and/or a magnetic secure transmission (MST) antenna. The antenna module 570 may perform short-range communication with, for example, an external electronic device, or may transmit/receive power required for charging to/from the external device in a wireless manner. In another embodiment of the disclosure, an antenna structure may be formed by a portion of a side bezel structure of the foldable housing 520, a portion of a bracket assembly, or a combination thereof.

According to various embodiments of the disclosure, the rear cover 580 may include a first rear cover 581 and a second rear cover 582. The rear cover 580 may be coupled to the foldable housing 520 so as to protect the above-described components (e.g., the printed circuit board 530, the battery, and the antenna module 570) disposed inside the foldable housing 520. As described above, the rear cover 580 may be configured substantially integrally with the foldable housing 520.

Figure 6A:
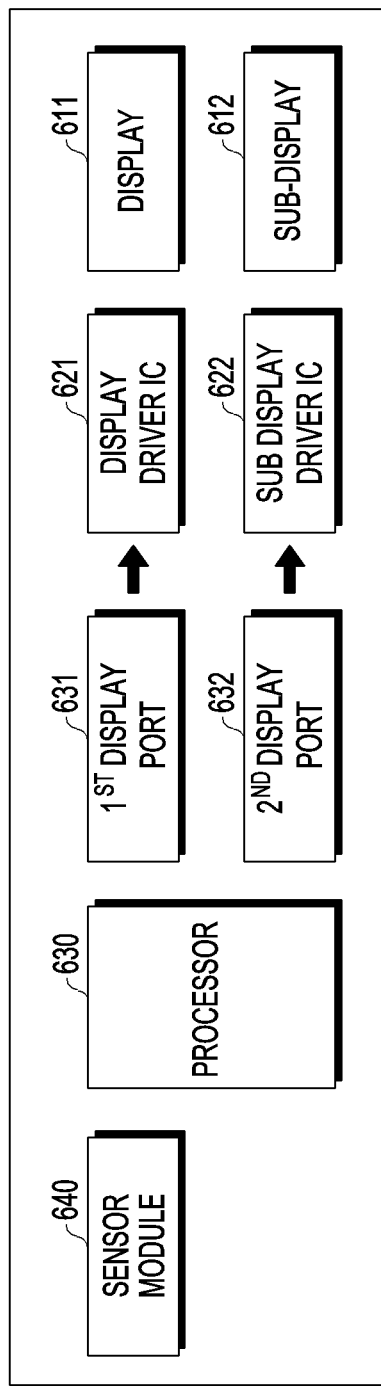
FIG. 6A is a block diagram of an electronic device according to an embodiment of the disclosure.

FIG. 6A is a block diagram of an electronic device according to an embodiment of the disclosure.

Referring to FIG. 6A, an electronic device (e.g., the electronic device 101 in FIG. 1, the electronic device 300 in FIG. 3A, the electronic device 400 in FIG. 4A, or the electronic device 500 of FIG. 5) may include a display device 611, a sub-display 612, a display driver IC (DDI) 621, a sub-DDI 622, a sensor module 640, or a processor 630.

According to various embodiments of the disclosure, the display 611 (e.g., the display 301 in FIG. 4A) may be disposed on the inner surface portions of a foldable housing that face each other when the electronic device 400 is folded. For example, the display 611 may be disposed on the first surface of the first housing structure 410 and the third surface of the second housing 420 such that the portions of the display 611 face each other when the electronic device 400 is in the folded state. For example, the display 611 may extend from the first surface to the third surface so as to form the first surface and the third surface.

According to various embodiments of the disclosure, the sub-display 612 (e.g., the sub-display 470 in FIG. 4B) may be exposed through at least a portion of the outer surface of the foldable housing when the electronic device 400 is in the folded state. For example, the sub-display 612 may be disposed to be visible through at least a portion of the second surface of the first housing structure 410 or the fourth surface of the second housing structure 420. For example, the sub-display 612 may be visible through at least a portion of the second surface or through at least a portion of the fourth surface.

According to various embodiments of the disclosure, the DDI 621 may include an interface module (not illustrated), a memory (e.g., buffer memory) (not illustrated), an image-processing module (not illustrated), or a mapping module (not illustrated). The DDI 621 may receive, for example, video data, or video information including a video control signal corresponding to an instruction for controlling the video data, from other components of the electronic device 400 via the interface module. For example, the DDI 621 may receive the video information from the processor 630 or an auxiliary processor (not illustrated) (e.g., a graphics-processing device) operated independently from the function of the processor 630. According to an embodiment of the disclosure, the DDI 621 may communicate with a touch circuit, a sensor module 640, or the like via the interface module. According to an embodiment of the disclosure, the DDI 621 may store at least a part of the received video information in the memory, for example, in frame units.

According to various embodiments of the disclosure, an image-processing module (not illustrated) may perform pre-processing or post-processing (e.g., adjustment of resolution, brightness, or size) on, for example, at least a part of the video data based at least on the characteristics of the video data or the characteristics of the display 611.

According to various embodiments of the disclosure, a mapping module (not illustrated) may generate a voltage value or a current value corresponding to the video data pre-processed or post-processed via the image-processing module. According to an embodiment of the disclosure, the generation of the voltage value or the current value may be performed based at least on, for example, the attributes of the pixels of the display 611 (e.g., the array of pixels (an RGB stripe or pentile structure) or the size of each of sub-pixels). At least some of the pixels of the display 611 are driven based at least partially on, for example, the voltage value or the current value, so that visual information (e.g., text, images, or icons) corresponding to the video data can be displayed through the display 611.

According to various embodiments of the disclosure, the sub-DDI 622 may drive the sub-display 612 so as to display an image based on image information received from the processor 630. According to an embodiment of the disclosure, the sub-DDI 622 differs from the main DDI 621 only in that it drives the sub-display 612, and may include components which are the same or similar to those of the main DDI 621. For example, the sub-DDI 622 may include an interface module, a memory (e.g., buffer memory), an image-processing module, or a mapping module so as to perform a function similar to that of the DDI 621.

According to various embodiments of the disclosure, the sensor module 640 may include an acceleration sensor, an angular velocity sensor (e.g., a gyro sensor), or a geomagnetic sensor. When a change in the state of the housing of the electronic device (e.g., a change in angle between the housings) is detected using the sensor module 640, information about the change may be transmitted to the processor.

According to various embodiments of the disclosure, the processor 630 may include a first display port 631 operatively connected to the DDI 621, and a second display port 632 operatively connected to the sub-DDI 622. Alternatively, the first display port 631 operatively connected to the DDI 621 and the second display port 632 operatively connected to the sub-DDI 622 may be provided separately from the processor 630. The processor 630 may transmit first image information to the DDI 621 through the first display port 631, and may transmit second image information to the sub-DDI 622 through the second display port 632. The processor 630 may identify the state information of the electronic device (e.g., an open mode or a half-folded mode to be described later) based on the information on the change in the states of the housings obtained from the sensor module 640, and may control applications to change an execution screen based on the identified state information. An operation in which the processor 630 controls applications to change an execution screen will be described later with reference to FIGS. 17 to 20.

Figure 6B:
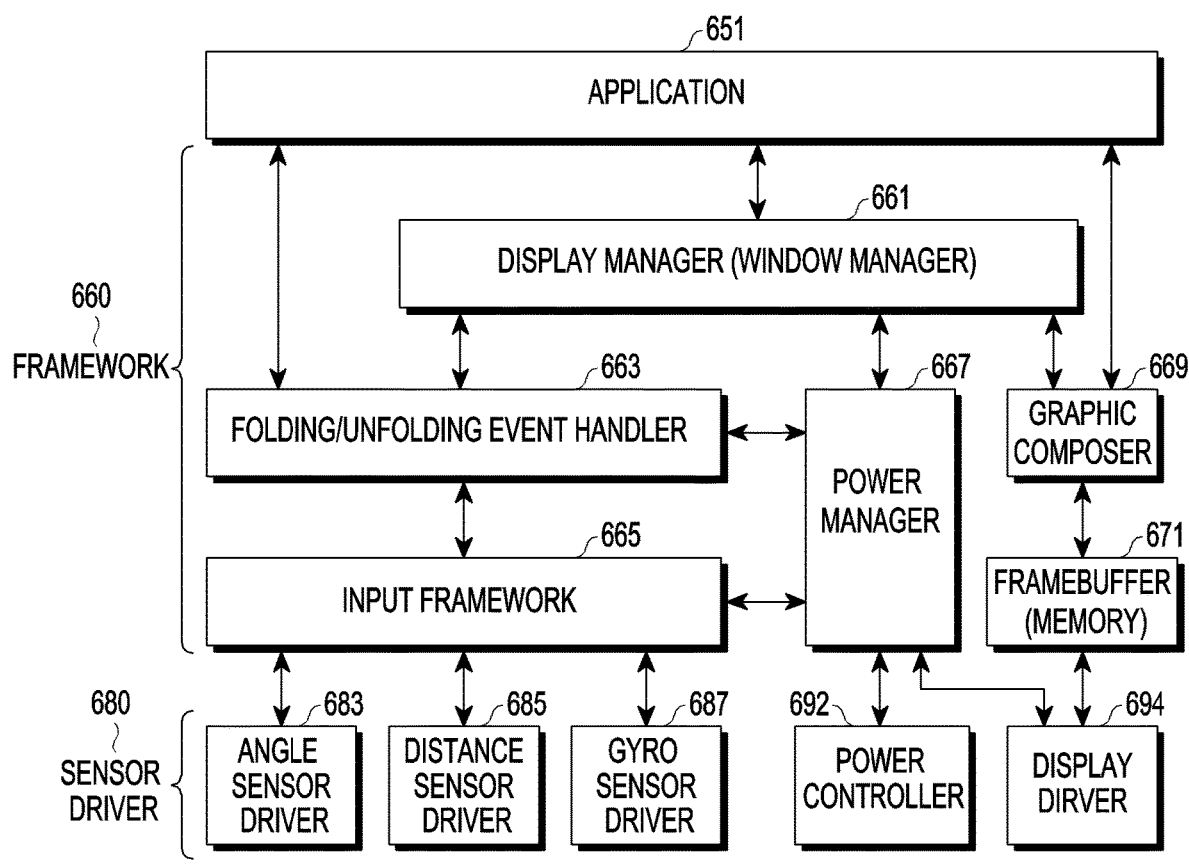
FIG. 6B is a view illustrating a situation in which a program included in an electronic device identifies a state change of an electronic device and outputs a result of identification to a display according to an embodiment of the disclosure.

FIG. 6B is a view illustrating a situation in which a program included in an electronic device identifies the state change of the electronic device and outputs a result of identification to a display according to an embodiment of the disclosure.

According to various embodiments of the disclosure, the first image information and the second image information may be the same. For example, the processor 630 may transmit image information including the same image data to the DDI 621 and the sub-DDI 622.

Referring to FIG. 6B, when an application 651 has a data base of at least one application executed in an electronic device (e.g., the electronic device 101 in FIG. 1, the electronic device 300 in FIGS. 3A and 3B, the electronic device 400 in FIG. 4A, or the electronic device 500 in FIG. 5), execution of a specific application may be requested in response to user input.

According to various embodiments of the disclosure, a display manager 661 (or a window manager) of a framework 660 may control the states of the displays 611 and 612. In addition, the display manager 661 (or the window manager) may determine the sizes, positions, or transparencies of the windows displayed on the displays 611 and 612, and may carry out a drawing control command for the windows. According to an embodiment of the disclosure, the display manager and the window manager may be implemented separately.

According to various embodiments of the disclosure, the power manager 667 of the framework 660 may manage the power state of all or some modules of the electronic device 400 in order to efficiently adjust the amount of current consumed by the electronic device 400. The management of the power state may be performed, for example, through control of a voltage or a clock frequency.

According to various embodiments of the disclosure, an input framework 665 of the framework 660 may receive various sensing values for measuring the unfolded/folded state of the electronic device 400. The input framework 665 may identify the sensing values acquired from one or more sensors, may determine the unfolded/folded state of the electronic device 400, and may transmit the determined result to the processor 630.

According to various embodiments of the disclosure, a folding/unfolding event handler 663 of the framework 660 may receive the unfolding/folding event of the electronic device 400 transmitted to the processor 630, and may control on/off of the display 611 and the sub-display 612 through a power manager 667.

According to various embodiments of the disclosure, a graphic composer 669 of the framework 660 may synthesize graphic information of each window of the displays 611 and 612 into a framebuffer 671. The framebuffer 671 may store graphic information to be output to the displays 611 and 612. Sensor drivers 680 (e.g., an angle sensor driver 683, a distance sensor driver 685, and a gyroscope sensor driver 687) may be software modules for controlling an integrated circuit (IC).

According to various embodiments of the disclosure, the electronic device 400 may determine a display to be activated in response to the change of the electronic device 400 from a first state to a second state.

For example, the sensor drivers 680 (e.g., one or more of the angle sensor driver 683, the distance sensor driver 685, and the gyroscope sensor driver 687) may transmit sensing values to the input framework 665. The input framework 665 may transmit information indicating that the electronic device 400 is in the second state to an folding/unfolding event handler 663 using the acquired sensing values.

According to various embodiments of the disclosure, the folding/unfolding event handler 663 may transmit a request for activation of the display 611 and deactivation of the sub-display 612 to the power manager 667 and the display manager 661 of the framework 660 based on, for example, the state of a currently running application, a pre-stored policy in response to a state change of the electronic device 400, and the activation/deactivation-permitted state of the displays 611 and 612.

According to various embodiments of the disclosure, in response to the request acquired from the folding/unfolding event handler 663, the power manager 667 of the framework 660 may activate the display 611 and may control the display driver 694 to deactivate the sub-display, together with a power controller 692. The deactivation of the sub-display 612 and the activation of the display 611 may be performed sequentially or simultaneously.

According to various embodiments of the disclosure, the operation of activating or deactivating the displays 611 and 612 may be performed by controlling the current applied to the displays 611 and 612 and controlling the brightness of the light source elements of the displays 611 and 612. The operation of activating or deactivating the displays 611 and 612 may be performed using both the power manager 667 and the display manager 661 or only one of the power manager 667 and the display manager 661.

According to various embodiments of the disclosure, in response to the request acquired from the folding/unfolding event handler 663, the display manager 661 may configure and display an image shown in the middle of changing to the active state, may control the positions and sizes of the windows displayed on the displays 611 and 612, may remove an image displayed and shown in the middle of changing the displays 611 and 612 from the inactive state to the active state, and may then display the windows on the displays 611 and 612.

Figure 7:
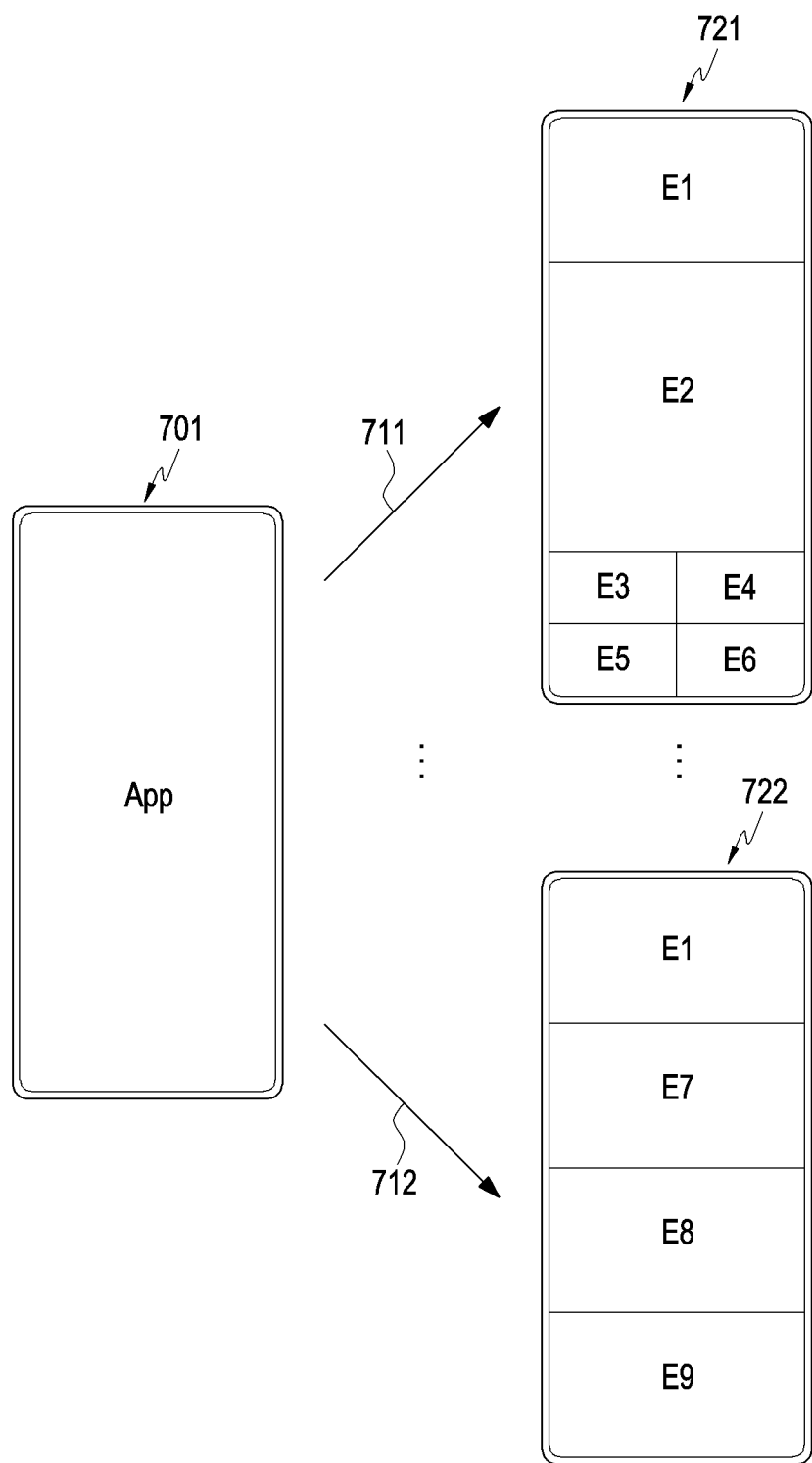
FIG. 7 is a view illustrating an execution screen and/or a user interface/user experience (UI/UX) of an application according to an embodiment of the disclosure.

FIG. 7 is a view illustrating an execution screen and/or a UI/UX of (e.g., 721, 722) of an application according to an embodiment of the disclosure.

Referring to FIG. 7, the application 701 may be various applications including a native application, a web application, and a hybrid application. For example, the application 701 may include a home, dialer, SMS/MMS, instant message (IM), browser, camera, alarm, address book, voice recognition, email, calendar, media player, album, watch, fitness (e.g., measurement of exercise or blood sugar), or environmental information (e.g., atmospheric pressure, humidity, or temperature information) application. According to an embodiment of the disclosure, the application may further include an information exchange application (not illustrated) capable of supporting information exchange between the electronic device and an external electronic device. The information exchange application may include, for example, a notification relay application configured to transmit designated information (e.g., a call, a message, or an alarm) to an external electronic device, or a device management application configured to manage the external electronic device. The notification relay application may transmit, for example, notification information corresponding to an event (e.g., mail reception) generated in another application (e.g., the email application) of the electronic device to an external electronic device, or may receive notification information from an external electronic device and may provide the notification information to the user of the electronic device 101. The device management application may control, for example, the power supply (e.g., turning on or off) of an external electronic device, which communicates with the electronic device, or some of the components (e.g., a display or a camera module) or functions (e.g., brightness, resolution, or focus of the display device or the camera module) of the external electronic device. The device management application may additionally or alternatively support the installation, deletion, or update of an application executed in an external electronic device.

According to various embodiments of the disclosure, the application 701 may include a plurality of states 711 and 712. The states may be functional units representing states or layers implemented to provide specific functions constituting the application. In other words, one application 701 may be implemented to provide a plurality of states 711 and 712. For example, a messaging application may include a first state implemented to provide a function for displaying an address book, and a second state implemented to provide a function for preparing a message. In other words, one application may be implemented to be executed in a specific state in order to provide a specific function, and to display an execution screen and/or a UI/UX (e.g., 721, 722) produced (or prepared) to provide a specific state.

The plurality of states included in the one application 701 may have information for accessing the plurality of states 711 and 712 (e.g., address information and reference information). Accordingly, when executing the application 701 in a specific state, the electronic device may identify information for accessing the specific state (e.g., address information), and may execute the application in the specific state based on the identified information.

The plurality of states 711 and 712 included in the one application 701 may be organically associated with each other. For example, one state and another state may be associated such that the one application 701 is changed from the one state to the other state.

According to various embodiments of the disclosure, the one application 701 may be implemented to provide an execution screen and/or a UI/UX (e.g., 721, 722) including at least one graphic element. For example, the one application 701 may be implemented to provide an execution screen and/or a UI/UX (e.g., 721, 722) including at least one element prepared in advance. In addition, for example, the one application 701 may be configured to reconfigure at least one element based on information about the at least one element (e.g., information on the type and attribute of the element, and information indicating the locations where the element is displayed), and to provide a reconfigured execution screen and/or a UI/UX (e.g., 721, 722).

According to various embodiments of the disclosure, as illustrated in FIG. 7, the one application may include an execution screen and/or a UI/UX (e.g., 721, 722) including at least one graphic element for each state 711 or 712. In other words, the one application may be implemented to provide (or display) an execution screen and/or a UI/UX (e.g., 721, 722) including at least one graphic element for each state 711 or 712. For example, in order to provide a specific state, an execution screen and/or a UI/UX (e.g., 721, 722) of an application including at least one graphic element may be prepared. Accordingly, when the application is executed in a specific state, the electronic device may display an execution screen and/or a UI/UX (e.g., 721, 722) of an application prepared to provide a specific state. As an example, as illustrated in FIG. 7, the application may be implemented to display an execution screen 721 including first to sixth elements E1 to E6 for providing a first function in the first state 711, and may be implemented to display an execution screen 722 including a first element E1 and seventh to ninth elements E7 to E9 for providing a second function in the second state 712.

When changing from one state to another state, the one application 701 may display a first execution screen corresponding to the one state and may then display a second execution screen corresponding to the other state. For example, when input for changing to another state is received on the first execution screen (e.g., upon receiving input for a specific element for calling another state) while a first execution screen corresponding to one state is being displayed, the one application 701 may display the second execution screen corresponding to the other state. The specific element may be implemented such that the application 701 is executed according to the other state according to information for accessing the other state.

In addition, according to various embodiments of the disclosure, the one application 701 may include an execution screen and/or a UI/UX (e.g., 721, 722) for each of various modes associated with specific states. The various modes may be modes respectively set for various states of the electronic device.

For example, the various modes may include a mode set for each rotated state (or orientation) of the electronic device. For example, the electronic device may be set to a horizontal mode based on the state in which the electronic device is rotated to a horizontal orientation, and may be set to a vertical mode based on the state in which the electronic device is rotated to a vertical orientation. In other words, states for providing specific functions of an application may include an execution screen and/or a UI/UX (e.g., 721, 722) displayed based on the fact that the electronic device is in one mode (e.g., the horizontal mode), and an execution screen and/or a UI/UX (e.g., 721, 722) displayed based on the fact that the electronic device is in another mode (e.g., the vertical mode). Accordingly, an application 701 may display execution screens corresponding to various modes of the electronic device.

In addition, for example, the various modes may include modes related to the states of two or more housings (e.g., angles between the housings) provided in the electronic device, which will be described later with reference to FIG. 15. In this case, an application implemented to provide an execution screen and/or a UI/UX (e.g., 721, 722) for each mode related to the state of the housings may be defined as an application supporting a function of changing an execution screen according to a change in angle.

According to various embodiments of the disclosure, the graphic elements may include various visual objects or content that can be displayed on an execution screen. For example, the graphic elements may include various boxes including lists, combo boxes, and check boxes for providing various functions that can be arranged on an execution screen and/or a UI/UX (e.g., 721, 722), various buttons including toggle buttons and radio buttons, and various objects including tool bars, dials, sliders, input fields, drop-down menus, and progress bars. In addition, for example, the graphic elements may include content (e.g., multimedia content) that can be provided to the user in visual, audible, and tactile manners. For example, the content may include web content, video content, image content, and the like.

According to various embodiments of the disclosure, the elements may have information indicating the positions of the elements in the execution screen (e.g., coordinate values).

According to various embodiments of the disclosure, a graphic element may have at least one attribute. The at least one attribute may include an attribute, such as a name. Based on the attributes of the graphic elements, the graphic elements may be classified into an element group for providing a visual view or an element group for providing a specific function. For example, graphic elements having a name attribute, such as multimedia content, may be classified into an element group for providing a visual view, and graphic elements having a name attribute, such as an icon, a box, or a toggle button, may be classified into an element group for providing a specific function. An electronic device may identify the attribute of a graphic element and may rearrange the position of the graphic element included in the execution screen based on the identified attribute of the graphic element, which will be described later with reference to FIGS. 21 to 25.

In order to cause the operations of an electronic device 101 according to various embodiments described below (e.g., electronic devices having a form factor illustrated in FIGS. 2A-2K, the electronic device 300 of FIG. 3A, the electronic device 400 of FIG. 4A, and the electronic device 500 in FIG. 5) to be performed, a processor 120 or 630 may control the components of the electronic device 101. In addition, when instructions or codes stored in the memory are executed, the processor 120 or 630 may be controlled such that the operations of the electronic device 101 according to various embodiments are performed.

Hereinafter, operations of the electronic device 101 according to various embodiments will be described.

According to various embodiments of the disclosure, the electronic device 101 may display an execution screen of an application according to an angle between the housings (e.g., the first housing structure 521 and the second housing structure 522).

Figure 8:
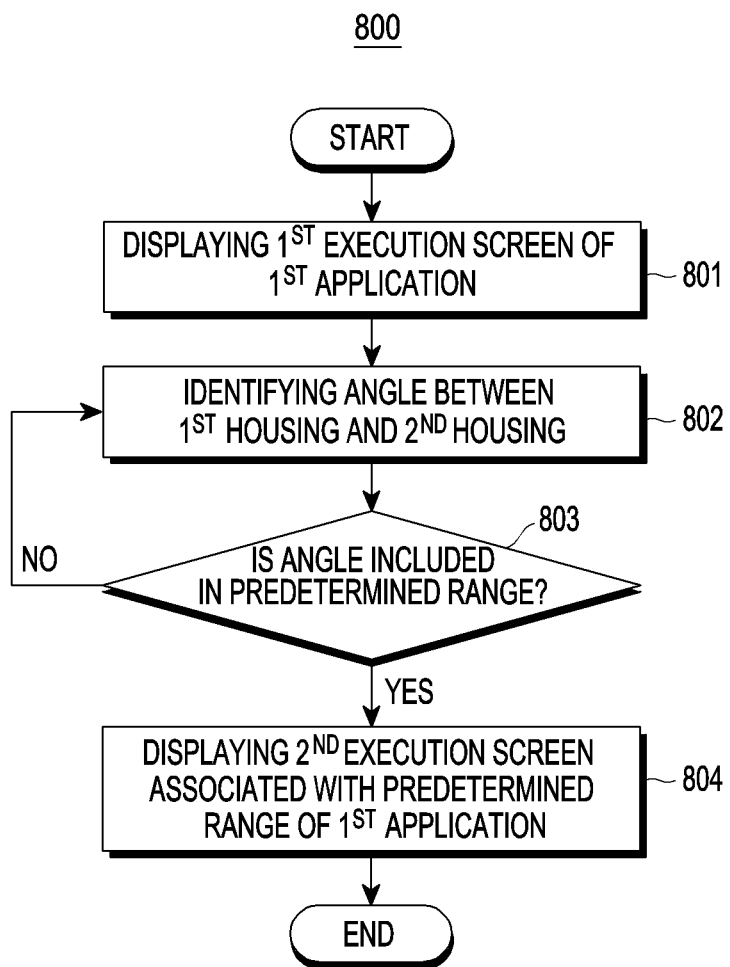
FIG. 8 is a flowchart illustrating operations of an electronic device according to an embodiment of the disclosure.

FIG. 8 is a flowchart 800 illustrating operations of an electronic device 101 according to an embodiment of the disclosure.

Referring to FIG. 8, the operations are not limited to the illustrated order, and may be performed in various orders. In addition, according to various embodiments of the disclosure, a greater or smaller number of operations than the operations illustrated in FIG. 8 may be performed. Hereinafter, the operations of FIG. 8 will be described with reference to FIGS. 9 and 10.

Figure 9:
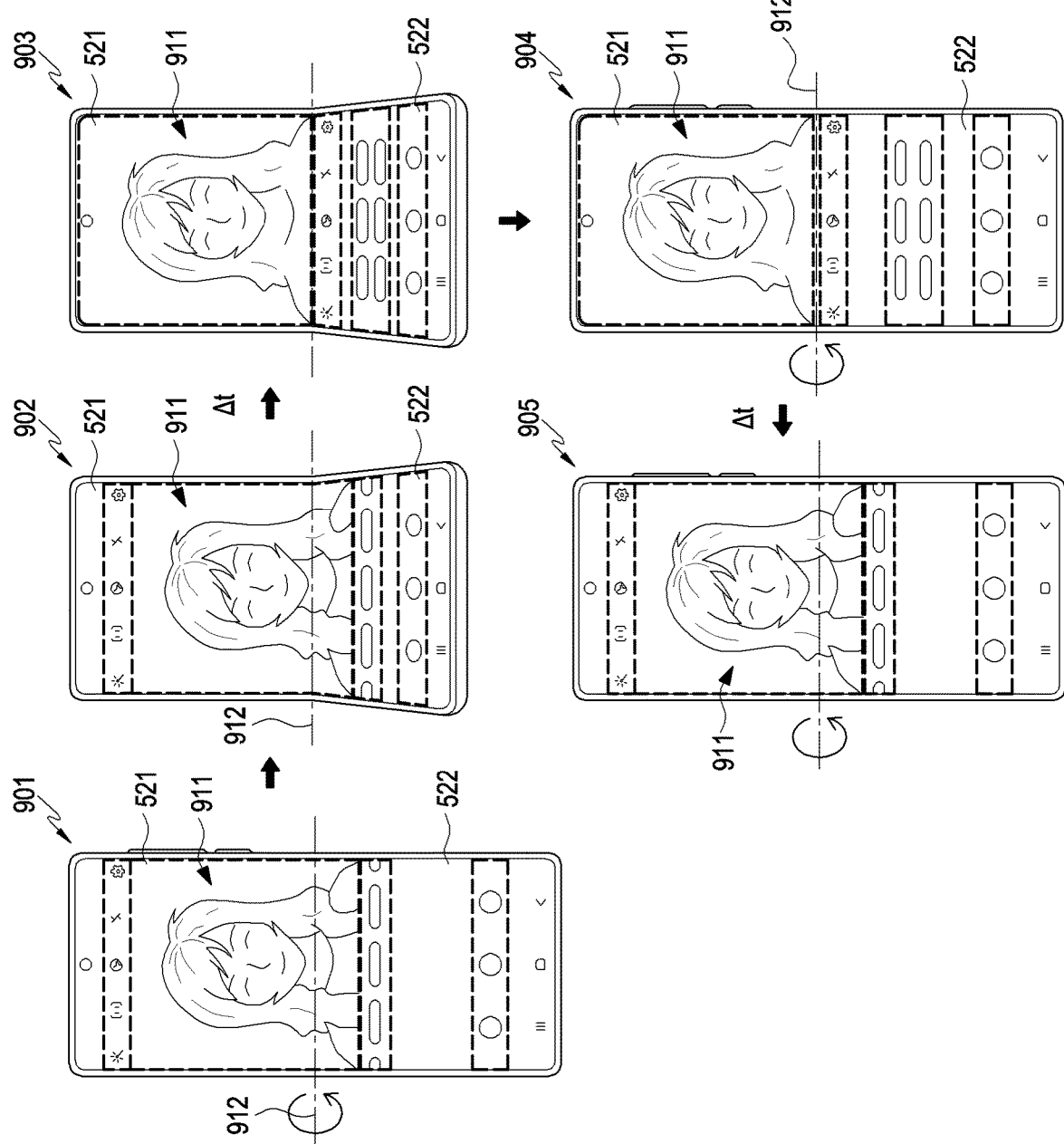
FIG. 9 is a view illustrating operations of an electronic device according to an embodiment of the disclosure.

FIG. 9 is a view illustrating operations of an electronic device 101 according to an embodiment of the disclosure.

Figure 10:
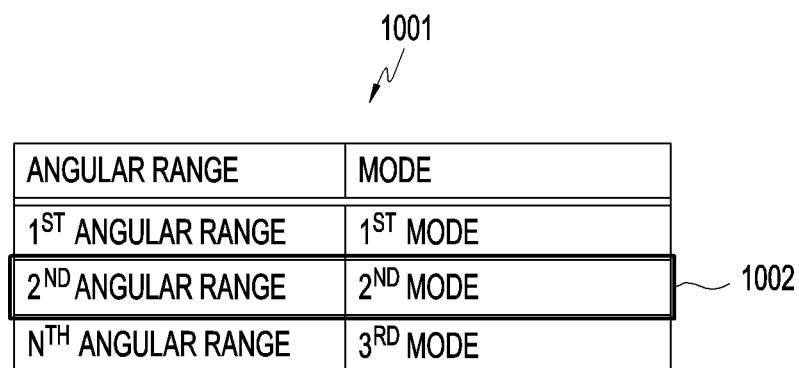
FIG. 10 is a view illustrating modes of an electronic device associated with angles between housings (e.g., a first housing and a second housing) of an electronic device according to an embodiment of the disclosure.
Figure 10:
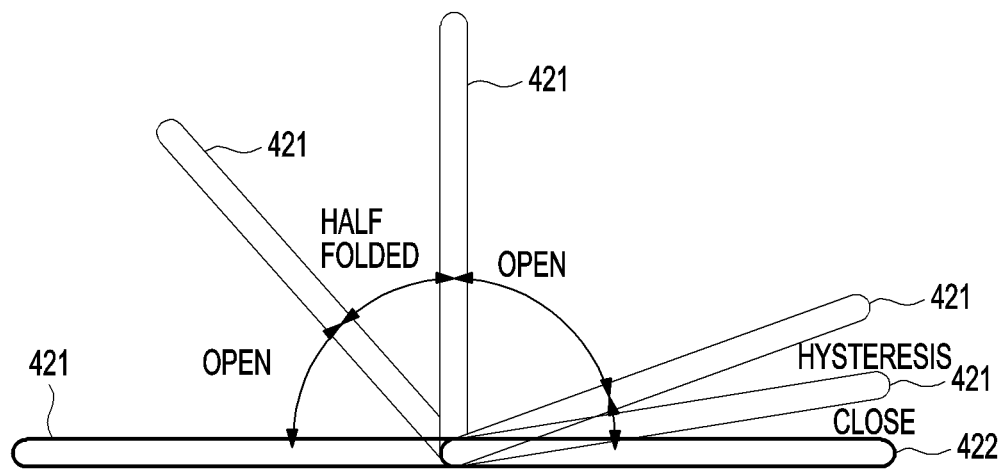
Figure 11:
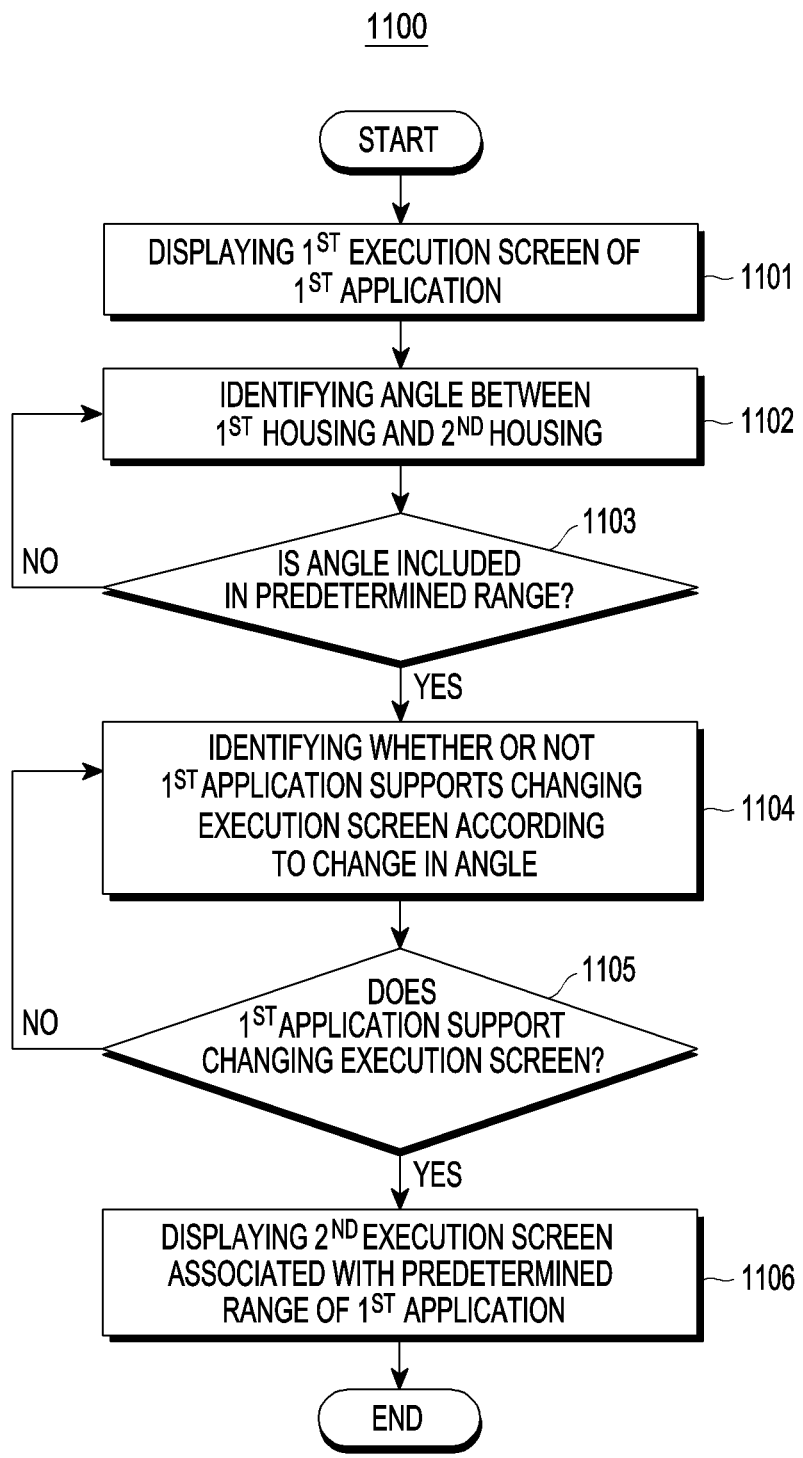
FIG. 11 is a flowchart illustrating operations of an electronic device according to an embodiment of the disclosure.

Referring to FIG. 9, the dotted lines indicate elements included in execution screens. The execution screen is not limited to those illustrated in FIG. 9, and may further include additional elements, or may include fewer elements. FIG. 10 is a view illustrating modes of an electronic device 101 associated with angles between housings (e.g., a first housing 521 and a second housing 522) of the electronic device according to an embodiment of the disclosure. FIG. 11 is a flowchart illustrating operations of illustrating electronic device according to an embodiment of the disclosure.

According to various embodiments of the disclosure, the electronic device 101 (e.g., at least one processor 120) may display a first execution screen 911 of a first application in operation 801. For example, the electronic device 101 may acquire events for executing the first application (e.g., an application automatic execution event based on icon selection for executing the first application, executing the first application, by the electronic device 101, without the selection of the icon, and a lock screen execution event based on the locked state of the electronic device 101). In response to an acquired event, the electronic device 101 may execute the first application, and may display the first execution screen 911 of the first application, as illustrated in 901 of FIG. 9.

According to various embodiments of the disclosure, the first execution screen 911 may be an execution screen corresponding to any one of various states of the electronic device 101. For example, the first execution screen 911 may be an execution screen displayed according to the rotated state (or orientation) of the electronic device 101. For example, the first execution screen 911 may be an execution screen corresponding to a horizontal mode or a vertical mode. In other words, the electronic device 101 may identify whether it is in the horizontal mode or the vertical mode according to the rotated state thereof, and may display the first execution screen 911 corresponding to the horizontal mode of the first application or the first execution screen 911 corresponding to the vertical mode. For example, the first execution screen 911 may be an execution screen displayed according to the states of the housings of the electronic device 101 (e.g., the angle between the housings). An execution screen displayed according to the states of the housings of the electronic device 101 will be described later.

According to various embodiments of the disclosure, the first execution screen 911 may be an execution screen corresponding to the first state of the first application. In other words, the electronic device 101 may display an execution screen for providing a first function among a plurality of execution screens. A redundant description of the states of applications will be omitted.

According to various embodiments of the disclosure, the electronic device 101 (e.g., at least one processor 120) may identify the angle between the first housing structure 521 and the second housing structure 522 in operation 802, and may identify whether or not the angle falls within a predetermined range in operation 803. For example, as illustrated in 901 and 902 in FIG. 9, when at least one of the housings is rotated about a rotation axis 912 (e.g., a hinge) in a predetermined direction (e.g., clockwise or counterclockwise), the electronic device 101 may identify the angle formed between the housing structures (e.g., 521, 522) by the rotation, and may identify the range within which the identified angle falls.

According to various embodiments of the disclosure, the electronic device 101 (e.g., at least one processor 120) may identify the angle between the first housing structure 521 and the second housing 5 structure 22 using a sensor module. For example, the electronic device 101 may detect the distance between the first housing structure 521 and the second housing structure 522 using a magnetic sensor (e.g., a Hall sensor) so as to determine whether or not the first housing structure 521 or the second housing structure 522 is rotated in one direction (e.g., clockwise or counterclockwise) about the rotation axis 912 (e.g., a hinge). In addition, for example, the electronic device 101 may detect the angle between the first housing structure 521 and the second housing structure 522 using at least one motion sensor (e.g., an acceleration sensor or a gyro sensor). A redundant description of the operation of detecting the rotation of the housings and the angle between the housings using the sensor module of the electronic device 101 will be omitted.

According to various embodiments of the disclosure, the electronic device 101 (e.g., at least one processor 120) may identify the states of the housings (e.g., the first housing structure 521 and the second housing structure 522) (e.g., the angle between the first housing structure 521 and the second housing structure 522), and may identify a mode corresponding to the identified state. For example, as illustrated in 902 and 903 of FIG. 9, the electronic device may identify the angle between the first housing structure 521 and the second housing structure 522, and, as illustrated in FIG. 10, the electronic device may identify a second mode 1002 corresponding to a second angular range, within which the identified angle falls, among a plurality of modes 1001.

For example, the electronic device 101 (e.g., at least one processor 120) may identify a mode corresponding to the angle between the housings (e.g., the first housing structure 521 and the second housing structure 522). As illustrated in FIG. 10, the electronic device 101 stores a plurality of modes 1001 associated with the angle between the first housing structure 521 and the second housing structure 522, and may identify a mode corresponding to the angle between the first housing structure 521 and the second housing structure 522. Each of the plurality of modes 1001 (e.g., a first mode and a second mode in FIG. 10) may correspond to a specific angular range (e.g., a first range and a second range in FIG. 10). For example, the plurality of modes 1001 may include a closed mode corresponding to an angular range between 0° and 10°, a hysteresis mode corresponding to an angular range between 11° and 20°, a first open mode corresponding to an angular range between 21° and 90°, a half-folded mode corresponding to an angular range between 91° and 130°, and a second open mode corresponding to an angular range between 131° to 180°. The hysteresis mode may be a mode set such that a predetermined event (e.g., an execution screen change event) does not occur depending on the angle between the first housing structure 521 and the second housing structure 522. Meanwhile, the angular ranges corresponding to respective a plurality of modes 1001 are not limited to those described above, and may be variously set. In addition, the specific angular ranges may include a specific range from one angle to another angle, or may include only a specific angle. For example, the first mode (e.g., an open mode) may be set to correspond to a specific angle (e.g., 180°) or a specific angular range (e.g., between 131° and 180°). In addition, angular ranges that respectively correspond to the plurality of modes 1001 may be set differently depending on whether the electronic device 101 is in contact with a support surface, which will be described later with reference to FIGS. 28 to 29.

According to various embodiments of the disclosure, the "mode" may conceptually include an information unit to be used by the electronic device 101 (e.g., at least one processor 120) for identifying the states of the housings provided in the electronic device 101. Accordingly, the electronic device 101 is capable of providing service corresponding to the current states of the housings (e.g., the angle between the housings) to the user by controlling the overall operation of the electronic device 101 based on the current mode.

The various embodiments are not limited to the above description, and the above description is also applicable mutatis mutandis to the case in which more than two housings are provided. For example, when the electronic device 101 is provided with three housings (e.g., a first housing 521, a second housing 522, and a third housing), a first mode corresponding to a first angle between the first housing structure 521 and the second housing structure 522 and a second angular range between the second housing structure 522 and the third housing may be determined.

Hereinbelow, for convenience of description, when the first angle falls within a predetermined range, the current angle will be described as falling within an angular range corresponding to a half-folded mode. Accordingly, the following description is also applicable mutatis mutandis not only to the case in which the current angle falls within the angular range corresponding to the half-folded mode, but also to the case in which the current angle falls within an angular range corresponding to another mode.

According to various embodiments of the disclosure, the electronic device 101 (e.g., at least one processor 120) may identify the angle between the first housing structure 521 and the second housing structure 522 at various time points.

For example, when rotation of at least one of the first housing structure 521 and the second housing structure 522 is initiated (e.g., clockwise or counterclockwise), the electronic device 101 (e.g., at least one processor 120) may identify the angle between the first housing structure 521 and the second housing structure 522.

For example, while at least one of the first housing structure 521 and the second housing structure 522 starts to rotate (e.g., clockwise or counterclockwise) about the rotation axis 912 (e.g., the hinge) and rotates, the electronic device 101 (e.g., at least one processor 120) may continuously identify the angle between the first housing structure 521 and the second housing structure 522. As another example, at the time point at which the rotation of at least one of the first housing structure 521 and the second housing structure 522 is stopped after starting to rotate around the rotation axis 912, the electronic device 101 may identify the angle between the first housing structure 521 and the second housing structure 522.

In addition, for example, the electronic device 101 (e.g., the at least one processor 120) may identify the angle between the first housing structure 521 and the second housing structure 522 at a predetermined period, regardless of the rotation of at least one of the first housing structure 521 and the second housing structure 522.

According to various embodiments of the disclosure, the electronic device 101 (e.g., at least one processor 120) may display a second execution screen 913 the first application associated with the predetermined range of in operation 804. For example, when the current angle falls within the second angular range (e.g., 91° to 130°) shown in FIG. 10, the electronic device 101 may identify the second mode corresponding to the second angular range (e.g., a half-folded mode), and may display the second execution screen 913 associated with the second mode of the first application. As an example, when the angle between the first housing structure 521 and the second housing structure 522 is a specific angle (e.g., 120°), the electronic device 101 may identify that the angle falls within a specific range (e.g., 91° to 130°), and may identify the half-folded mode corresponding to the specific range. Based on the identified half-folded mode, the electronic device 101 may display the execution screen of the first application as the second execution screen 913 corresponding to the half-folded mode.

According to various embodiments of the disclosure, the second execution screen 913 may be the execution screen set to be displayed in a mode associated with the predetermined range of the first state of the first application (e.g., the half-folded mode). In other words, the first application may be implemented to provide, in the first state for providing the first function, the first execution screen 911 associated with the horizontal mode or the vertical mode and the second execution screen 913 associated with the mode corresponding to the predetermined range (e.g., the half-folded mode). Accordingly, when the angle between the housings falls within the predetermined range while the first application is running in the first state, the electronic device 101 may control the first application to display the second execution screen 913 associated with the predetermined range corresponding to the first state of the first application. For example, the first application may be set to provide various execution screens (e.g., the first execution mode 911 and the second execution mode 913) for respective modes for one state (e.g., the first state). The electronic device 101 may identify in advance that the first application is capable of providing various execution screens for respective modes for one state. When mode switching (e.g., switching to the half-folded mode) is detected, the electronic device 101 may provide information associated with the mode switching to the first application, and may display the second execution screen 913 in response thereto. Regarding the above-described switching display of screens provided by an application, there is no limitation on the method by which the electronic device 101 provides execution screens for respective modes.

An execution screen associated with a mode corresponding to a predetermined range of an application (e.g., the half-folded mode) will be described later.

According to various embodiments of the disclosure, when the angle between the first housing structure 521 and the second housing structure 522 falls within the predetermined range, the electronic device 101 (e.g., at least one processor 120) may identify whether or not a predetermined condition is satisfied, and may display the second execution screen 913 when it is identified that the specific condition is satisfied. The predetermined condition to be satisfied may include a condition associated a rotating speed of at least one of the first housing structure 521 and the second housing structure 522 or a lapse of a predetermined time from a specific point in time.

For example, when the rotating speed of at least one of the first housing structure 521 or the second housing structure 522 increases beyond a preset value and then decreases to a value equal to or smaller than the preset value, the electronic device 101 (e.g., at least one processor 120) may display the second execution screen 913. For example, when the rotating speed exceeds 0 and then returns to 0, the electronic device 101 may display the second execution screen 913. As another example, when the occurrence of acceleration of the rotating speed is detected, the electronic device 101 may display the second execution screen 913. In other words, when the rotational speed is maintained at a certain level (e.g., within a preset range) and is then changed, the electronic device 101 may display the second execution screen 913. For example, when a predetermined time Δt elapses after the rotation of at least one of the first housing structure 521 and the second housing structure 522 is stopped, the electronic device 101 may display the second execution screen 913. Without being limited to the above description, the predetermined condition to be satisfied may be associated with whether or not the electronic device 101 is in contact with a support surface, which will be described later with reference to FIG. 25.

According to various embodiments of the disclosure, when displaying the second execution screen 913 in place of the first execution screen 911, the electronic device 101 (e.g., the at least one processor 120) may provide various kinds of effects. The various kinds of effects may include a visual effect, an auditory effect, or a tactile effect. For example, when displaying the second execution screen 913 in place of the first execution screen 911, the electronic device 101 may display a visual effect of changing the screen (e.g., an animation in which the first execution screen 911 gradually changes to the second execution screen 913) and the second execution screen 913. Alternatively, when displaying the second execution screen 913 in place of the first execution screen 911, the electronic device 101 may output audio notifying of the change of execution screens through a speaker, and may display the second execution screen 913. Meanwhile, when the first execution screen 911 is changed to the second execution screen 913, the electronic device 101 may cause the graphic elements included in the first execution screen 911 to be moved, which will be described later with reference to FIGS. 22 to 24.

According to various embodiments of the disclosure, after the second execution screen 913 of the first application is displayed, when the angle between the first housing structure 521 and the second housing structure 522 is changed and falls within a range different from the previous range, the electronic device 101 (e.g., at least one processor 120) may display the execution screen associated with the other range. For example, when the angle between the first housing structure 521 and the second housing structure 522 is changed and the range within which the angle falls (e.g., 91° to 130°) falls another range, the electronic device 101 may identify another mode corresponding to the other range, and may display an execution screen associated with the identified other mode of the first application. As an example, as illustrated in 905 of FIG. 9, when the angle between the first housing structure 521 and the second housing structure 522 falls within the original angular range (e.g., 21° to 90°), the electronic device 101 may display the execution screen associated with the mode corresponding to the original angular range (e.g., an open mode).

According to various embodiments of the disclosure, as illustrated in 904 and 905 in FIG. 9, the electronic device 101 (e.g., at least one processor 120) may identify that a predetermined condition is satisfied (e.g., a preset time (Δt) from a specific time point), and may display an execution screen associated with another mode of the first application (e.g., open mode). A redundant description related to the satisfaction of specific conditions will be omitted. Meanwhile, a second predetermined condition to be satisfied may differ from that of the previous case. For example, upon switching from the mode corresponding to a predetermined range (e.g., a half-folded mode) back to the original mode (e.g., an open mode), the preset time (Δt) calculated from a specific point in time may be shorter. As described above, when switching to the original mode, since the execution screen is quickly returned to the execution screen corresponding to the original mode, which was originally provided to the user, the convenience with which the user uses the application execution screen can be improved. In addition, an operational burden for measuring the preset time Δt of the electronic device 101 can be reduced.

Hereinafter, other operations of the electronic device 101 according to various embodiments will be described.

According to various embodiments of the disclosure, when the angle between the housings falls within a predetermined range, the electronic device 101 may identify a designated application among currently running applications, and may control the identified designated application to change the execution screen to an execution screen corresponding to the predetermined range.

FIG. 11 is a flowchart 1100 illustrating operations of an electronic device 101 according to an embodiment of the disclosure. According to various embodiments of the disclosure, the operations illustrated in FIG. 11 are not limited to the illustrated order, and may be performed in various orders. In addition, according to various embodiments of the disclosure, a greater or smaller number of operations than the operations illustrated in FIG. 11 may be performed. Hereinafter, the operations of FIG. 11 will be described with reference to FIGS. 12 and 13.

Figure 12:
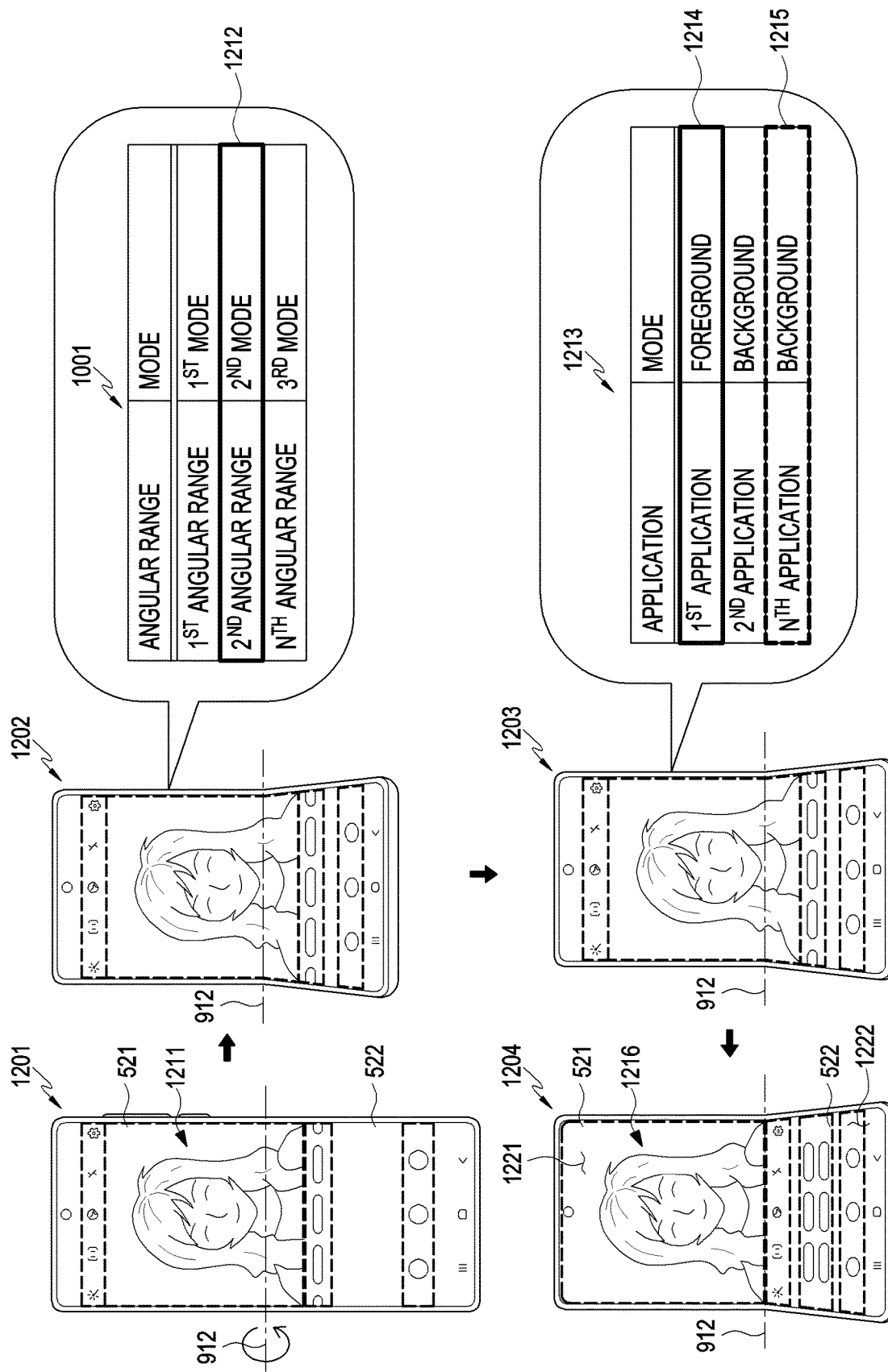
FIG. 12 is a view illustrating operations of an electronic device according to an embodiment of the disclosure.
Figure 13:
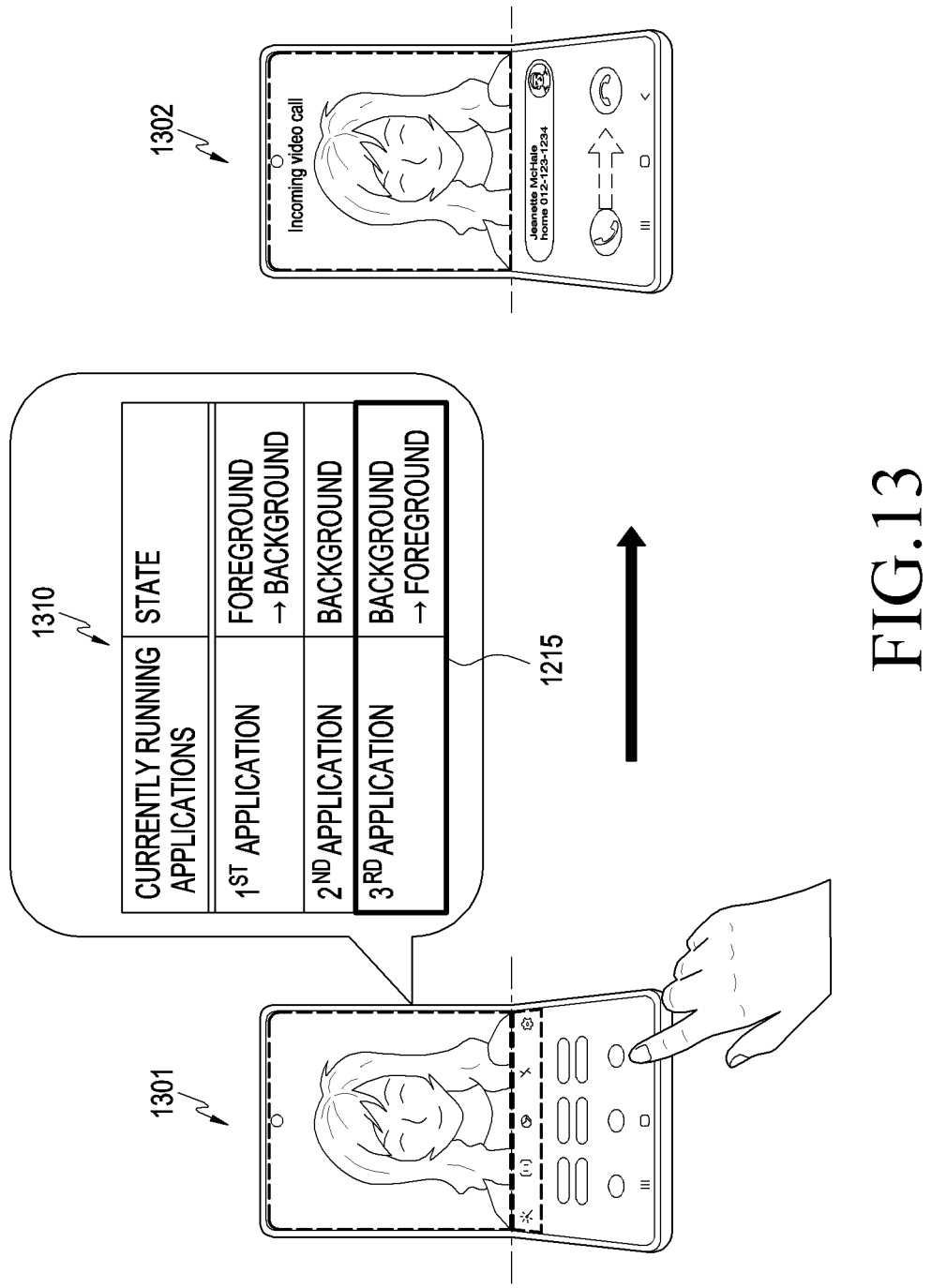
FIG. 13 is a view illustrating operations performed when an application that has been running in a background mode of an electronic device is executed in a foreground mode of an electronic device according to an embodiment of the disclosure.

FIG. 12 is a view illustrating operations of the electronic device 101 according to an embodiment of the disclosure. FIG. 13 is a view illustrating operations performed when an application that has been running in a background mode of the electronic device 101 is executed in a foreground mode of the electronic device 101 according to an embodiment of the disclosure. The dotted lines shown in FIGS. 12 and 13 indicate elements included in execution screens. The execution screens are not limited to those illustrated in FIGS. 12 and 13, and may further include additional elements, or may include fewer elements.

According to various embodiments of the disclosure, the electronic device 101 (e.g., at least one processor 120) may display a first execution screen 1211 of a first application in operation 1101. For example, as illustrated in 1201 of FIG. 12, the electronic device 101 may execute a first application, and may display a first execution screen 1211 of the first application. Since operation 1101 of the electronic device 101 may be performed in the same manner as operation 801 of the electronic device 101 described above, a redundant description will be omitted.

According to various embodiments of the disclosure, the electronic device 101 (e.g., at least one processor 120) may execute a plurality of applications in various states (or various process-processing modes). The various states may include a foreground mode and a background mode. When executing an application based on the foreground mode, the electronic device 101 may display the execution screen of the executed application on the display, and when executing the application based on the background mode, the electronic device 101 may execute the application, but may not display the execution screen. For example, as illustrated in 1203 of FIG. 12, the electronic device 101 may execute the first application in the foreground mode, and may execute second and third applications in the background mode. Switching between the foreground mode and the background mode may be performed. For example, when the state of an application is switched from the foreground mode to the background mode, the execution screen of the application may not be displayed, and when the state of another application is switched from the background mode to the foreground mode, the execution screen of the other application may be displayed.

According to various embodiments of the disclosure, the electronic device 101 (e.g., at least one processor 120) may identify the angle between the first housing structure 521 and the second housing structure 522 in operation 1102, and may identify whether or not the angle falls within a predetermined range in operation 1103. For example, as illustrated in 1202 of FIG. 12, the electronic device 101 may identify that the angle falls within the second angular range (e.g., 91° to 130°), and may identify a second mode 1212 (e.g., a half-folded mode) corresponding to the second angular range among a plurality of modes 1001 corresponding to a plurality of angular ranges. Since operations 1102 and 1103 of the electronic device 101 may be performed in the same manner as operations 802 and 803 of the electronic device 101 described above, a redundant description thereof will be omitted.

According to various embodiments of the disclosure, in operation 1104, the electronic device 101 (e.g., the at least one processor 120) may identify whether or not the first application supports changing of an execution screen according to a change in angle. For example, the electronic device 101 may cause the execution screen of an application that supports changing of an execution screen according to a change in angle to be changed, and in the case in which an application does not support changing of an execution screen according to a change in angle, the electronic device 101 may cause the currently running screen to be maintained.

According to various embodiments of the disclosure, the electronic device 101 (e.g., at least one processor 120) may identify whether or not any of a plurality of currently running applications supports changing of an execution screen according to a change in angle. For example, the electronic device 101 may store therein a list including one or more designated applications that support changing of an execution screen according to a change in angle. The operations of the electronic device 101 for storing the list will be described later with reference to FIGS. 15 and 16. The electronic device 101 may identify at least one application that supports changing of an execution screen according to a change in angle among a plurality of currently running applications based on at least one designated application included in the list.

According to various embodiments of the disclosure, when it is identified in operation 1105 that the first application supports changing of an execution screen according to a change in angle, the electronic device 101 (e.g., at least one processor 120) may display a second execution screen 1216 associated with the predetermined range of the first application in operation 1106 as illustrated in 1203 of FIG. 12. For example, as illustrated in 1203 of FIG. 12, the electronic device 101 may identify applications that support changing of an execution screen according to a change in angle among the plurality of currently running applications 1213 (e.g., a first application 1214 and a third application 1215), and may control the first application 1214, which is running in the foreground mode among the identified applications, to display the second execution screen 1216 corresponding to the predetermined range.

According to various embodiments of the disclosure, the second execution screen 1216 may be associated with the first execution screen 1211 and a specific state of an application. In other words, the first execution screen 1211 and the second execution screen 1216 may be execution screens of an application for providing a specific function, but may be execution screens displayed in different modes. For example, a plurality of elements included in the first execution screen 1211 may also be included in the second execution screen 1216 so as to provide a specific function. In other words, the number of elements included in the first execution screen 1211 and the number of elements included in the second execution screen 1216 may correspond (e.g., equal) to each other, and attributes of the elements included in the first execution screen 1211 and attributes of elements included in the second execution screen 1216 may correspond to (e.g., equal) each other.

According to various embodiments of the disclosure, the positions at which elements included in the second execution screen 1216 are displayed on the display and the positions at which elements included in the first execution screen 1211 are displayed on the display may be different from each other.

According to various embodiments of the disclosure, the display of the electronic device 101 may include areas corresponding to the housings (e.g., the first housing structure 521 and the second housing structure 522) provided in the electronic device 101. For example, the display may include a first area 1221 corresponding to the first housing 521 (e.g., a display area positioned on the first housing structure 521) and a second area 1222 corresponding to the second housing structure 522 (e.g., a display area positioned on the second housing structure 522). In addition, the display areas of the electronic device 101 may be areas divided with reference to the area at which the display is bent (folded). In other words, the display may include a first area 1221 disposed on one side with reference to the area corresponding to the rotation axis 912 of the housings provided in the electronic device 101 (e.g., the hinge), and a second area 1222 disposed on the other side. Hereinafter, for convenience of description, the first area 1221 may be defined as an upper area of the display and the second area 1222 may be defined as a lower area of the display. For example, when the electronic device 101 is grasped or is in contact with a support surface (e.g., placed on a table), the first housing structure 521 may be positioned relatively higher than the second housing structure 522. Accordingly, the first area 1221 corresponding to the first housing structure 521 is defined as an upper area compared to the second area 1222 corresponding to the second housing structure 522, and the second area 1222 may be defined as a lower area than the first area 1221.

Therefore, according to various embodiments of the disclosure, on the first execution screen 1211, a plurality of elements may be positioned and displayed regardless of the above-described a plurality of display areas (e.g., the first area 1221 and the second area 1222 of the display), and, on the execution screen 1216, the above-described a plurality of elements may be positioned and displayed based on the display areas. For example, on the first execution screen 1211, elements for providing a visual view may be positioned to be displayed in the first area 1221 and the second area 1222 of the display, but on the second execution screen 1216, elements for providing a visual view may be positioned to be displayed only in the first area 1221 (or the second area 1222) of the display. As another example, in the second area 1222 included in the second execution screen, elements for providing specific functions may be positioned such that the elements are not displayed in the area between the first area 1221 and the second area 1222 (e.g., the area at which the display is folded). As another example, on the first execution screen 1211, elements for providing specific functions may be positioned so as to be displayed in the first area 1221 of the display, but on the second execution screen 1216, elements for providing specific functions may be positioned so as to be displayed in the second area 1222 of the display different from the first area 1221 in which elements for providing a visual view are displayed.

According to various embodiments of the disclosure, among the display areas, the electronic device 101 (e.g., at least one processor 120) may display the second execution screen 1216, which causes at least one element for providing a visual view to be positioned in the upper area (e.g., the first area 1221) among the display areas, and which causes at least one element for providing a function to be positioned in the lower area (e.g., the second area 1222).

As described above, when the angle between the housings of the electronic device 101 falls within the predetermined range, an element for providing a visual view on the second execution screen 1216 is disposed in an area of the display (e.g., the first area 1221), and an element for providing a function is disposed in another area of the display (e.g., the second area 1222), whereby the convenience with which the user uses an application can be improved in the state in which the electronic device 101 is folded.

According to various embodiments of the disclosure, visual attributes of a plurality of elements included in the first execution screen 1211 and visual attributes of a plurality of elements included in the second execution screen 1216 may be different from each other. For example, at least one of the visual attributes (e.g., the size, the shape, or the brightness) of the first elements included in the first execution screen 1211 may be different from at least one of corresponding visual attributes (e.g., the size, the shape, or brightness) of the first elements included in the second execution screen 1216.

According to various embodiments of the disclosure, as illustrated in 1301 of FIG. 13, the electronic device 101 (e.g., at least one processor 120) may cause the third application 1215, which is running in the background mode, to change the execution screen to an execution screen corresponding to the range within which the current angle falls. Accordingly, as illustrated in 1310 of FIG. 13, when the third application 1215, which is running in the background mode, is switched to the foreground mode, the electronic device 101 may control the third application 1215 to display an execution screen associated with a mode corresponding to the predetermined range (e.g., a half-folded mode), as illustrated in 1302 in FIG. 13. For example, the electronic device 101 may also transmit information on the current mode (e.g., a half-folded mode) of the electronic device 101 to an application that is running in the background mode, and when the background mode is switched to the foreground mode, the electronic device 101 may cause the application to display an execution screen associated with the mode of the electronic device 101 (e.g., a half-folded mode).

As described above, when an application that has been running in the background mode is executed in the foreground mode, the electronic device 101 may cause the application to be automatically displayed in a mode corresponding to the range within which the current angle falls, whereby the convenience with which the user uses the application can be improved. In addition, since the execution screen corresponding to the current states of the housings is automatically displayed, the operational burden on the electronic device 101 required by the operations performed in order to change the execution screen can be reduced.

Hereinafter, operations of an electronic device 101, an external device 1410, and a developer server 1420 according to various embodiments will be described.

According to various embodiments of the disclosure, an electronic device 101 may receive an application and information on the application from an external device 1410 (e.g., an application distribution server), and may store a list of applications that support changing of an execution screen according to a change in angle based on the received information.

Figure 14:
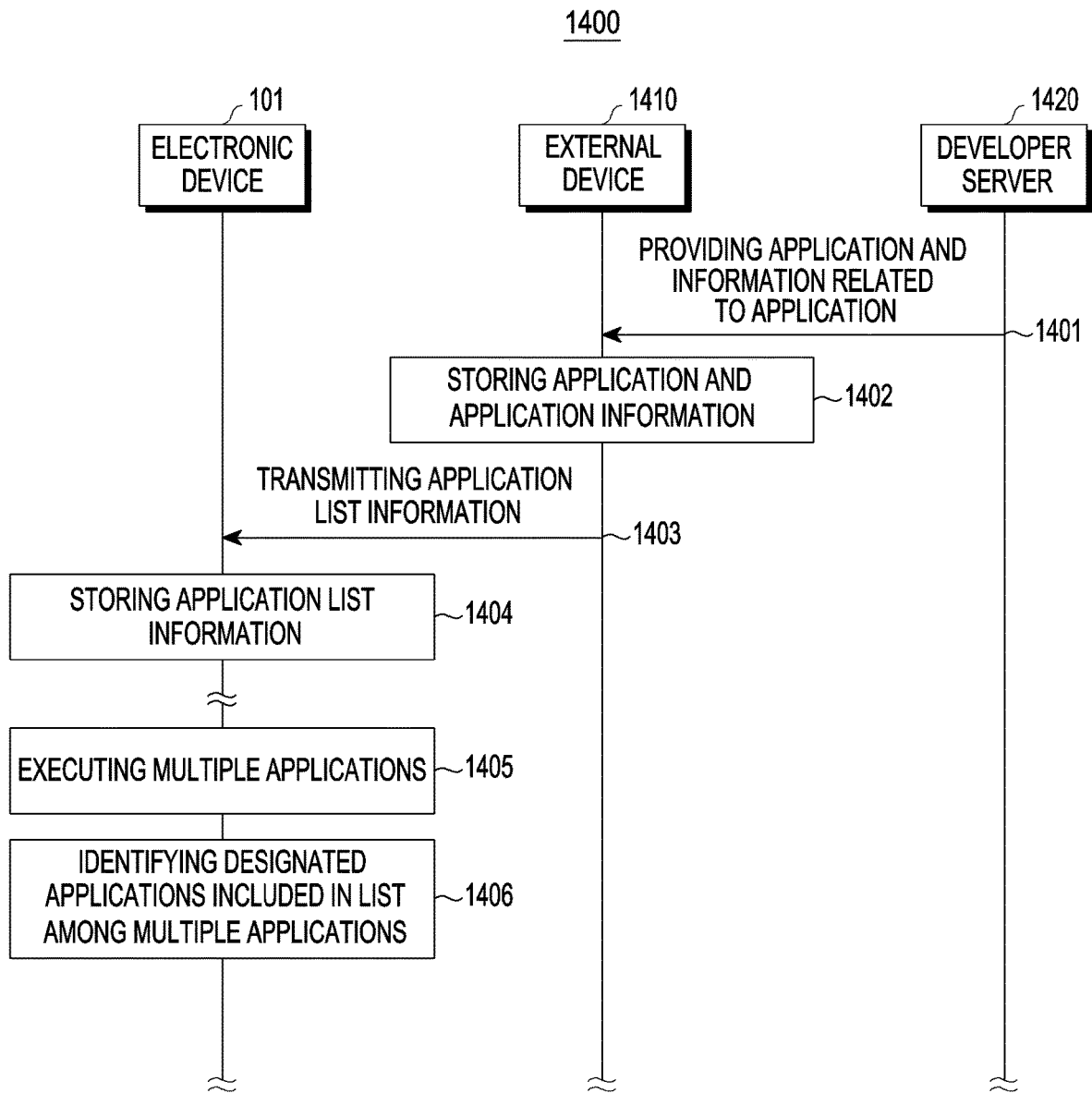
FIG. 14 is a flowchart illustrating operations of an electronic device, an external device, and a developer server according to an embodiment of the disclosure.

FIG. 14 is a flowchart 1400 illustrating operations of an electronic device 101, an external device 1410, and a developer server 1420 according to an embodiment of the disclosure. According to various embodiments of the disclosure, the operations illustrated in FIG. 14 are not limited to the illustrated order, and may be performed in various orders. In addition, according to various embodiments of the disclosure, a greater or smaller number of operations than the operations illustrated in FIG. 14 may be performed. Hereinafter, the operations of FIG. 14 will be described with reference to FIGS. 15 and 16.

Figure 15:
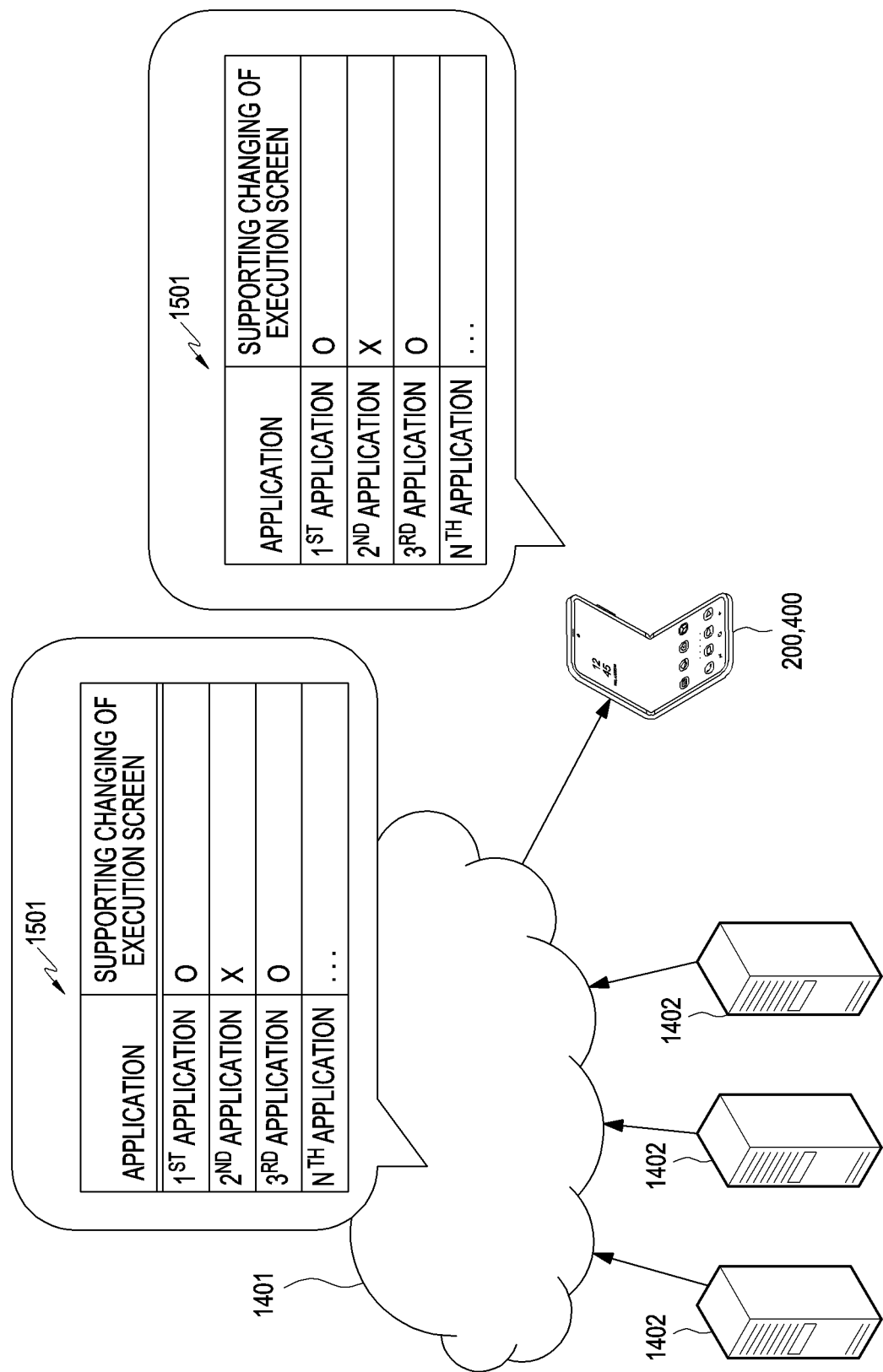
FIG. 15 is a flowchart illustrating operations of an electronic device, an external device, and a developer server according to an embodiment of the disclosure.

FIG. 15 is a view illustrating operations of an electronic device 101, an external device 1410, and developer servers 1420 according to an embodiment of the disclosure.

Figure 16:
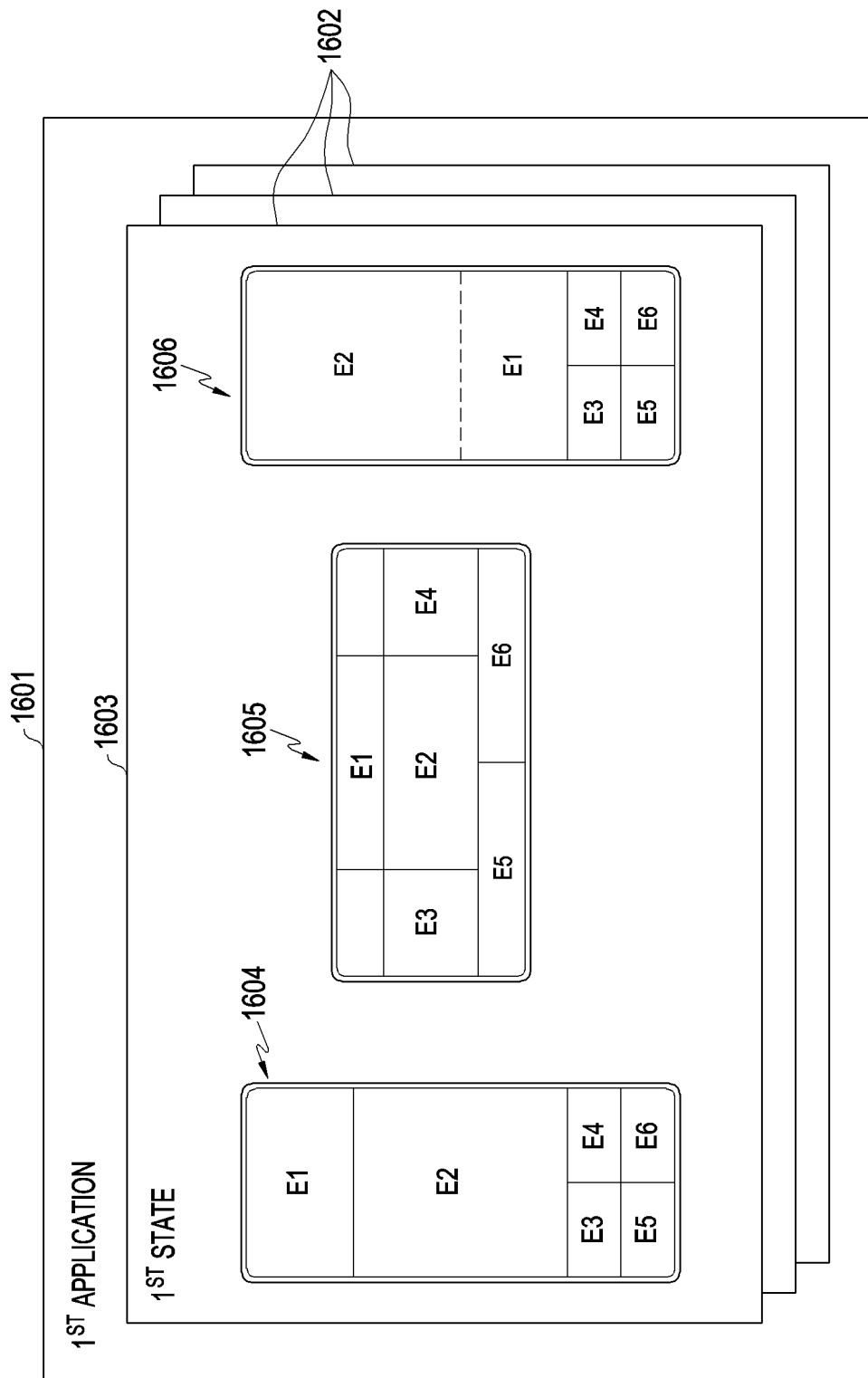
FIG. 16 is a view illustrating an execution screen and/or a UI/UX included in an application for each state according to an embodiment of the disclosure.

FIG. 16 is a view illustrating an execution screen and/or a UI/UX included in an application for each state according to an embodiment of the disclosure.

According to various embodiments of the disclosure, an application distribution environment may include an electronic device 101, an external device 1410, and developer servers 1420, as illustrated in FIG. 15. The operation of each device will be described later.

According to various embodiments of the disclosure, the developer servers 1420 may transmit an application and application-related information to the external device 1410 (e.g., an application distribution server) in operation 1401. For example, the developer servers 1420 may produce an application, and may request the external device 1410 to register the produced application along with information on the produced application 1410.

According to various embodiments of the disclosure, the developer servers 1420 may be third parties that produce an application and provide the produced application as illustrated in FIG. 15.

According to various embodiments of the disclosure, an application produced by each developer server 1420 may be implemented to provide execution screens or UIs/UXs associated with various modes for respective specific states. For example, as illustrated in FIG. 16, an application (e.g., a first application 1601) served by each developer server 1420 may be provided so as to display various execution screens and/or UIs/UXs (e.g., 1604, 1605, 1606) associated with the rotating state of the electronic device 101 or the states of the housings of the electronic device 101 (e.g., an angle between the housings) in a specific state (e.g., a first state 1603) among a plurality of states 1602.

According to various embodiments of the disclosure, the application may be implemented to provide a plurality of execution screens and/or UIs/UXs associated with rotating states of the electronic device 101 associated with a specific state.

For example, in a specific state, an application may provide an execution screen corresponding to a vertical mode, as illustrated in 1604 of FIG. 16, or an execution screen corresponding to a horizontal mode, as illustrated in 1605 of FIG. 16.

In addition, for example, the application may be implemented to provide various execution screens and/or UIs/UXs based on an angle between the housings of the electronic device 101 in a specific state. For example, the application may be implemented to display the screens of the application illustrated in 1604 and 1605 of FIG. 16 in a first mode (e.g., an open mode) corresponding to a first angular range (e.g., 150° to 180°), and may be implemented to display the screen of the application illustrated in 1606 of FIG. 16 in a second mode (e.g., a half-folded mode) corresponding to a second angular range (e.g., 91° to 120°). The difference between the execution screen displayed in the first mode (e.g., an open mode) and the execution screen corresponding to the second mode (e.g., a half-folded mode) is the same as the difference between the first execution screen and the second execution screen described above. Therefore, a redundant description will be omitted.

In addition, for example, the application may be implemented to provide various execution screens and/or UIs/UXs based on the rotating state of the electronic device 101 and the angle between the housings of the electronic device 101 in a specific state. For example, when the electronic device 101 is in the horizontal mode and the angular range is the first range, the first execution screen may be provided, or when the electronic device 101 is in the horizontal mode and the angular range is the second range different from the first range, the second execution screen may be provided.

According to various embodiments of the disclosure, the application may be implemented to provide coordinate information of various elements for respective execution screens associated with a specific state. For example, the application may provide information indicating that the position of an element included in the first execution screen displayed based on the first mode (e.g., a vertical mode) of a specific state is set as first coordinates, and that the position of an element included in the second execution mode displayed based on the second mode (e.g., a half-folded mode) is set as second coordinates. The electronic device 101 may cause the elements to move when an event for changing the execution screen occurs based on coordinate information of each element provided by the application. This will be described with reference to FIGS. 22 to 24.

According to various embodiments of the disclosure, the application-related information may include various kinds of information related to a specific application. For example, the application-related information may include information indicating whether a specific application supports changing of an execution screen according to a change in angle. The application-related information may be implemented separately from an application, may be implemented to be included in package information in which an application is included, or may be implemented to be included in data constituting an application.

According to various embodiments of the disclosure, the external device 1410 may store an application and application information in operation 1402, and may transmit the application list information stored in operation 1403 to the electronic device 101. For example, the external device 1410 may provide, as an application distribution device, an application and application-related information, which are acquired from a developer server 1420, to the electronic device 101.

According to various embodiments of the disclosure, the external device 1410 may receive a request for registration of an application and application information received from a developer server 1420, and may store the application and application information in association with each other in response to the received request.

According to various embodiments of the disclosure, the external device 1410 may store designated application list information 1501 based on the received application information. For example, based on the received application information, the external device 1410 may identify whether or not the application information indicates whether or not changing of an execution screen according to a change in angle is supported for each application, and may identify list information 1501 indicating whether or not changing of an execution screen is supported for each application. The list information 1501 may include information for identifying at least one application that supports changing of an execution screen.

According to various embodiments of the disclosure, the external device 1410 may provide at least one piece of designated application list information 1501 to the electronic device 101 at various points in time. For example, when the electronic device 101 requests and receives an application from the external device 1410 (e.g., when downloading an application), the external device 1410 may provide the list information 1501 to the electronic device 101. In addition, for example, when a new application that supports changing of an execution screen is registered in the list information 1501, the external device 1410 may provide the list information 1501 to the electronic device 101 so that the application included in the list information 1501 can be updated. In addition, for example, the external device 1410 may provide the list information 1501 to the electronic device 101 at a predetermined period.

According to various embodiments of the disclosure, the external device 1410 is not limited to the operation of providing the list information 1501 to the electronic device 101, and may provide application-related information, which is provided from a developer server 1420, to the electronic device 101. In other words, in addition to receiving the list information 1501 indicating at least one application that supports changing of an execution screen from the developer server 1420, the electronic device 101 may receive application-related information and may itself identify whether the application supports changing of an execution screen based on the received application-related information.

According to various embodiments of the disclosure, the electronic device 101 may store the application list information 1501 received in operation 1404. For example, as illustrated in FIG. 15, the electronic device 101 may receive the application list information 1501 from the external device 1410, and may store the same.

According to various embodiments of the disclosure, the electronic device 101 may execute a plurality of applications in operation 1405, and may identify designated applications included in the list information 1501 among the plurality of applications in operation 1406. For example, the electronic device 101 may execute a plurality of applications in different modes (e.g., a foreground mode or a background mode), and may identify one or more applications that support changing of an execution screen (e.g., the first application and the third application) among the plurality of currently running applications based on the stored list information 1501.

Hereinafter, still other operations of the electronic device 101 according to various embodiments will be described.

According to various embodiments of the disclosure, the electronic device 101 may perform control such that an application designated among a plurality of changes an execution screen.

Figure 17:
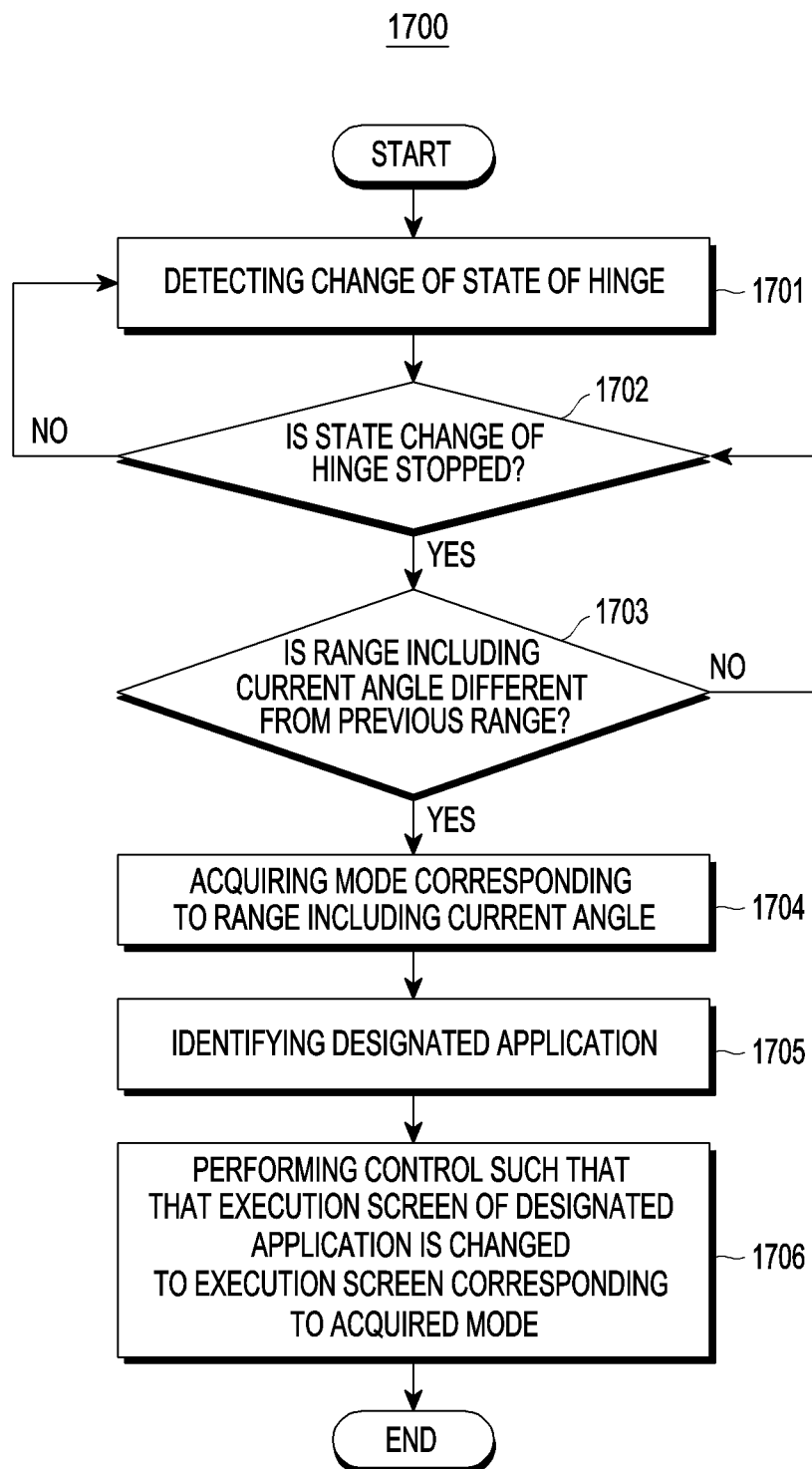
FIG. 17 is a flowchart illustrating operations of an electronic device according to an embodiment of the disclosure.

FIG. 17 is a flowchart 1700 illustrating operations of an electronic device 101 according to an embodiment of the disclosure. According to various embodiments of the disclosure, the operations illustrated in FIG. 17 are not limited to the illustrated order, and may be performed in various orders. In addition, according to various embodiments of the disclosure, a greater or smaller number of operations than the operations illustrated in FIG. 17 may be performed. Hereinafter, the operations of FIG. 17 will be described with reference to FIGS. 18 to 20.

Figure 18:
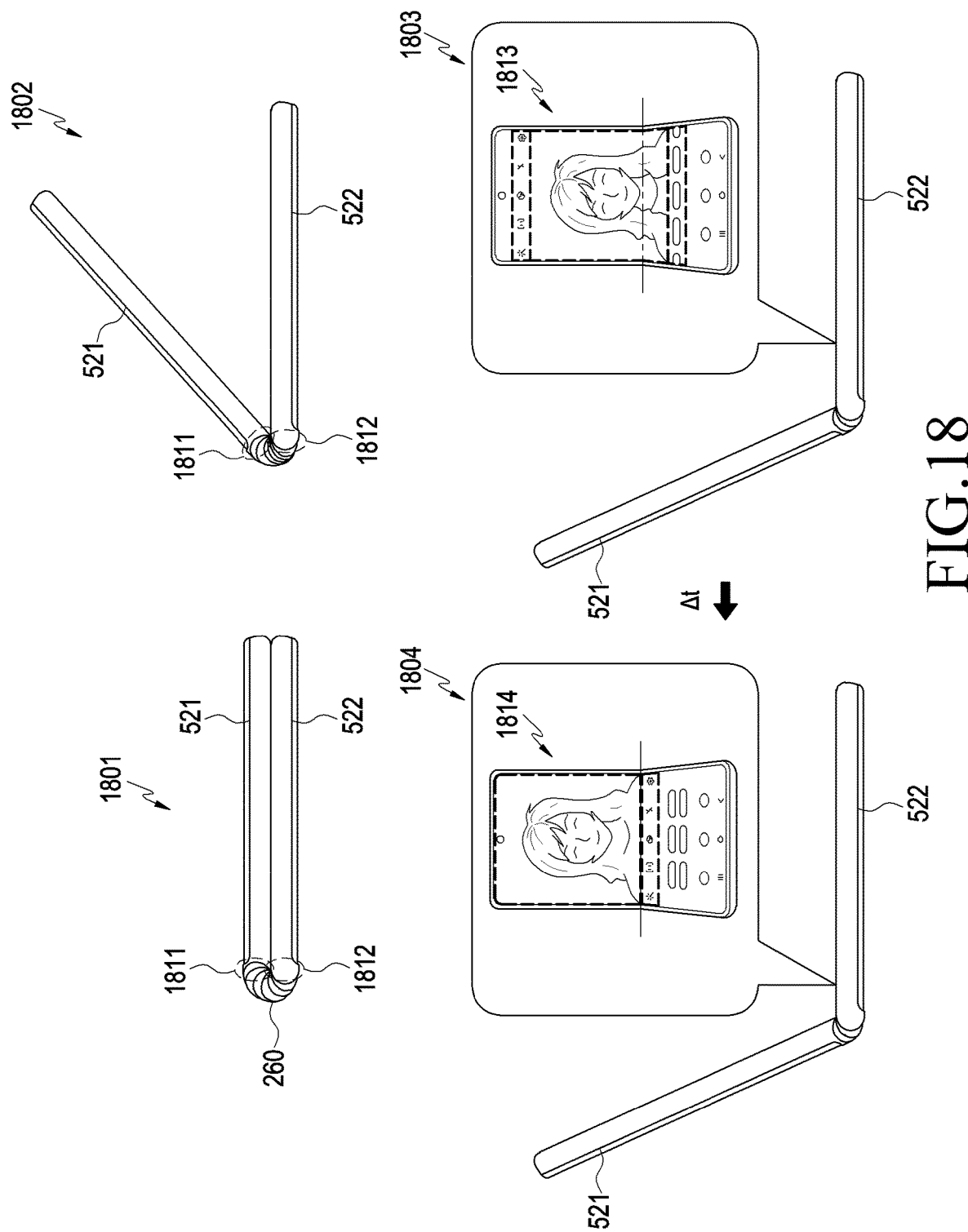
FIG. 18 is a view illustrating operations of detecting rotation of a housing of an electronic device according to an embodiment of the disclosure.
Figure 19:
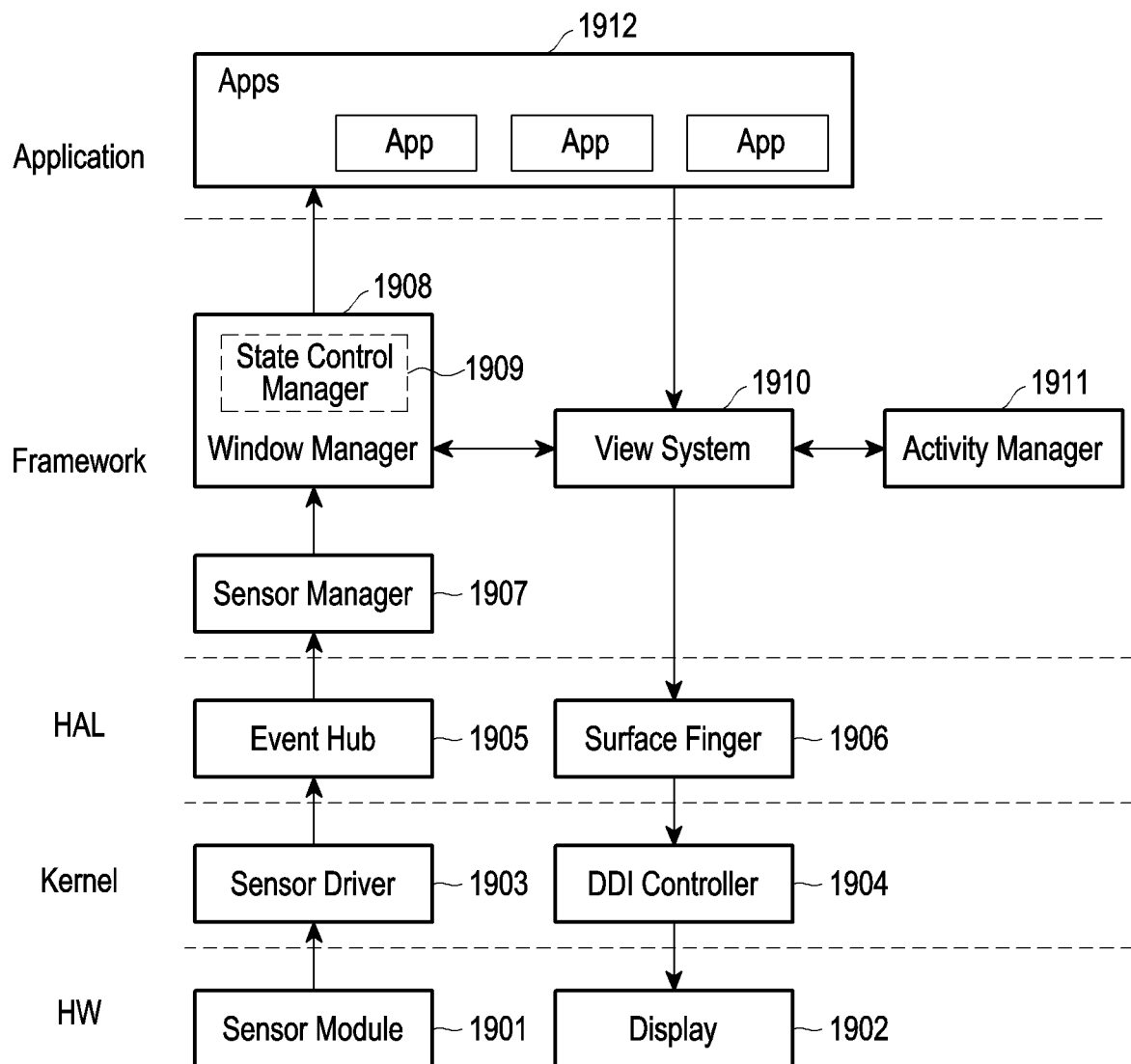
FIG. 19 is a block diagram illustrating operations of an electronic device according to an embodiment of the disclosure.
Figure 20:
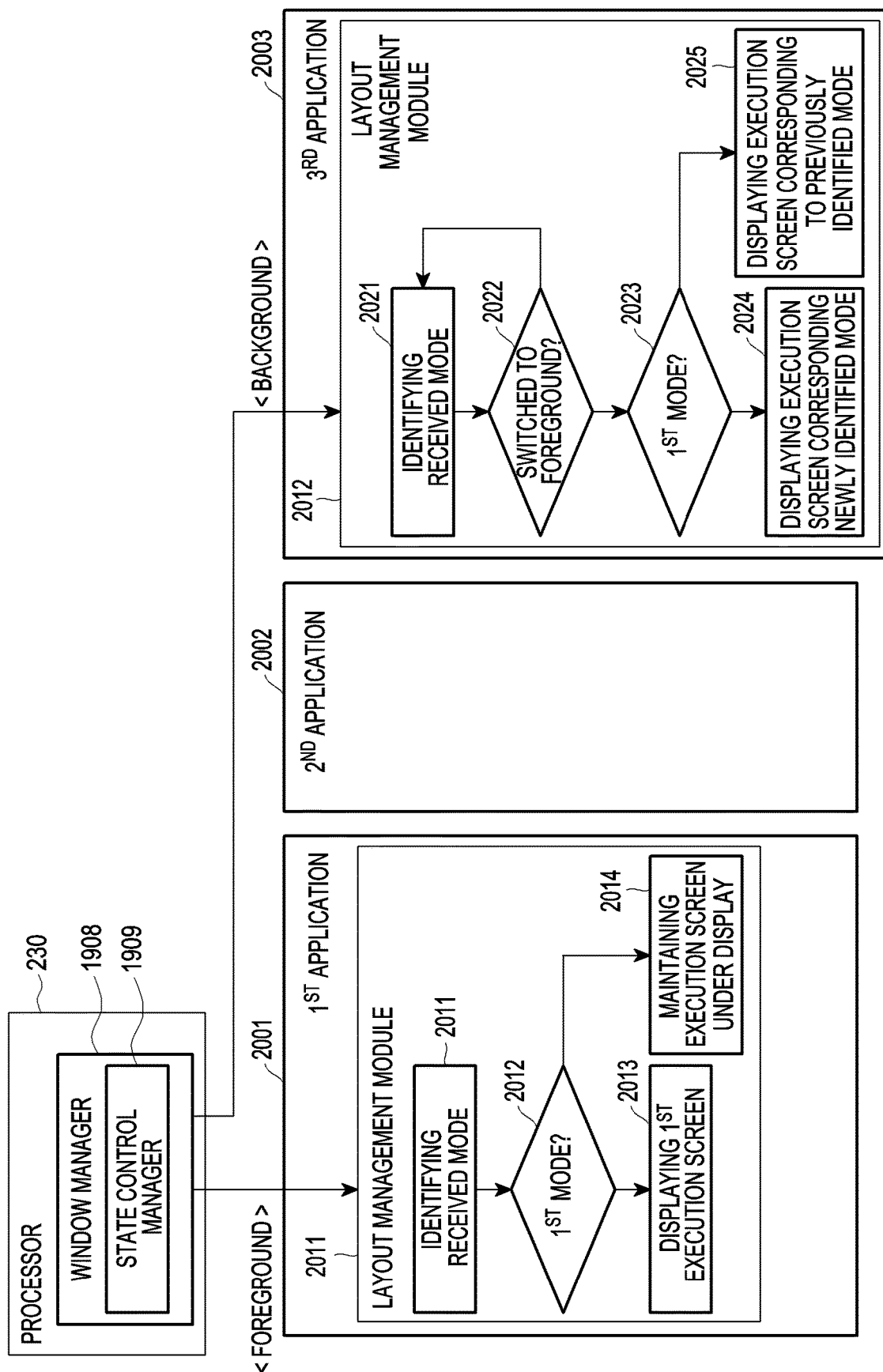
FIG. 20 is a view illustrating operations of a layout management module for describing operations of an electronic device according to an embodiment of the disclosure.

FIG. 18 is a view illustrating operations of detecting rotation of a housing of an electronic device 101 according to an embodiment of the disclosure. The dotted lines shown in FIG. 18 indicate elements included in execution screens. The execution screens are not limited to those illustrated in FIG. 18, and may further include additional elements, or may include fewer elements. FIG. 19 is a block diagram illustrating operations of an electronic device 101 according to an embodiment of the disclosure. FIG. 20 is a view for illustrating operations of a layout management module for further describing operations of an electronic device 101 according to an embodiment of the disclosure. According to various embodiments of the disclosure, the electronic device is not limited to those shown in FIGS. 19 to 20, and may be implemented to include a greater or smaller number of components than the components illustrated in FIGS. 19 to 20.

According to various embodiments of the disclosure, the electronic device 101 (e.g., at least one processor 120) may detect a change in the state of a hinge (e.g., the hinge structure 460 in FIG. 4A or the hinge structure 540 in FIG. 5) in operation 1701. For example, as illustrated in 1801 of FIG. 18, the electronic device 101 may detect, using a magnetic sensor (e.g., a Hall sensor), that portions (e.g., 1811, 1812) of a hinge (e.g., the hinge structure 460 in FIG. 4A or the hinge structure 540 in FIG. 5) are changed due to the rotation of at least one of the housing structures (e.g., 521, 522) from the state in which the angle between the portions (e.g., the housing structures (e.g., 521, 522) connected to the portions (e.g., 1811, 1812) of the hinge (e.g., the hinge structure 460 in FIG. 4A or the hinge structure 540 in FIG. 5) is a predetermined angle (e.g., 0°), as illustrated in 1801 in FIG. 18.

According to various embodiments of the disclosure, the electronic device 101 (e.g., at least one processor 120) may detect whether or not the change in the state of the hinge (e.g., the hinge structure 460 in FIG. 4A or the hinge structure 540 in FIG. 5) is stopped in operation 1702, and may identify whether or not the range including the current angle has changed to be different from the range including the previous angle in operation 1703. For example, after the change in the state of the hinge (e.g., the hinge structure 460 in FIG. 4A or the hinge structure 540 in FIG. 5) is detected, the electronic device 101 may identify, using an acceleration or gyro sensor, how much the angle between the portions (e.g., the housing structures (e.g., 521, 522) connected to the portions (e.g., 1811, 1812) of the hinge (e.g., the hinge structure 460 in FIG. 4A or the hinge structure 540 in FIG. 5)) is changed, as illustrated in 1802 and 1803 of FIG. 18. When the change in the angle between the portions (e.g., 1811, 1812) of the hinge (e.g., the hinge structure 460 in FIG. 4A or the hinge structure 540 in FIG. 5) is stopped, as illustrated in 1803 and 1804 of FIG. 18, the electronic device 101 may identify the range within which the angle between the portions (e.g., 1811, 1812) of the hinge (e.g., the hinge structure 460 in FIG. 4A or the hinge structure 540 in FIG. 5) falls. The electronic device 101 may compare the range including the current angle between the portions (e.g., 1811, 1812) of the hinge (e.g., the hinge structure 460 in FIG. 4A or the hinge structure 540 in FIG. 5) (e.g., 91° to 130°) with the range including the previous angle between the portions (e.g., 1811, 1812) of the hinge (e.g., the hinge structure 460 in FIG. 4A or the hinge structure 540 in FIG. 5) (e.g., 21° to 90°), and may perform operation 1704 when the range is changed.

According to various embodiments of the disclosure, the electronic device 101 (e.g., at least one processor 120) may determine the mode corresponding to the range within which the current angle falls in operation 1704. For example, when the change in the state of the hinge (the hinge structure 460 in FIG. 4A or the hinge structure 540 in FIG. 5) is stopped (e.g., the change in the angle between the housing structures (e.g., 521, 522 is stopped), the electronic device 101 may identify the mode corresponding to the identified range, as illustrated in 1804 of FIG. 18.

According to various embodiments of the disclosure, the electronic device 101 (e.g., at least one processor 120) may change the execution screen after the change in the state of the hinge is stopped and a preset time elapses. For example, the electronic device 101 may change the first execution screen 1813, which is being displayed, as illustrated in 1803 of FIG. 18 to the second execution screen 1814 as illustrated in 1804 of FIG. 18 after the change in the state of the hinge is stopped and a preset time elapses.

According to various embodiments of the disclosure, the electronic device 101 (e.g., at least one processor 120) may identify, in operation 1705, a designated application, and may perform, in operation 1706, control such that the execution screen of the application designated from among a plurality of applications, which are running in the electronic device 101, is changed to an execution screen corresponding to an acquired mode.

Hereinafter, an operation of the electronic device 101 for performing control such that an execution screen of an application is changed will be described with reference to FIGS. 19 and 20.

Hereinafter, components for changing an execution screen of an application of the electronic device 101 will be described with reference to FIG. 19.

According to various embodiments of the disclosure, the electronic device 101 may include a hardware layer including a sensor module 1901 and a display 1902, a kernel layer including a sensor driver 1903 and a DDI controller 1904, a library layer (HAL) including an event hub 1905 and a surface flinger 1906, a framework including a sensor manager 1907, a window manager 1908, a view system 1910, an activity manager 1911, a state control manager 1909, and an application layer including applications 1912. Here, in the memory, the kernel layer, the library layer, the framework layer, and the application layer may be stored in the form of instructions, and, when executed, may cause the processor to perform an operation of a corresponding component.

Hereinafter, a hardware layer (HW) and a kernel layer (Kernel) will be described.

According to various embodiments of the disclosure, the sensor module 1901 may detect various states of the electronic device 101. A redundant description related to the sensor module 1901 will be omitted. According to various embodiments of the disclosure, the sensor driver 1903 may cause the sensor module 1901 to be driven.

According to various embodiments of the disclosure, the display 1902 may include an execution screen of an application. A redundant description related to the display 1902 will be omitted. According to various embodiments of the disclosure, the display controller (DDI controller) 1904 may correspond to a display drive circuit DDI.

The description is not limited to the above, and the hardware layer (HW) and the kernel layer (Kernel) may be implemented in the same manner as well-known technology, and thus other redundant descriptions will be omitted.

Hereinafter, the library layer (HAL) will be described.

According to various embodiments of the disclosure, the event hub 1905 may allow collected events and data to be processed. For example, the event hub 1905 may deliver a service corresponding to the events and data collected from the sensor module 1901 to the framework layer such that a service corresponding thereto can be provided.

According to various embodiments of the disclosure, the surface flinger 1906 may synthesize a plurality of layers. The surface flinger 1906 may provide data representing the plurality of synthesized layers to a display controller 1904.

Since the library layer (HAL) is not limited to the above description and may be implemented in the same manner as well-known technology, other redundant descriptions will be omitted.

Hereinafter, the framework layer will be described.

According to various embodiments of the disclosure, the sensor manager 1907 may manage events and data acquired using the sensor module 1901.

According to various embodiments of the disclosure, the window manager 1908 may perform operations such that an execution screen of an application is changed according to a change in angle.

For example, the window manager 1908 may manage at least one designated application (or manage a list) that supports changing of an execution screen. The window manager may identify at least one application that supports changing of an execution screen among a plurality of applications, which are currently running, based on the list, and may control the at least one application to change the execution screen. For example, the window manager 1908 may deliver an unfolding/folding event to the at least one application that supports changing of an execution screen. The at least one application may provide an execution screen corresponding to the acquired unfolding/folding event, and the graphic composer 669 may provide data based on the received execution screen to the display driver. The wording "the window manager 1908 or another manager controls an application" may include the meaning that information on an event acquired by the window manager 1908 or another manager is provided to an application.

For example, the window manager 1908 (e.g., a state control manager 1909) may identify whether or not the state of the electronic device 101 is changed (e.g., changed from the open mode to the half-folded mode) based on the data acquired through the sensor module 1901. In other words, the state control manager 1909 may manage the current state of the electronic device 101.

In addition, for example, when a change in the state of the electronic device 101 (e.g., the change from the open mode to the half-folded mode) is identified through the sensor module 1901, the window manager 1908 may deliver information corresponding to the changed state to the application. For example, when the change in the state of the electronic device 101 is identified, the window manager 1908 may deliver information on a display area corresponding to the changed state of the electronic device 101 a designated application that supports changing of an execution screen among applications 1912, which are running.

According to various embodiments of the disclosure, the view system 1910 may be a program for drawing at least one layer based on the resolution of the display 1902. In an embodiment of the disclosure, an application may draw at least one layer based on the resolution of a second display area of the display 1902 using the view system 1910. The view may manage various execution screens displayed by an application and graphic elements included in the execution screens.

According to various embodiments of the disclosure, the activity manager 1911 may acquire and manage various kinds of information related to the state of execution of an application (e.g., a foreground mode or a background mode).

Since the framework may be implemented in the same manner as well-known technology without being limited to the above description, other redundant descriptions will be omitted.

Hereinafter, with reference to FIG. 20, a window manager 1908 (e.g., a state control manager 1909) and changing of an application (e.g., a layout management module 2004 or 2005) of the electronic device 101 will be described. The modules may be stored in the form of instruction program codes or application codes for executing a corresponding function in memory, a program, or an application as a functional unit, and may control, when executed, the processor 230 to perform an operation related to the corresponding module.

According to various embodiments of the disclosure, as illustrated in FIG. 20, the processor 230 of the electronic device 101 may include a window manager 1908 including a state control manager 1909 for changing an execution screen of a designated application.

According to various embodiments of the disclosure, when a change in the state of the hinge (e.g., the hinge structure 460 in FIG. 4A or the hinge structure 540 in FIG. 5) is detected, the window manager 1908 (e.g., the state control manager 1909) may perform control such that an application changes an execution screen according to the angle between the portions (e.g., 1811, 1812) of the hinge (e.g., the hinge structure 460 in FIG. 4A or the hinge structure 540 in FIG. 5). For example, the state control manager 1909 may detect the change in the state of the hinge (e.g., the hinge structure 460 in FIG. 4A or the hinge structure 540 in FIG. 5) using a magnetic sensor (e.g., a Hall sensor), may identify the angle between the portions (e.g., 1811, 1812) of the hinge (e.g., the hinge structure 460 in FIG. 4A or the hinge structure 540 in FIG. 5) using at least one sensor (e.g., an acceleration/gyro sensor), and may identify whether the identified angle falls within a predetermined range. The window manager 1908 (e.g., the state control manager 1909) may identify a mode corresponding to the identified range. The window manager 1908 (e.g., the state control manager 1909) may deliver information on the identified mode to one or more designated applications 2001 and 2003 registered in a stored list, among a plurality of applications 2001, 2002, and 2003, which are currently running.

According to various embodiments of the disclosure, at least one designated application may perform an operation of changing an execution screen. For example, referring to FIG. 20, the one or more applications 2001 and 2003 supporting changing of an execution screen may include respective layout management modules 2004 and 2005 for changing of an execution screen.

For example, the first application 2001 (e.g., the layout management module 2004), which is running in the foreground mode, may replace the currently displayed execution screen or may maintain the currently displayed execution screen according to the received mode. For example, as illustrated in FIG. 20, the first application 2001, which is running in the foreground mode, may identify the received mode (operation 2011), and when the identified mode is a designated first mode (e.g., the half-folded mode) (operation 2012), the first application 2001 may identify the second execution screen corresponding to the first mode at the currently running state, and may cause the second execution screen to be displayed (operation 2013). When the identified mode is the same as the previously identified mode, the first application 2001 may cause the currently displayed execution screen to be maintained (operation 2014).

For example, as illustrated in FIG. 20, the third application 2003 (e.g., the layout management module 2005), which is running in the background mode, may identify the received mode (e.g., the half-folded mode) (operation 2021), and when the newly identified mode is different from the previous mode when switching to the foreground mode (operation 2022) (the determination result in operation 2023), the third application 2003 may cause an execution screen corresponding to the newly identified mode (e.g., the half-molded mode) to be displayed (operation 2024). When the newly identified mode is the same as the previous mode (the determination result in operation 2023) when the third application 2003, which is running in the background mode, is switched to the foreground, an execution screen corresponding to the previously identified mode may be displayed (operation 2025).

Without being limited to the above description, the layout management modules 2004 and 2005 included in the applications may further perform operations, such as a display attribute analysis operation and a display burn-in suppression determination operation.

Hereinafter, still other operations of the electronic device 101 will be described.

According to various embodiments of the disclosure, when an angle between housings (e.g., a folding angle) falls within a predetermined range, the electronic device 101 reconstructs an element of the currently displayed execution screen based on a mode corresponding to the predetermined range.

Figure 21:
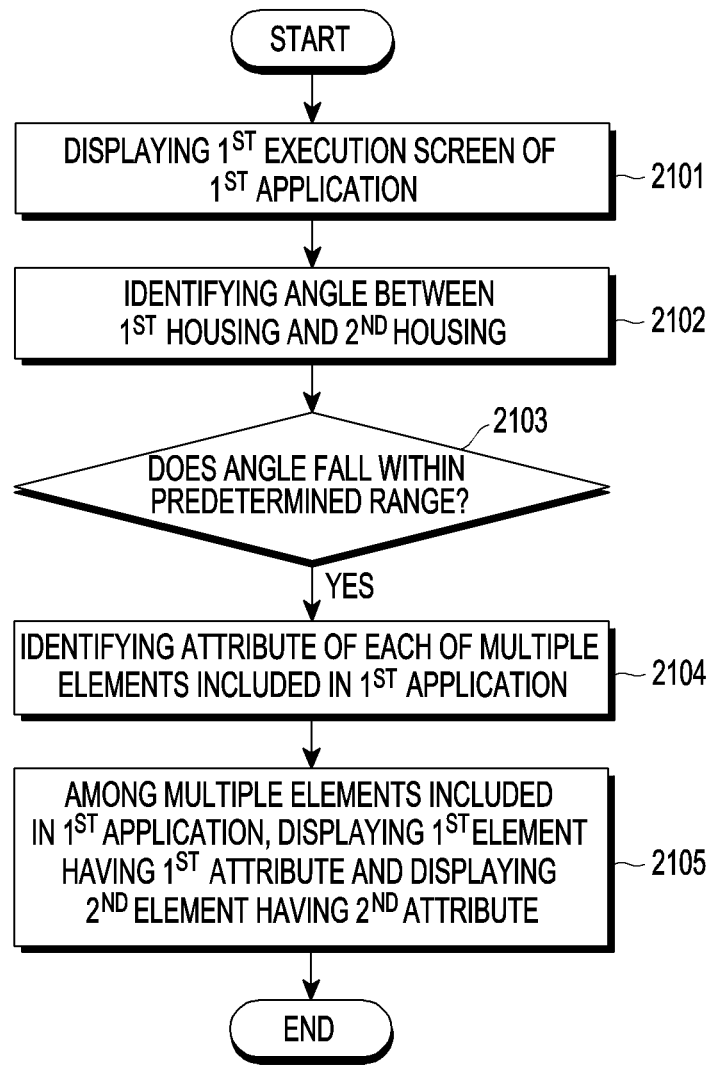
FIG. 21 is a flowchart illustrating operations of reconfiguring elements included in an execution screen of an application of an electronic device according to an embodiment of the disclosure.

FIG. 21 is a flowchart 2100 illustrating operations of reconfiguring elements included in an execution screen of an application of an electronic device 101 according to an embodiment of the disclosure. According to various embodiments of the disclosure, the operations illustrated in FIG. 21 are not limited to the illustrated order, and may be performed in various orders. In addition, according to various embodiments of the disclosure, a greater or smaller number of operations than the operations illustrated in FIG. 21 may be performed. Hereinafter, the operations of FIG. 21 will be described with reference to FIGS. 22 to 24.

Figure 22:
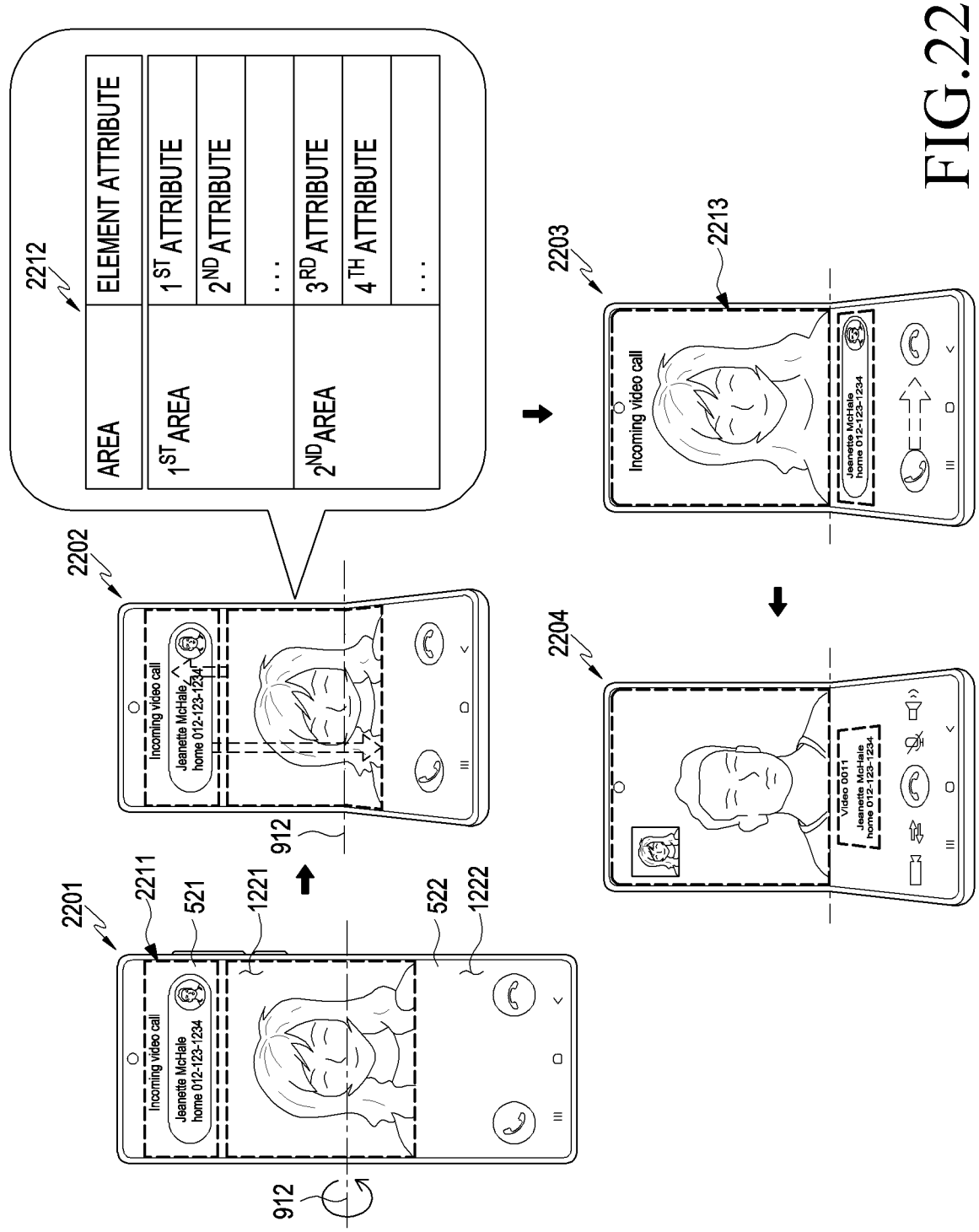
FIG. 22 is a view illustrating operations of reconfiguring elements included in an execution screen of an application of an electronic device according to an embodiment of the disclosure.
Figure 23:
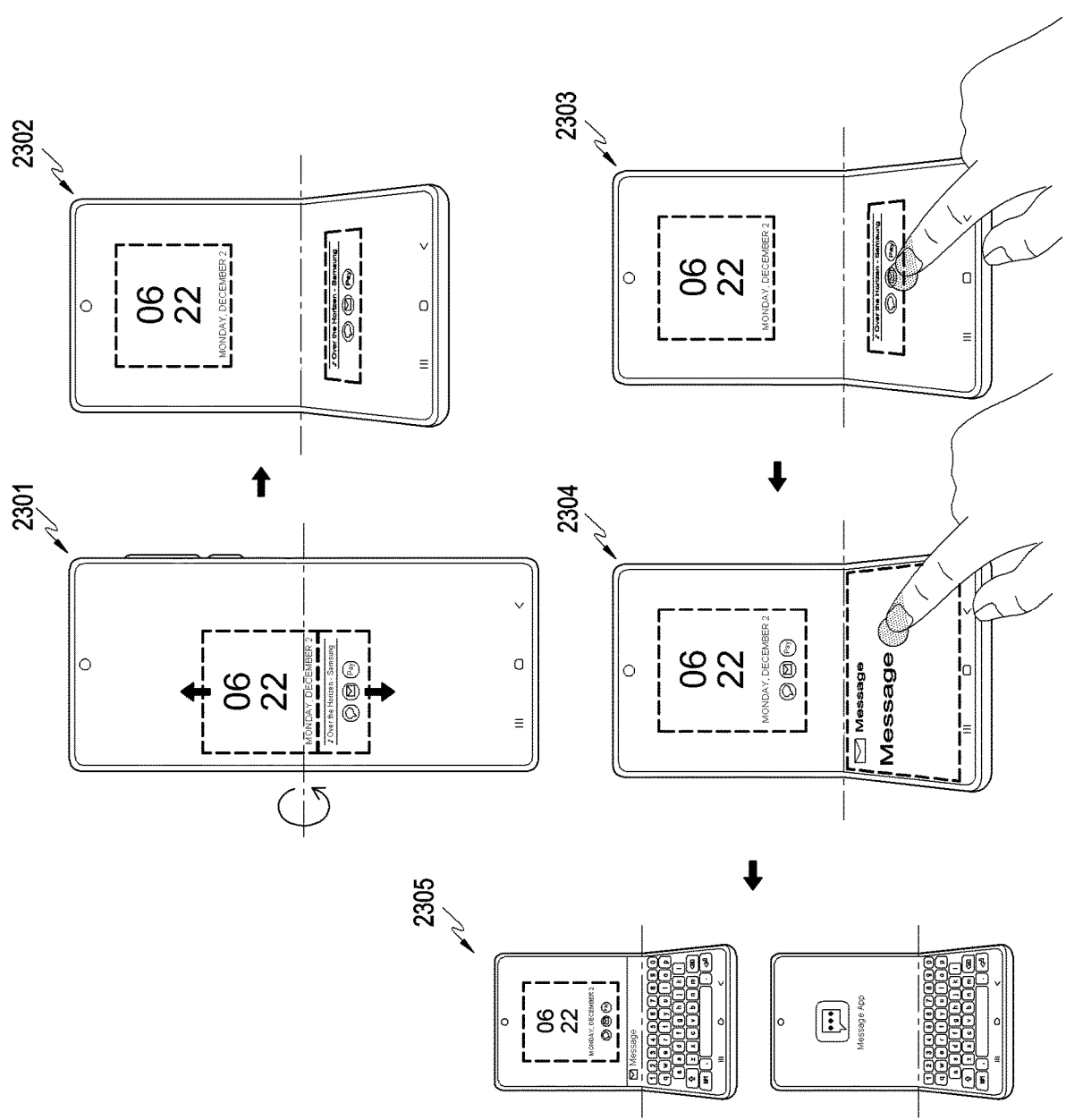
FIG. 23 is a view illustrating operations of reconfiguring elements included in an execution screen of an application of an electronic device according to an embodiment of the disclosure.
Figure 24:
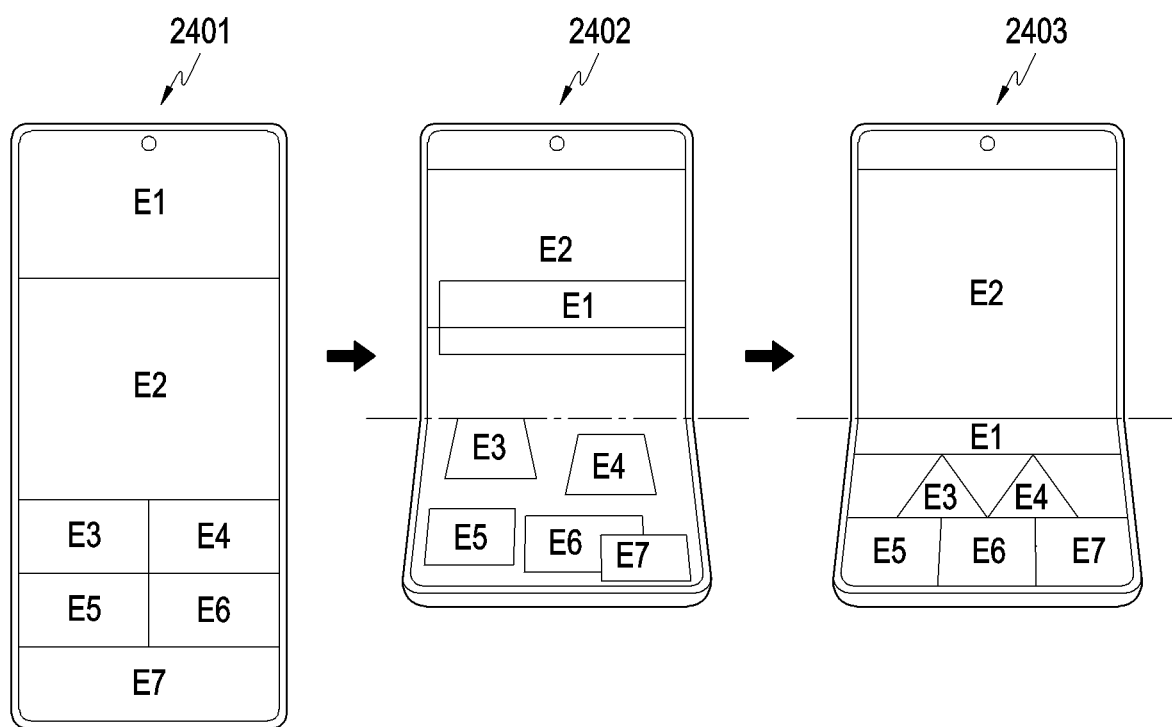
FIG. 24 is a view illustrating operations of reconfiguring elements included in an execution screen according to an embodiment of the disclosure.

FIG. 22 is a view illustrating operations of reconfiguring elements included in an execution screen of an application of an electronic device 101 according to an embodiment of the disclosure. FIG. 23 is a view illustrating operations of reconfiguring elements included in an execution screen of an application of an electronic device 101 according to an embodiment of the disclosure. The dotted lines shown in FIGS. 22 and 23 indicate elements included in execution screens. The execution screens are not limited to those illustrated in FIGS. 22 and 23, and may further include additional elements, or may include fewer elements. FIG. 24 is a view illustrating operations of reconfiguring elements included in an execution screen according to an embodiment of the disclosure.

Figure 25:
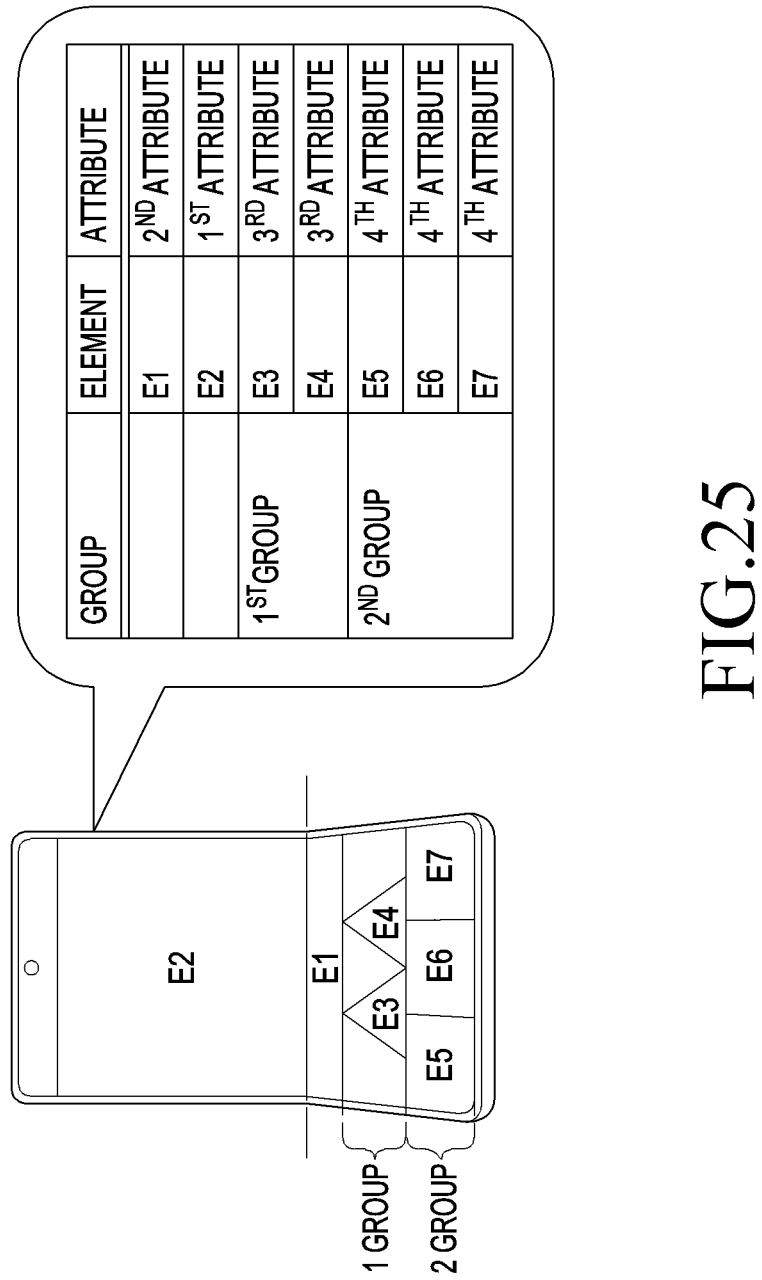
FIG. 25 is a view illustrating reconfigured elements according to an embodiment of the disclosure.

FIG. 25 is a view illustrating reconfigured elements according to an embodiment of the disclosure.

According to various embodiments of the disclosure, the electronic device 101 (e.g., at least one processor 120) may display a first execution screen of a first application in operation 2101. For example, as illustrated in 2201 of FIGS. 22 and 2301 of FIG. 23, the electronic device 101 may display the first execution screen 2211 of the first application including various elements on the first area 1221 and the second area 1222 of the display. As an example, as illustrated in 2401 of FIG. 24, the first execution screen of the first application may include first to seventh elements E1 to E7. Since operation 2101 of the electronic device 101 may be performed in the same manner as operations 801 and 1101 of the electronic device 101 described above, a redundant description will be omitted.

According to various embodiments of the disclosure, each of various elements included in the first execution screen may have at least one attribute. Since the attributes of the elements are the same as those described above, a redundant description will be omitted.

According to various embodiments of the disclosure, the areas of the display of the electronic device 101 may include areas corresponding to the housings. For example, when the electronic device 101 includes a first housing 521 and a second housing 522, the display may include a first area 1221 corresponding to the first housing structure 521 and a second area 1222 corresponding to the second housing 522. A redundant description of the areas of the display will be omitted.

According to various embodiments of the disclosure, the electronic device 101 (e.g., at least one processor 120) may identify the angle between the first housing structure 521 and the second housing structure 522 in operation 2102, and may identify whether or not the angle falls within a predetermined range in operation 2103. For example, the electronic device 101 may identify the angle between the portions of the hinge connected to the housings or the angle between the housings, may identify the range within which the identified angle falls, and may identify whether or not the mode is a designated mode corresponding to the identified range. Here, the designated mode may be a half-folded mode. Since operations 2102 and 2103 of the electronic device 101 may be performed in the same manner as operations 802 and 803 of the electronic device 101 and operations 1102 and 1103 of the electronic device 101, a redundant description will be omitted.

According to various embodiments of the disclosure, in operation 2104, the electronic device 101 (e.g., at least one processor 120) may identify an attribute of each of a plurality of elements included in the first execution screen. For example, as illustrated in 2401 of FIG. 24, the electronic device 101 may identify attributes (e.g., first to fifth attributes) as illustrated in FIG. 25 for each of a plurality of elements (e.g., E1 to E7) included in the first execution screen.

According to various embodiments of the disclosure, in operation 2105, the electronic device 101 (e.g., at least one processor 120) may display, in the first area 1221, a first element having a first attribute, among the plurality of elements included in the first execution screen, and may display, in the second area 1222, a second element having a second attribute. For example, as illustrated in 2202 of FIGS. 22 and 2302 of FIG. 23, the electronic device 101 may move at least some of the elements included in the first execution screen 2211 to a specific area of the display of the electronic device 101, and may display a second execution screen including a plurality of reconfigured elements.

According to various embodiments of the disclosure, a criterion for reconfiguring the elements for each mode corresponding to an angular range of the electronic device 101 may be set. In other words, the electronic device 101 may set a first criterion for reconfiguring the elements in a first mode (e.g., an open mode), and a second criterion for reconfiguring the elements in a second mode (e.g., a half-folded mode). Accordingly, when the current angle falls within a predetermined range, the electronic device 101 may detect the mode change, and may reconfigure the elements based on a criterion corresponding to the detected mode. Hereinafter, for convenience of description, the case in which the mode of the electronic device 101 is changed from a specific mode (e.g., an open mode) to a half-folded mode will be described as an example. Accordingly, the following description is not limiting, and is applicable mutatis mutandis to the case in which the mode of the electronic device 101 is changed from one mode (e.g., a half-folded mode) to another mode (e.g., an open mode).

According to various embodiments of the disclosure, reconfiguration of a plurality of elements included in the first execution screen of the electronic device 101 may include various visual reconstruction. For example, the reconfiguration of the elements may include changing various visual characteristics including position shift of the elements, shapes, resolutions, colors of the elements, and the like.

According to various embodiments of the disclosure, when the current angle falls within a predetermined range (e.g., 91° to 130°), the electronic device 101 (e.g., at least one processor 120) may move at least some of the plurality of elements based on attributes of each of the plurality of elements included in the first execution screen and at least one attribute of an element allocated for each display area. For example, the electronic device 101 may identify elements (e.g., 2212) having attributes corresponding to attributes allocated to each of the identified areas, and may move the identified elements to each area. For example, as illustrated in 2202 of FIG. 22, the electronic device 101 may identify attributes of elements, which are displayable for respective areas of the display (e.g., elements having a first attribute and a second attribute being displayable in the first area 1221 and elements having a third attribute and a fourth attribute being displayable in the second area 1222) (2212). Accordingly, for example, as illustrated in FIG. 24, the electronic device 101 may move the elements having the third attribute to the second area 1222.

For example, when moving the elements, the electronic device 101 (e.g., at least one processor 120) may move the elements based on coordinate information of the element. For example, the electronic device 101 may obtain coordinate information of each area of the display and coordinate information of the elements from an application, and may control the coordinates of the elements to be positioned at the coordinates of the area at which the elements are to be displayed. As another example, when moving the elements, the electronic device 101 may control the elements, which are moved and displayed, based on coordinate information of the elements and size information of each of the elements such that the elements do not overlap each other while being displayed. When moving the elements and arranging the elements in each area, the electronic device 101 may control the arrangement state according to the attributes of the elements, which will be described later.

According to various embodiments of the disclosure, the electronic device 101 (e.g., at least one processor 120) may change the visual characteristics of at least some of the plurality of elements E1 to E7, as illustrated in FIG. 24. The visual characteristics may include the sizes, colors, resolutions, contrasts, and ratios of the elements.

For example, the electronic device 101 (e.g., at least one processor 120) may change the visual attributes of at least some of the plurality of elements based on the area in which the at least some of the plurality of elements are to be displayed by being moved. For example, when displaying an execution screen of a specific application (e.g., a camera application), the electronic device 101 may move the currently displayed first element (e.g., a preview screen) to the first area 1221. The electronic device 101 may adjust the size of the first element so that the size of the first element corresponds to the size of the first area 1221 in which the first element is to be displayed (e.g., adjusting the length of each of the length and width of the preview screen and the ratio of the width and height).

In addition, for example, the electronic device 101 (e.g., at least one processor 120) may change the visual characteristics of the plurality of elements based on the attributes of each of the plurality of elements included in the first execution screen. For example, in the case of an element (e.g., multimedia content, such as a preview image) having an attribute (e.g., a name attribute) classified as an element providing a visual view, the electronic device 101 may change the visual characteristics to improve the visibility of the element, such as increasing the size of the element or increasing the resolution thereof. As another example, in the case of an element having an attribute (e.g., a name attribute) classified as an element providing a specific function, the electronic device 101 may change the visual characteristics such that the convenience of providing a corresponding function can be improved (e.g., in the case of an icon, the shape may be changed so as to facilitate selection). Alternatively, without being limited to the above description, the visual characteristics of some of the plurality of elements may be changed when execution screens are randomly changed.

According to various embodiments of the disclosure, when an element has a plurality of attributes, the electronic device 101 (e.g., at least one processor 120) may perform the above-described reconfiguration operation based on the plurality of attributes.

For example, the electronic device 101 (e.g., at least one processor 120) may perform the reconfiguration operation based on an attribute determined to have a high priority, among the plurality of attributes of the element. For example, when an element has a first attribute and a third attribute, the electronic device 101 may identify the first attribute having a high priority among the first attribute and the third attribute, and may reconfigure the element based on the first attribute. In this case, the priority of each attribute may be determined based on a specific attribute. For example, among the attributes, an attribute for providing a visual view may be determined to be the attribute having the highest priority. In other words, elements having a plurality of attributes but having attributes classified as providing a visual view may be controlled to move to a preferentially allocated area (e.g., the first area 1221). In addition, for example, an attribute classified as providing a specific function among the attributes may be determined to be the attribute having the highest priority. In other words, elements having a plurality of attributes but having attributes for providing a specific function may be controlled to move to a preferentially allocated area (e.g., the second area 1222).

In addition, for example, the electronic device 101 (e.g., at least one processor 120) may perform a reconfiguration operation of an element based on one or more attributes, the number of which is the greatest among the plurality of attributes of the element. In this case, the electronic device 101 may identify attributes within a preset similarity range among the plurality of attributes, and may identify the number of attributes in the similarity range.

According to various embodiments of the disclosure, the electronic device 101 (e.g., at least one processor 120) may group and display elements having properties corresponding to each other, as illustrated in FIG. 25. For example, the electronic device 101 may display a third element E3 and a fourth element E4 having a third attribute as a first group, and may display a fifth element E5, a sixth element E6, and a seventh element E7 having a fourth attribute as a second group. The elements displayed as the groups may be displayed at positions associated with each other (e.g., in the same column or in the same row), or may be displayed based on visual characteristics associated with each other (e.g., shapes or colors corresponding to each other).

According to various embodiments of the disclosure, the electronic device 101 (e.g., at least one processor 120) may gradually perform the operation of reconfiguring a plurality of elements. For example, when reconfiguring at least some of a plurality of elements E1 to E7 included in the first execution screen (e.g., position shift or visual attribute change) as illustrated in 2402 and 2403 of FIG. 24, the electronic device 101 may gradually shift the positions of the elements or may gradually change the visual characteristics (e.g., shapes or colors) of the elements.

The electronic device 101 (e.g., at least one processor 120) may perform an operation of gradually changing the elements for various periods. As an example, when the reconfiguration of the elements is performed from the point in time at which the angle between two housings does not change, at least some of the plurality of elements may be gradually reconstructed from the point in time at which there is no change in the angle for a preset time. As another example, when the reconfiguration of the elements is performed from the point in time at which the change in the angle between two housings is detected (or the point in time at which a change in the state of the hinge is detected), at least some of the plurality of elements may be reconfigured until the change of the angle is stopped from the point in time at which the angle is changed based on the range within which the angle at the point in time at which the change of the angle is stopped falls.

In addition, when performing the operation of reconfiguring a plurality of elements, the electronic device 101 (e.g., at least one processor 120) may provide various effects. A redundant description of the provision of the various effects will be omitted.

According to various embodiments of the disclosure, elements providing a specific function may be implemented to provide the same function before and after movement. For example, when receiving input for an element 2214 for call reception on a call reception screen 2213 in which the elements have been reconfigured, as illustrated in 2203 of FIG. 22, the electronic device 101 may perform an operation of displaying the call reception screen, as illustrated in 2204 of FIG. 22. In addition, for example, when displaying a lock screen in which elements have been reconfigured, as illustrated in 2303 of FIG. 23, the electronic device 101 may receive selection of an element for providing a specific function (e.g., a message preparation function) displayed on the lock screen, and may execute an operation associated with the specific function (e.g., unlocking the lock screen and executing an application for writing a message), as illustrated in 2304 and 2305 of FIG. 23. At this time, when the operation associated with the specific function is to execute a predetermined application in the foreground mode, the predetermined application executed in the foreground mode may display an execution screen corresponding to the current state of the housings of the electronic device 101 (e.g., the angle between the housings).

Hereinafter, still other operations of the electronic device 101 according to various embodiments will be described.

According to various embodiments of the disclosure, the electronic device 101 may display an icon for changing an execution screen depending on whether or not a portion of the electronic device 101 (e.g., at least one of the first housing and the second housing) is in contact with the support surface. In other words, when the electronic device 101 is gripped by the user, the electronic device 101 may display an icon for displaying an execution screen corresponding to a range within which the changed angle falls.

Figure 26:
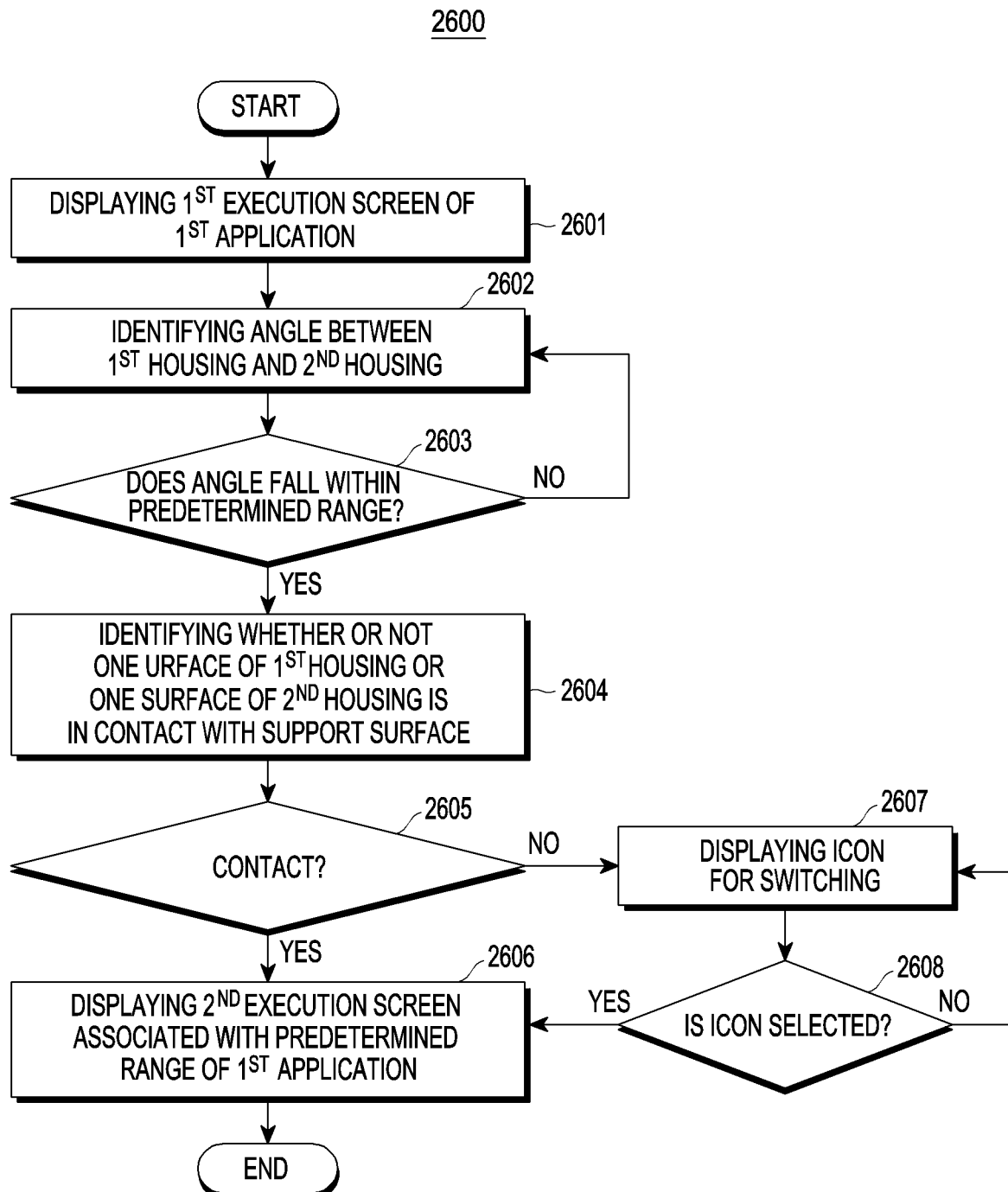
FIG. 26 is a flowchart illustrating operations of an electronic device according to an embodiment of the disclosure.

FIG. 26 is a flowchart 2600 illustrating operations of an electronic device 101 according to an embodiment of the disclosure. According to various embodiments of the disclosure, the operations illustrated in FIG. 26 are not limited to the illustrated order, and may be performed in various orders. In addition, according to various embodiments of the disclosure, a greater or smaller number of operations than the operations illustrated in FIG. 26 may be performed. Hereinafter, the operations of FIG. 26 will be described with reference to FIG. 27.

Figure 27:
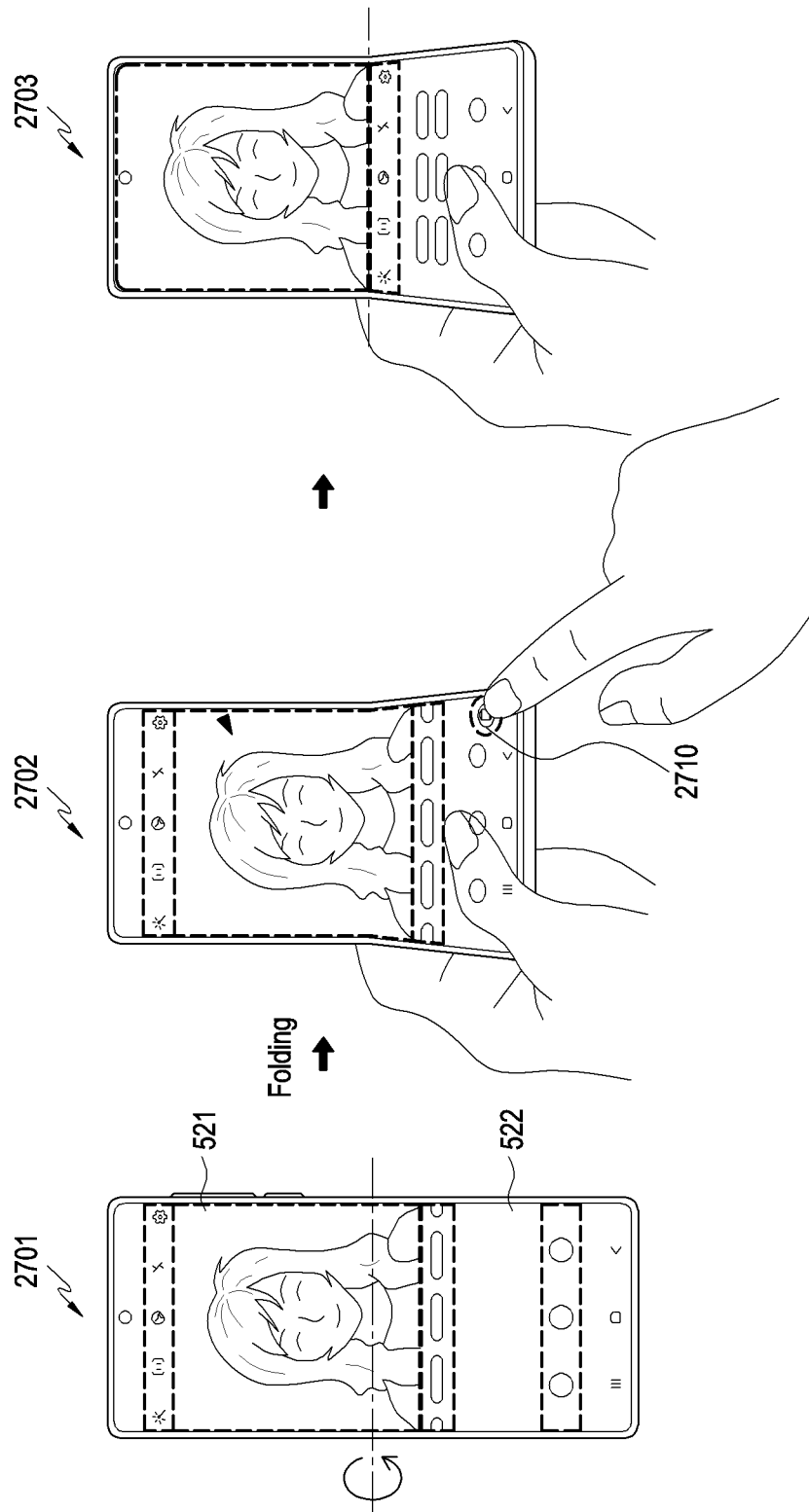
FIG. 27 is a view illustrating operations of an electronic device according to an embodiment of the disclosure.

FIG. 27 is a view illustrating operations of an electronic device 101 according to an embodiment of the disclosure.

Referring to FIG. 27, the dotted lines may indicate elements included in execution screens. The execution screens are not limited to those illustrated in FIG. 27, and may further include additional elements, or may include fewer elements.

According to various embodiments of the disclosure, the electronic device 101 (e.g., at least one processor 120) may display a first execution screen of a first application in operation 2601. For example, as illustrated in 2701 of FIG. 27, the electronic device 101 may execute a first application, and may display an execution screen including a plurality of elements of the first application. Since operation 2601 of the electronic device 101 may be performed in the same manner as operations 801 and 1101 of the electronic device 101 described above, a redundant description will be omitted.

According to various embodiments of the disclosure, the electronic device 101 (e.g., at least one processor 120) may identify the angle between the first housing and the second housing in operation 2602, and may identify whether or not the angle falls within a predetermined range in operation 2603. For example, the electronic device 101 may identify that the angle between the housing structures (e.g., 521, 522) is changed as illustrated in 2701 of FIG. 27, and when the angle falls within a predetermined range, the electronic device 101 may identify the mode of the electronic device 101 corresponding to the predetermined range. Since operations 2602 and 2603 of the electronic device 101 may be performed in the same manner as operations 802 and 803 of the electronic device 101 and operations 1102 and 1103 of the electronic device 101 described above, a redundant description will be omitted.

According to various embodiments of the disclosure, the electronic device 101 (e.g., at least one processor 120) may identify whether or not one surface of the first housing or one surface of the second housing is in contact with a support surface in operation 2604. For example, when the electronic device 101 is gripped by the user's hand as illustrated in 2702 of FIG. 27, the electronic device 101 may identify that one surface of the housings of the electronic device 101 is not in contact with a support surface.

According to various embodiments of the disclosure, the electronic device 101 (e.g., at least one processor 120) may identify whether or not one surface of the first housing or one surface of the second housing is in contact with a support surface (e.g., any of surfaces of various objects) in operation 2604 using various kinds of sensor modules. For example, the electronic device 101 may identify whether or not the electronic device 101 is in contact with a support surface by outputting a signal and identifying a reflected and received signal using an NFC module provided in each of the housings. As an example, the electronic device 101 may identify a reflected and received signal using an NFC module, and may compare the characteristics of a signal received when the electronic device 101 is in contact with the support surface (e.g., any of surfaces of various objects), for which the characteristics of the identified signal have been previously stored, with the characteristics of a signal received when the electronic device 101 is gripped in the hand. As a result of the comparison, when the characteristics of the received signal correspond to the characteristics of the signal received when the electronic device 101 is in contact with a support surface, the electronic device 101 may identify that the housing thereof provided with an NFC module is in contact with a support surface.

According to various embodiments of the disclosure, when it is identified in operation 2605 that one surface of the housing is in contact with the support surface, the electronic device 101 (e.g., at least one processor 120) may display a second execution screen associated with the predetermined range of the first application in operation 2606. In other words, when the electronic device 101 is in contact with a support surface, it is determined that the user intends to use the reconfigured execution screen based on the current state of the electronic device 101, and the electronic device 101 displays the reconfigured execution screen. Therefore, it is possible to improve the convenience with which the user uses an application.

According to various embodiments of the disclosure, when it is identified in operation 2605 that the electronic device 101 is not in contact with a support surface, the electronic device 101 (e.g., at least one processor 120) may display an icon for changing an execution screen in operation 2607. For example, as illustrated in 2702 of FIG. 27, the electronic device 101 may display an icon 2710 for causing the first application to change the execution screen. When the icon 2710 is selected, the first application may be caused to change the execution screen to an execution screen (e.g., a screen shown in 2703) corresponding to a predetermined range within which the current angle falls.

According to various embodiments of the disclosure, the electronic device 101 (e.g., at least one processor 120) may display the icon at various positions. For example, as illustrated in 2702 of FIG. 27, the electronic device 101 may display the icon 2710 on the first execution screen of the currently displayed first application. In addition, for example, the electronic device 101 may be implemented such that an icon is displayed in a menu (e.g., a drop menu) displayed when the icon is called, regardless of the first execution screen.

According to various embodiments of the disclosure, when an icon is selected in operation 2608, the electronic device 101 (e.g., at least one processor 120) may display a second execution screen associated with the predetermined range of the first application in operation 2606. For example, as illustrated in 2703 of FIG. 27, the electronic device 101 may display a second execution screen associated with a mode (e.g., a half-folded mode) corresponding to the predetermined range.

According to various embodiments of the disclosure, the electronic device 101 is not limited to the above description. In contrast, the electronic device 101 may be implemented such that, when the electronic device 101 is in contact with a support surface, the electronic device 101 displays an icon, and when the electronic device 101 is not in contact with a support surface (that is, when the electronic device 101 is gripped in the hand), the electronic device 101 performs control such that the execution screen is automatically changed.

Hereinafter, still other operations of the electronic device 101 according to various embodiments will be described.

According to various embodiments of the disclosure, the electronic device 101 may set angular ranges associated with modes to be different from each other depending on whether or not a portion thereof (e.g., at least one of the first housing structure 521 and the second housing 522) is in contact with a support surface.

Figure 28:
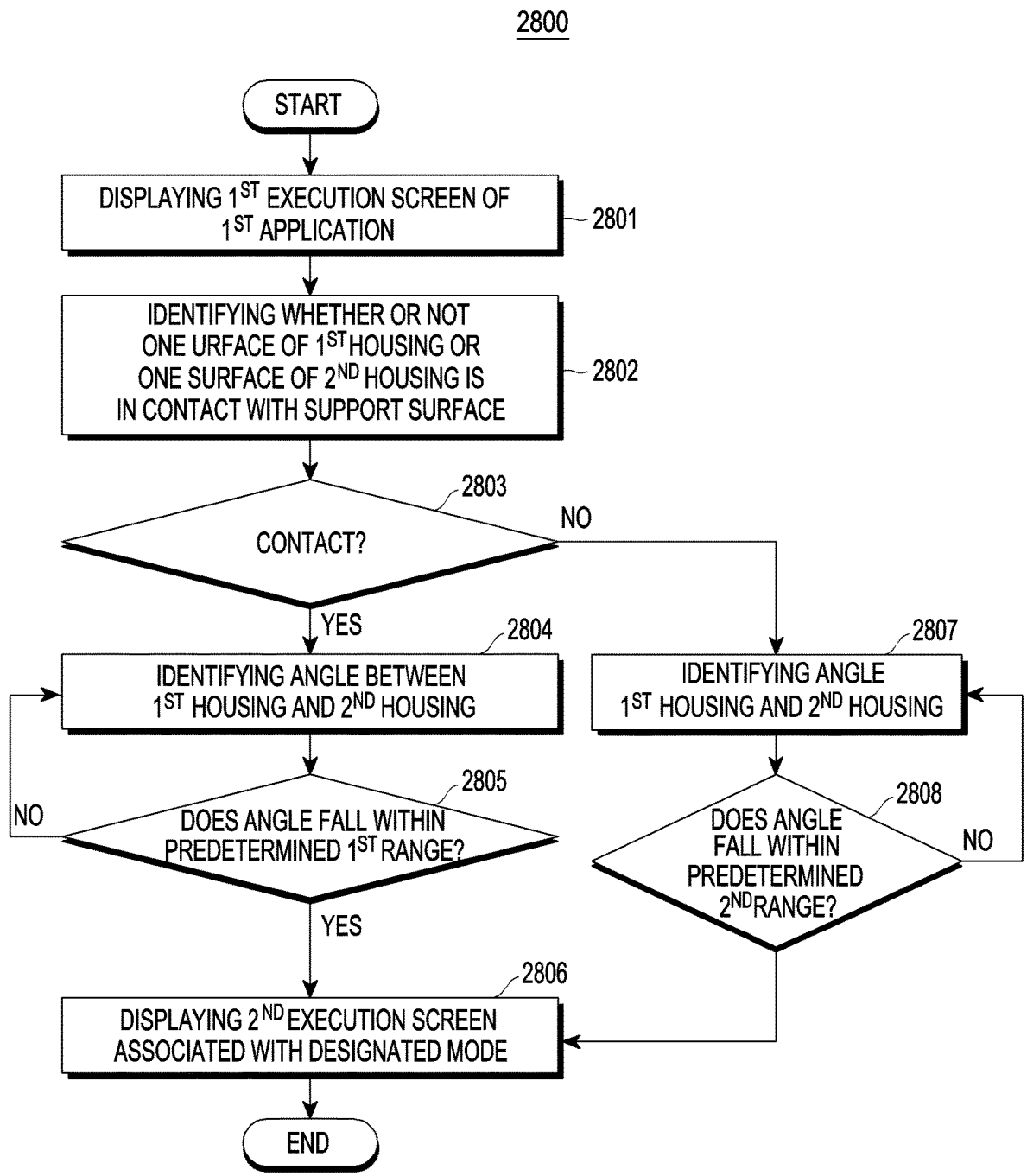
FIG. 28 is a flowchart illustrating operations of an electronic device according to an embodiment of the disclosure.

FIG. 28 is a flowchart 2800 illustrating operations of the electronic device 101 according to an embodiment of the disclosure. According to various embodiments of the disclosure, the operations illustrated in FIG. 28 are not limited to the illustrated order, and may be performed in various orders. In addition, according to various embodiments of the disclosure, a greater or smaller number of operations than the operations illustrated in FIG. 28 may be performed. Hereinafter, the operations of FIG. 28 will be described with reference to FIG. 29.

Figure 29:
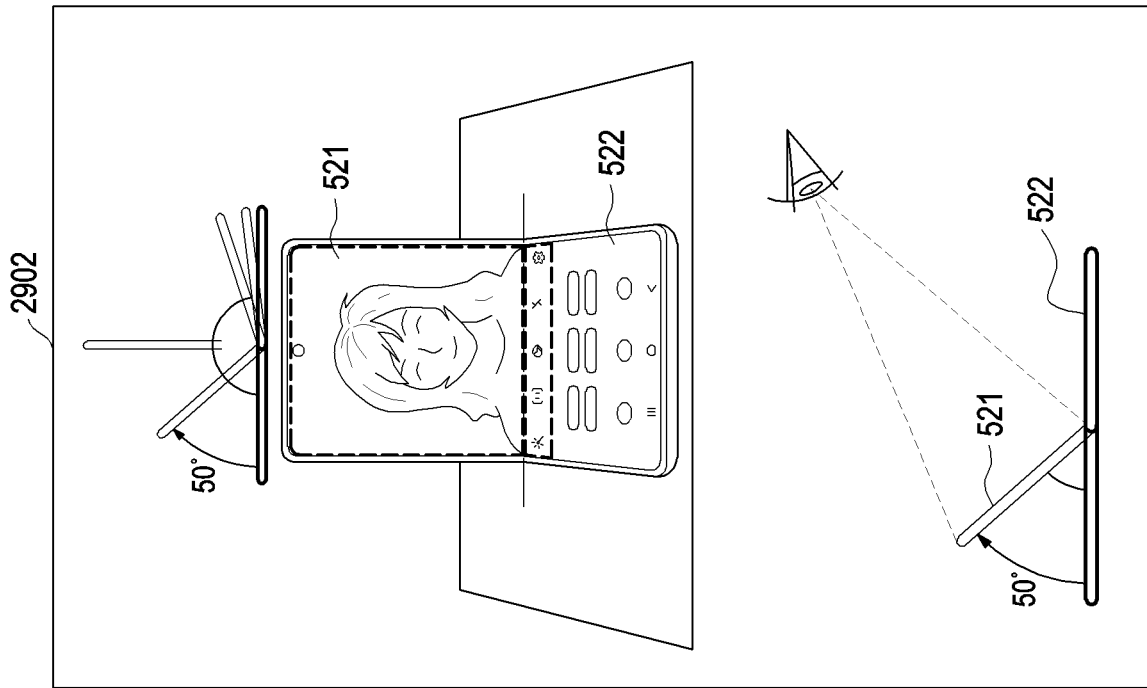
FIG. 29 is a view illustrating operations of an electronic device according to an embodiment of the disclosure.
Figure 29:
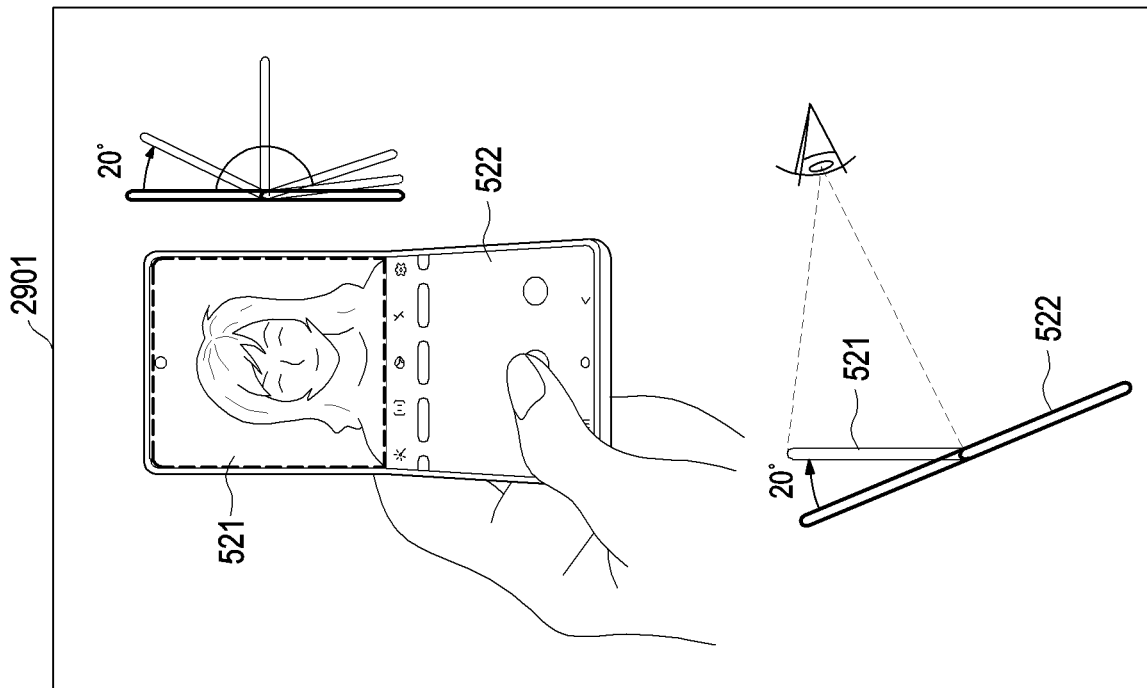

FIG. 29 is a view illustrating operations of an electronic device 101 according to an embodiment of the disclosure.

According to various embodiments of the disclosure, the electronic device 101 (e.g., at least one processor 120) may display a first execution screen of a first application in operation 2801. For example, the electronic device 101 may execute a first application, and may display an execution screen including a plurality of elements of the first application. Since operation 2801 of the electronic device 101 may be performed in the same manner as operations 801 and 1101 of the electronic device 101 described above, a redundant description will be omitted.

According to various embodiments of the disclosure, the electronic device 101 (e.g., at least one processor 120) may identify whether or not one surface of the first housing structure 521 or one surface of the second housing structure 522 is in contact with a support surface in operation 2802. For example, when the electronic device 101 is placed on a table as illustrated in 2902 of FIG. 29, the electronic device 101 may identify that one surface of one of the housings of the electronic device 101 is in contact with a support surface. Since operation 2802 of the electronic device 101 may be performed in the same manner as operation 2604 of the electronic device 101 described above, a redundant description will be omitted.

According to various embodiments of the disclosure, the electronic device 101 (e.g., at least one processor 120) may set different angular ranges for respective modes depending on whether or not the electronic device 101 is in contact with a support surface. For example, when the electronic device 101 is in contact with a support surface, the electronic device 101 sets a first angular range to correspond to the first mode, and when the electronic device 101 is not in contact with a support surface, the electronic device 101 may set a second angular range to correspond to the first mode. The first angular range and the second angular range may be different from each other. For example, the maximum angle of the first angular range may be different from (e.g., may be larger or smaller than) the maximum angle of the second angular range, and the minimum angle of the first angular range may be different from (e.g., may be larger or smaller than) the minimum of the second angular range.

For example, when the electronic device 101 is in contact with a support surface, as illustrated in 2902 of FIG. 29, the electronic device 101 (e.g., at least one processor 120) may set the first angular range (e.g., 91° to 130°) to correspond to the half-folded mode, and when the electronic device 101 is not in contact with a support surface, as illustrated in 2901 of FIG. 29 (e.g., when the electronic device 101 is gripped by the user's hand), the electronic device 101 (e.g., the at least one processor 120) may set the second angular range (e.g., 91° to) 160° to correspond to the half-folded mode. In other words, when the electronic device 101 is not in contact with a support surface, the electronic device 101 may cause an execution screen corresponding to the half-folded mode to be displayed at a relatively larger angle between the first housing structure 521 and the second housing structure 522. The angular ranges set to be different from each other depending on whether or not the electronic device 101 is in contact with a support surface may be set based on the user's ability to view a specific area (e.g., the first area) of the display of the electronic device 101, as illustrated in FIG. 29. For example, when the electronic device 101 is not in contact with the support surface and is gripped by the user, the angular range may be set such that an execution screen corresponding to the half-folded mode is displayed in the state in which the angle between the first housing structure 521 corresponding to the first area of the display that is viewed by the user and the second housing structure 522 is larger, considering that the electronic device 101 is gripped in the hand at a predetermined angle.

Meanwhile, the first angular range and the second angular range associated with the half-folded mode may be set without being limited to the above-mentioned specific angular ranges.

According to various embodiments of the disclosure, when it is identified in operation 2803 that the electronic device 101 is in contact with a support surface, the electronic device 101 (e.g., at least one processor 120) may identify the angle between the first housing structure 521 and the second housing structure 522 in operation 2804, and may identify whether or not the identified angle falls within the first range in operation 2805. For example, when it is identified that the electronic device 101 is in contact with a support surface (e.g., the surface formed on a table), as illustrated in 2902 of FIG. 29, the electronic device 101 may identify that the angle between the first housing structure 521 and the second housing structure 522 is 130° and that the angle falls within the first angular range (e.g., 91° to 130°), and may identify a designated mode (e.g., a half-folded mode) corresponding to the first angular range.

According to various embodiments of the disclosure, when it is identified in operation 2803 that the electronic device 101 is not in contact with a support surface, the electronic device 101 (e.g., at least one processor 120) may identify the angle between the first housing structure 521 and the second housing structure 522 in operation 2807, and may identify whether or not the identified angle falls within the second range in operation 2808. For example, when it is identified that the electronic device 101 is not in contact with a support surface (e.g., a table), as illustrated in 2901 of FIG. 29, the electronic device 101 may identify that the angle between the first housing structure 521 and the second housing structure 522 is 160° and that the angle falls within the second angular range (e.g., 91° to 160°), and may identify a designated mode (e.g., a half-folded mode) corresponding to the second angular range.

According to various embodiments of the disclosure, the electronic device 101 (e.g., at least one processor 120) may display a second execution screen of a first application associated with the designated mode in operation 2806. Since operation 2806 of the electronic device 101 may be performed in the same manner as operation 804 of the electronic device 101 and operation 1106 of the electronic device 101 described above, a redundant description will be omitted.

In addition, according to various embodiments of the disclosure, rather than being limited to the foregoing description, the electronic device 101 may set different ranges for respective specific modes according to various states of the electronic device 101, in addition to whether or not the electronic device 101 is in contact with a support surface.

Hereinafter, still other operations of the electronic device 101 according to various embodiments will be described.

According to various embodiments of the disclosure, the electronic device 101 may execute a designated application based on the angle between the housings, and may display an execution screen of the executed designated application that corresponds to a predetermined range within which the angle between the housings falls.

Figure 30:
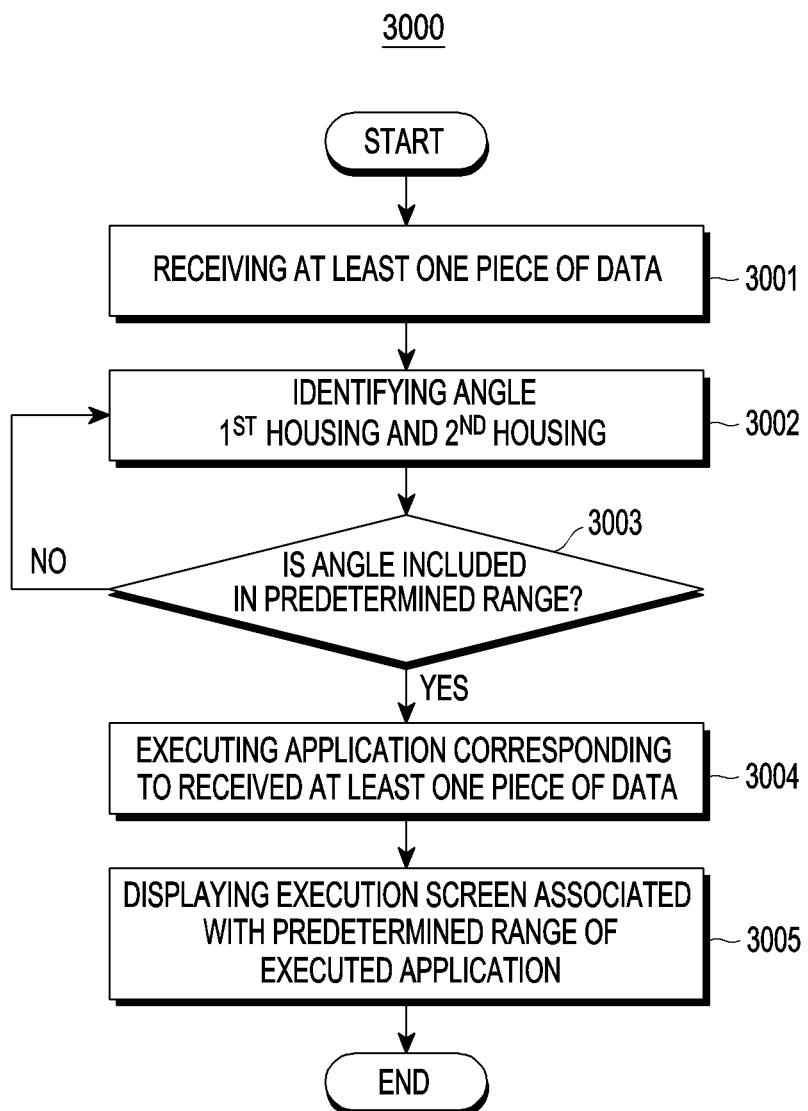
FIG. 30 is a flowchart illustrating operations of an electronic device according to an embodiment of the disclosure.

FIG. 30 is a flowchart 3000 operations of the electronic device 101 according to an embodiment of the disclosure.

Referring to FIG. 30, the operations are not limited to the illustrated order, and may be performed in various orders. In addition, according to various embodiments of the disclosure, a greater or smaller number of operations than the operations illustrated in FIG. 30 may be performed. Hereinafter, the operations of FIG. 30 will be described with reference to FIGS. 31 and 32.

Figure 31:
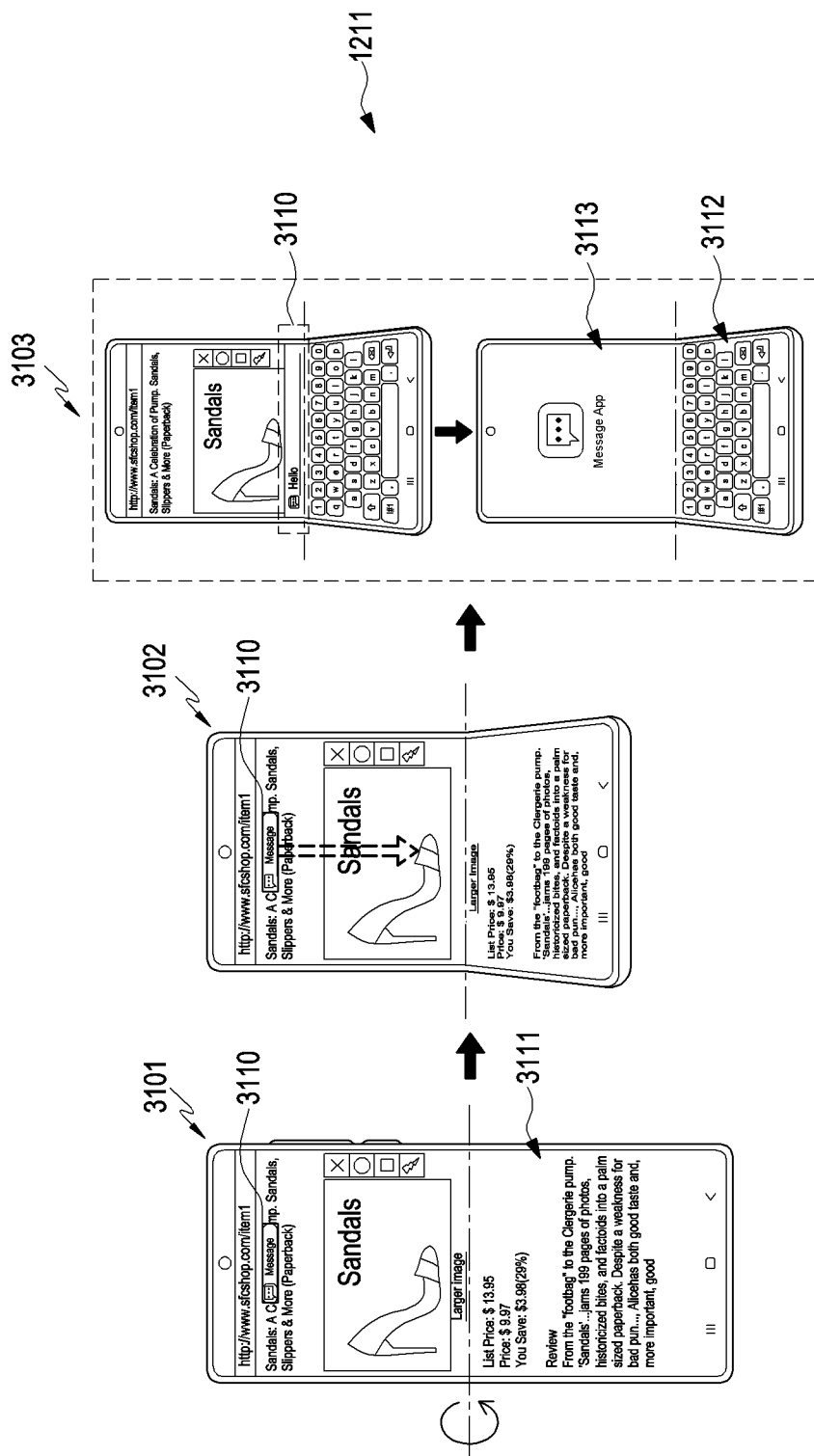
FIG. 31 is a view illustrating operations according to a change of state (e.g., a change of state of housings) of an electronic device when data is received by an electronic device according to an embodiment of the disclosure.
Figure 32:
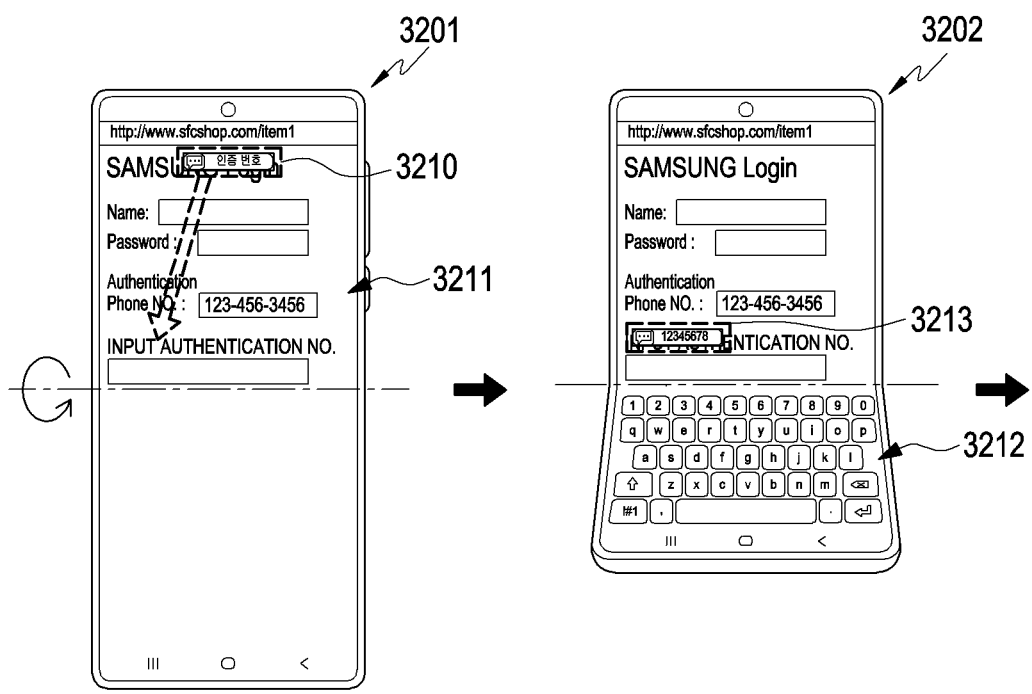
FIG. 32 is a view illustrating operations according to a change of state (e.g., a change of state of housings) of an electronic device when data is received by an electronic device according to an embodiment of the disclosure.

FIG. 31 is a view illustrating operations according to a change of state (e.g., change of state of housings) of an electronic device 101 when data is received by the electronic device 101 according to an embodiment of the disclosure. FIG. 32 is a view illustrating operations according to a change of state (e.g., a change of state of housings) of an electronic device when data is received by the electronic device according to an embodiment of the disclosure.

According to various embodiments of the disclosure, the electronic device 101 may acquire at least one piece of data in operation 3001.

According to various embodiments of the disclosure, the electronic device 101 (e.g., at least one processor 120) may receive various data from an external device 102 or 104. For example, the electronic device 101 may receive at least one piece of data from an external electronic device 102 or 104. As an example, as illustrated in 3101 and 3102 of FIGS. 31 and 3202 of FIG. 32, the electronic device 101 may receive a message 3110 or 3210 including at least one piece of data from an external electronic device while an execution screen of a specific application (e.g., a web screen 3111 or 3211) is being displayed. Alternatively, without being limited to the above description, the electronic device 101 may receive at least one piece of data from an external electronic device while displaying a home screen.

According to various embodiments of the disclosure, the electronic device 101 (e.g., the at least one processor 120) may acquire information on a specific event occurring in the electronic device 101. For example, the electronic device 101 may acquire information on an application of a currently displayed execution screen.

According to various embodiments of the disclosure, the electronic device 101 may identify the angle between the first housing and the second housing in operation 3002, and may identify whether or not the angle falls within a predetermined range in operation 3003. Since operations 3002 and 3003 of the electronic device 101 may be performed in the same manner as operations 802 and 803 described above, a redundant description will be omitted. The electronic device 101 may perform operation 3004 when the current angle between the housings falls within a predetermined range.

According to various embodiments of the disclosure, the electronic device 101 (e.g., at least one processor 120) may identify whether or not an application corresponding to at least one piece of data acquired based on the angle between the housings is executed. For example, when the angle between the housings falls within a predetermined range, the electronic device 101 may initiate operation 3004.

According to various embodiments of the disclosure, the electronic device 101 (e.g., at least one processor 120) may execute an application corresponding to the acquired at least one piece of data in operation 3004.

According to various embodiments of the disclosure, the electronic device 101 (e.g., at least one processor 120) may identify an application corresponding to the message 3110 or 3210 received from an external electronic device 102 or 104, and may execute the identified application.

For example, as illustrated in 3101 of FIG. 31 or 3201 of FIG. 32, in response to the currently received message 3110 or 3210, the electronic device 101 (e.g., at least one processor 120) may identify a virtual keyboard application 3112 or 3212 or a message preparation application 3113, and may execute the identified virtual keyboard application 3112 or 3212 or message preparation application 3113. In addition, for example, the electronic device 101 may identify the content included in the currently received message, and may execute an application corresponding to the content. For example, the electronic device 101 may perform web crawling or application retrieval based on the content included in the currently received message, and may execute the retrieved application.

According to various embodiments of the disclosure, the electronic device 101 may identify an application corresponding to information related to a currently acquired event, and may execute the identified application.

For example, the electronic device 101 (e.g., at least one processor 120) may identify information on an application of a currently displayed execution screen, and may retrieve and execute an application associated with the identified application. The associated application may be an application having a degree of association with a currently running application equal to or greater than a preset value. The degree of association may be determined based on user data, for example, when two applications are used together or when another application is executed before or after execution of one application. In other words, the electronic device 101 may identify an application that has been frequently used together with the currently running application, or an application that has been frequently executed before or after execution of a previously executed application, and may execute the identified application.

In addition, for example, the electronic device 101 (e.g., at least one processor 120) may identify content included in the currently displayed execution screen, and may retrieve an application corresponding to the identified content. For example, the electronic device 101 may perform web crawling or application retrieval based on the content included in the currently displayed execution screen, and may execute the retrieved application.

According to various embodiments of the disclosure, the electronic device 101 (e.g., at least one processor 120) may display an execution screen associated with the predetermined range of the executed application in operation 3005.

For example, the electronic device 101 (e.g., at least one processor 120) may perform control such that an execution screen of the executed application is displayed based on a mode corresponding to the range within which the current angle falls (e.g., a half-folded mode). A description overlapping that of the operation of displaying an execution screen of an application based on a mode corresponding to the range within which the current angle of the electronic device 101 falls will be omitted.

In addition, for example, when execution screens of two or more applications are displayed because another application is executed while an application is running, the electronic device 101 (e.g., at least one processor 120) may display the execution screens of two or more applications in respective areas of the display. For example, as illustrated in 3103 of FIG. 31, the electronic device 101 may display an execution screen of an executed message preparation application 3113 in the first area, and may display an execution screen of a virtual keyboard application 3112 in the second area. For example, as illustrated in 3202 of FIG. 32, the electronic device 101 may display a popup screen 3213, which is produced in response to the reception of a message and has a predetermined size, in the first area, and may display an execution screen of a virtual keyboard application 3212 in the second area.

Hereinafter, still other operations of the electronic device according to various embodiments will be described.

According to various embodiments of the disclosure, when an angle between housings is within a predetermined range while displaying a plurality of execution screens, the electronic device may display the plurality of execution screens based on a mode corresponding to the predetermined range.

Figure 33:
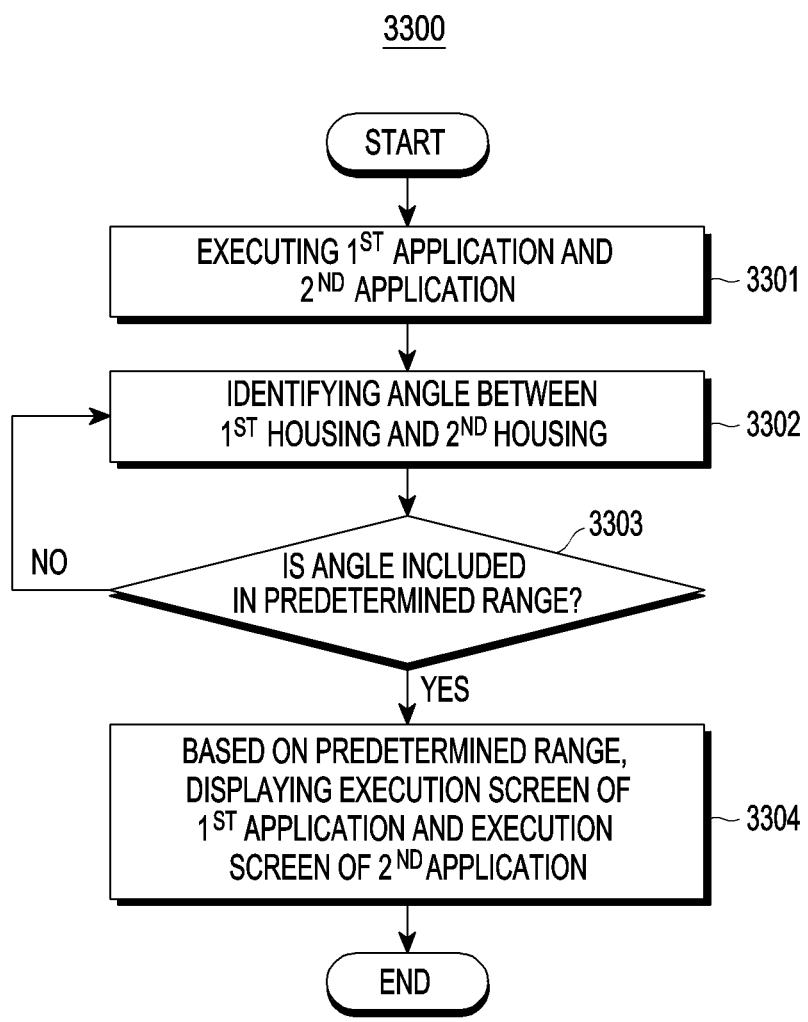
FIG. 33 is a flowchart illustrating operations of an electronic device according to an embodiment of the disclosure.

FIG. 33 is a flowchart 3300 illustrating operations of an electronic device 101 according to an embodiment of the disclosure.

Referring to FIG. 33, the operations are not limited to the illustrated order, and may be performed in various orders. In addition, according to various embodiments of the disclosure, a greater or smaller number of operations than the operations illustrated in FIG. 33 may be performed. Hereinafter, the operations of FIG. 33 will be described with reference to FIG. 34.

Figure 34:
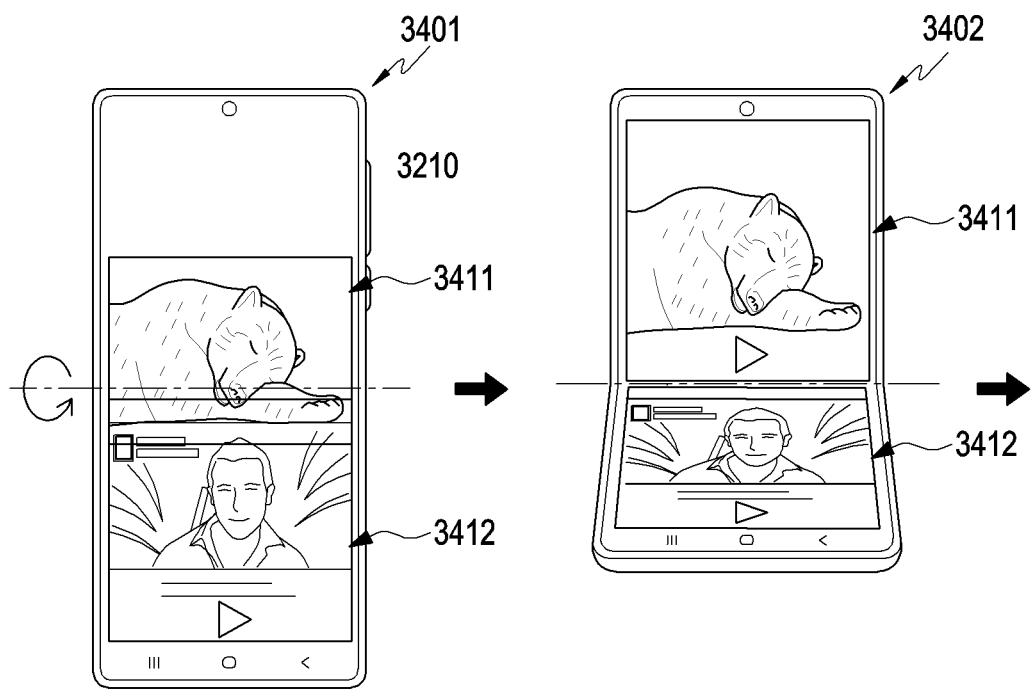
FIG. 34 is a view illustrating an operation of changing an execution screen when a plurality of execution screens are displayed in an electronic device according to an embodiment of the disclosure.

FIG. 34 is a view illustrating an operation of changing an execution screen when a plurality of execution screens are displayed in an electronic device according to an embodiment of the disclosure.

Referring to FIG. 34, the electronic device 101 (e.g., at least one processor 120) may execute a first application and a second application in operation 3301. For example, as illustrated in 3401 of FIG. 34, in the state in which the angle between the housings is a predetermined angle (e.g., 180°), the electronic device may execute the first application and the second application, and may display an execution screen 3411 of the first application (e.g., an execution screen of a first video playback application) and an execution screen 3412 of the second application (e.g., an execution screen of a second video playback application). In addition, for example, the electronic device may display a plurality of execution screens in different states of the same application (e.g., the first application). The plurality of execution screens displayed together on one display may be displayed regardless of an area of the display. For example, as illustrated in 3401 of FIG. 34, the execution screen 3411 of the first application may be displayed over the entire area of the display, and the execution screen 3412 of the second application may be displayed on the execution screen 3411 of the first application to overlap the same.

According to various embodiments of the disclosure, the electronic device 101 (e.g., at least one processor 120) may identify the angle between the first housing and the second housing in operation 3302, and may identify whether or not the identified angle falls within a predetermined range in operation 3303. Since operations 3302 and 3303 of the electronic device may be performed in the same manner as operations 802 and 803 and operations 1102 and 1103 of the electronic device 101 described above, a redundant description will be omitted.

According to various embodiments of the disclosure, the electronic device 101 (e.g., at least one processor 120) may display an execution screen of the first application and an execution screen of the second application based on the predetermined range in operation 3304.

For example, when the current mode is a half-folded mode, the electronic device may display execution screens in respective designated areas of the display. For example, as illustrated in 3402 of FIG. 34, the electronic device may display the execution screen 3411 of the first application in a first area corresponding to the first housing of the display, and may display the execution screen 3412 of the second application in a second area corresponding to the second housing of the display.

Hereinafter, still other operations of the electronic device 101 according to various embodiments will be described.

According to various embodiments of the disclosure, the electronic device 101 may include two or more housings, and may change execution screens of applications based on angles between the two or more included housings.

Figure 35:
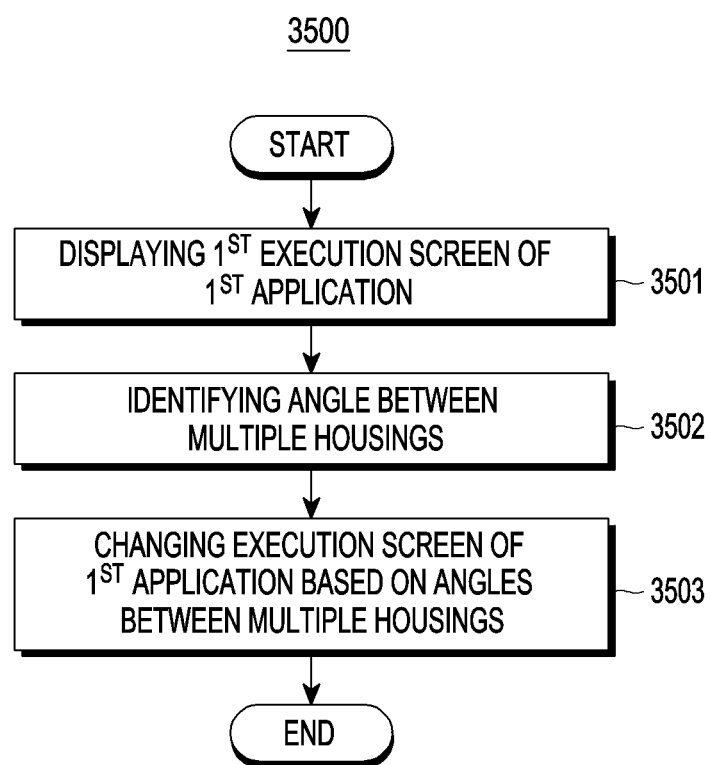
FIG. 35 is a flowchart illustrating operations of an electronic device according to an embodiment of the disclosure.

FIG. 35 is a flowchart 3500 illustrating operations of an electronic device 101 according to an embodiment of the disclosure.

Referring to FIG. 35, the operations are not limited to the illustrated order, and may be performed in various orders. In addition, according to various embodiments of the disclosure, a greater or smaller number of operations than the operations illustrated in FIG. 35 may be performed. Hereinafter, the operations of FIG. 35 will be described with reference to FIGS. 36 and 37.

Figure 36:
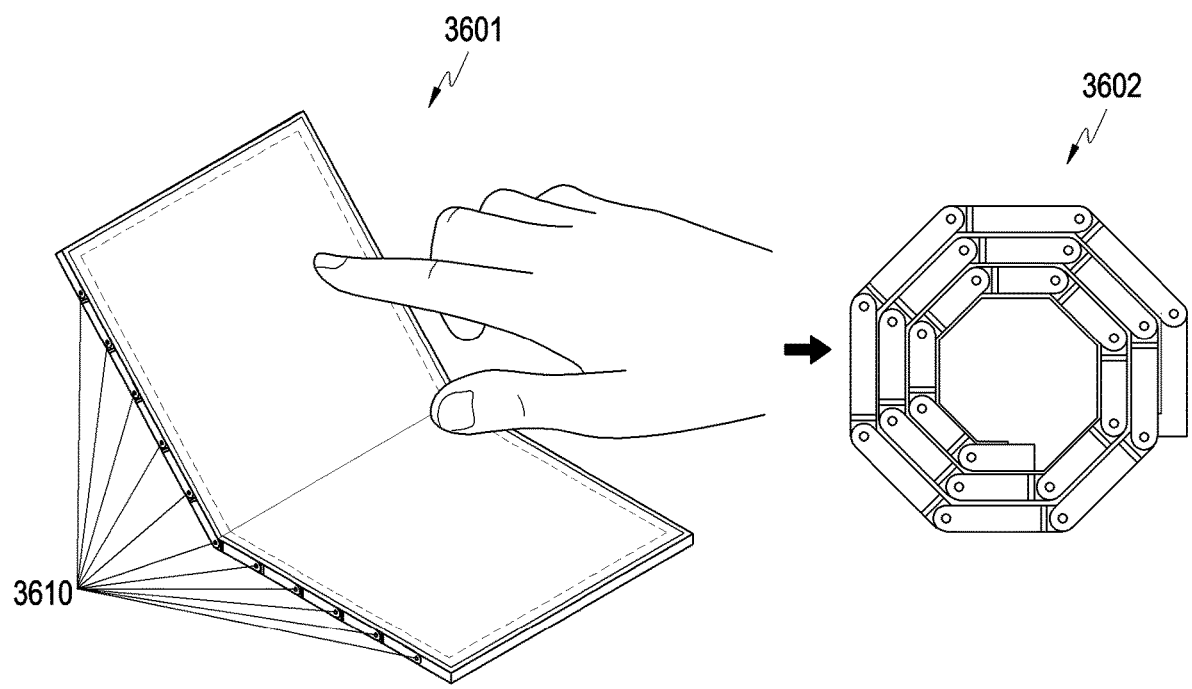
FIG. 36 is a view illustrating operations of an electronic device including at least two housings according to an embodiment of the disclosure.
Figure 37:
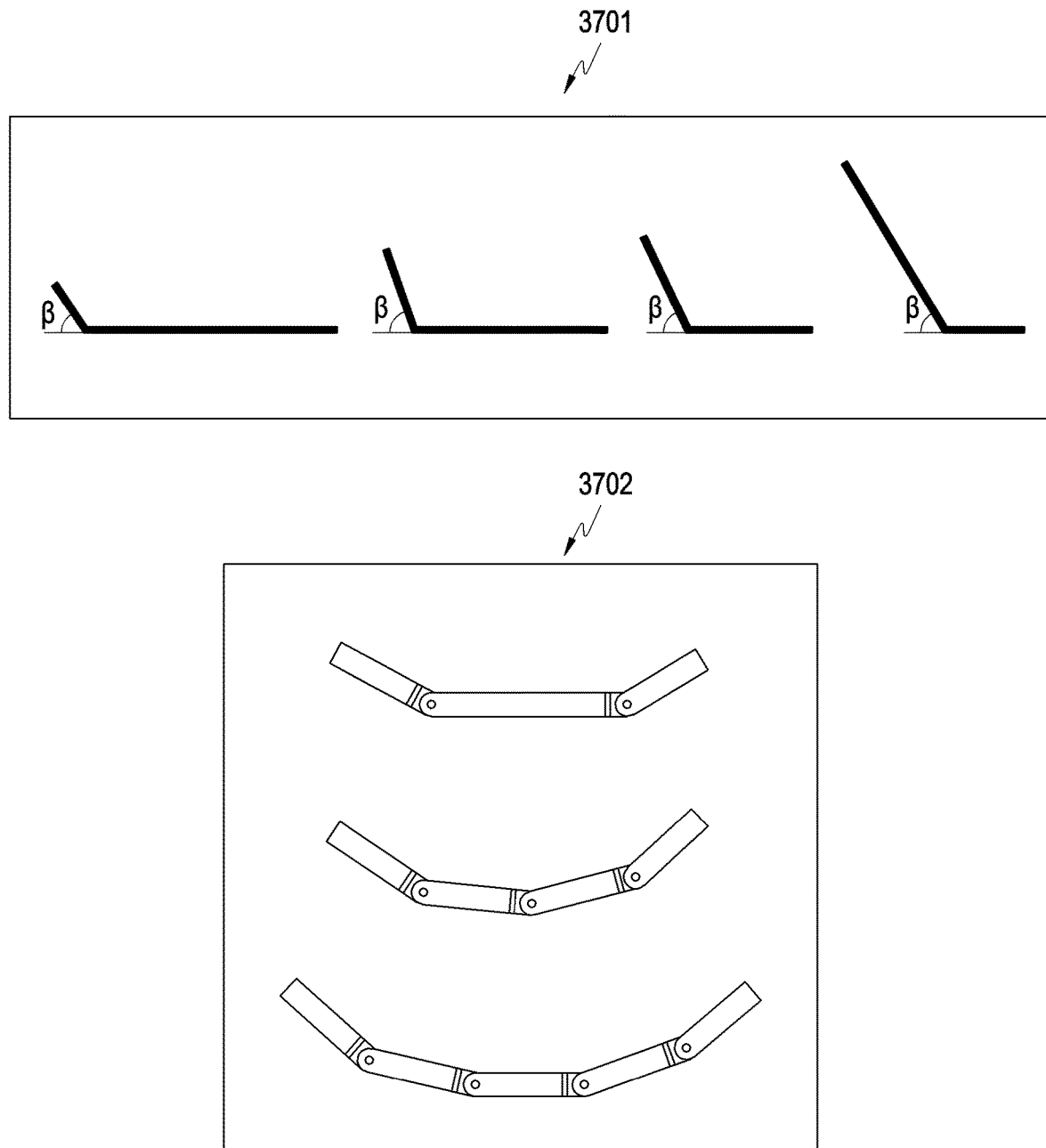
FIG. 37 is a view illustrating operations of an electronic device including at least two housings according to an embodiment of the disclosure.

FIG. 36 is a view illustrating operations of an electronic device 101 including at least two housings according to an embodiment of the disclosure. FIG. 37 is a view illustrating operations of an electronic device 101 including at least two housings according to an embodiment of the disclosure.

According to various embodiments of the disclosure, the electronic device 101 (e.g., at least one processor 120) may display a first execution screen of a first application in operation 3501. Since operation 3501 of the electronic device 101 may be performed in the same manner as operation 801 of the electronic device 101 and operation 1101 of the electronic device 101 described above, a redundant description will be omitted.

According to various embodiments of the disclosure, the electronic device 101 (e.g., at least one processor 120) may identify angles between a plurality of housings in operation 3502.

According to various embodiments of the disclosure, the angles between the plurality of housings provided in the electronic device 101 may be changed when the states of at least some of the hinges 3610 are changed (e.g., when the angles between the portions of the hinge shafts connected to the housings are changed), as illustrated in 3601 and 3602 of FIG. 36. For example, when the state of a first hinge among the plurality of hinges 3610 is changed, the angle between a first housing group provided on one side (e.g., left) and a second housing group provided on the other side (e.g., right) of the first hinge may be changed. In addition, for example, when the state of each of a first hinge and a second hinge among the plurality of hinges 3610 is changed, the angles between a first housing group provided on one side of the first hinge, a second housing group provided between the first hinge and the second hinge, and a third housing group provided on the other side of the second hinge may be changed.

According to various embodiments of the disclosure, when at least some of the plurality of housings included in the electronic device 101 are rotated, areas in the display may be changed.

For example, referring to 3701 of FIG. 37, the sizes of areas on the display may be changed when hinges, the states of which are changed (e.g., which are rotated), are changed, among the hinges provided between the plurality of housings. For example, when the state of a first hinge among the plurality of hinges 3610 is changed, the areas on the display may include a first area of the display that corresponds to a first housing group provided on one side of the first hinge and a second area of the display that corresponds to a second housing group provided on the other side of the first hinge. For example, when the state of a second hinge different from the first hinge among the plurality of hinges 3610 is changed, the areas on the display may include a third area of the display, which corresponds to a third housing group provided on one side of the second hinge, and a fourth area of the display, which corresponds to a fourth housing group provided on the other side of the second hinge. In this case, the size of the first area and the size of the third area may be different from each other, and the size of the second area and the size of the fourth area may be different from each other.

In addition, for example, referring to 3702 of FIG. 37, the sizes of areas on the display may vary when hinges, the states of which are changed (e.g., which are rotated), are changed, among the hinges 3610 provided between the plurality of housings. For example, depending on the number of hinges, the states of which are changed, among the plurality of hinges 3610, the display may include display areas, the number of which is larger than the number of hinges by one. As an example, when the state of a first hinge is changed among the plurality of hinges 3610, the display of the electronic device 101 may include a first area and a second area, and when the states of a first hinge and a second hinge are changed, among the plurality of hinges 3610, the display of the electronic device 101 may include first to third areas.

In addition, for example, the sizes and the number of areas into which the display is divided may vary when hinges, the states of which are changed (e.g., which are rotated), are changed, among the hinges provided between the plurality of housings. A redundant description of the operation of varying the size and number of areas of the display will be omitted.

According to various embodiments of the disclosure, the electronic device 101 (e.g., the at least one processor 120) may change an execution screen of a first application based on the angles between the plurality of housings in operation 3503.

According to various embodiments of the disclosure, the electronic device 101 may cause a plurality of elements, which are included in a currently displayed first execution screen, to be reconfigured and displayed on a plurality of divided areas of the display as the states of at least some of the plurality of hinges 3610 are changed.

For example, the electronic device 101 (e.g., at least one processor 120) may display an execution screen in which a plurality of elements is reconstructed on a plurality of areas based on the sizes of the plurality of areas of the display. As an example, the electronic device 101 may display an element (e.g., a piece of content) having an attribute for providing a visual view among a plurality of elements in the largest display area, and may display an element implemented to provide a function in a relatively small display area.

In addition, for example, the electronic device 101 (e.g., at least one processor 120) may display an execution screen in which elements for providing a function among the plurality of elements are reconfigured to be displayed in areas other than the areas corresponding to the plurality of hinges 3610.

In this case, the electronic device 101 (e.g., at least one processor 120) may display an execution screen including elements reconfigured for respective areas of the display as described above by displaying an execution screen and/or a UI/UX provided by an application or by changing visual attributes of the elements included in an execution screen of the application (e.g., position shift). A description of operations overlapping the operation of displaying an execution screen and/or a UI/UX provided by an application and the operation of changing the visual attributes of the elements included in the execution screen of the application will be omitted. In other words, the description related to the operation of the electronic device 101 including two housings is applicable mutatis mutandis to the description related to the operation of an electronic device 101 including more than two housings.

Various embodiments may provide an electronic device including: a first housing, a second housing foldably connected with the first housing, a flexible display disposed on the first housing and the second housing, at least one sensor, a memory, and at least one processor operatively connected to the flexible display, the at least one sensor, and the memory, wherein the at least one processor is configured, when instructions stored in the memory are executed, to control the flexible display to display a first execution screen of a first application, based on an angle between the first housing and the second housing, which is identified using the at least one sensor, falling within a predetermined range, identify whether the first application supports changing of an execution screen according to a change in angle, and based on the first application supporting the changing of the execution screen according to the change in the angle, control the flexible display to display a second execution screen of the first application associated with the predetermined range instead of the first execution screen.

Various embodiments may provide an electronic device, wherein the first execution screen and the second execution screen correspond to one state of the first application.

Various embodiments may provide an electronic device, wherein the at least one processor is configured, when instructions stored in the memory are executed, to: execute a second application in a background mode, and based on the second application supporting the changing of the execution screen according to the change in the angle, perform control such that an execution screen of the second application is changed to an execution screen associated with the predetermined range based on the angle between the first housing and the second housing, which is identified using the at least one sensor, falling within the predetermined range.

Various embodiments may provide an electronic device, wherein the at least one processor is configured, when instructions stored in the memory are executed, to: control the flexible display to display the execution screen associated with the predetermined range of the second application when the second application, which is running in the background mode, is executed in a foreground mode.

Various embodiments may provide an electronic device, wherein the memory stores a list of at least one designated application, and the at least one designated application is configured to provide the execution screen associated with the predetermined range.

Various embodiments may provide an electronic device, wherein the first execution screen of the first application is associated with a horizontal mode or a vertical mode, and the second execution screen of the first application is associated with a mode associated with the predetermined range.

Various embodiments may provide an electronic device, wherein the memory stores information associated with a plurality of ranges associated with the angle including the predetermined range, and wherein the at least one processor is configured, when instructions stored in the memory are executed, to control the flexible display to display the first execution screen based on the angle falling within a first range different from the predetermined range among the plurality of ranges, and control the flexible display to display the second execution screen based on the angle falling within the predetermined range among the plurality of ranges.

Various embodiments may provide an electronic device, wherein the first execution screen of the first application includes a plurality of elements, wherein the at least one processor is configured, when instructions stored in the memory are executed, to: control the flexible display to display each of the plurality of elements in a first area or a second area based on an attribute of each of the plurality of elements when the angle between the first housing and the second housing falls within the predetermined range, and wherein the first area of the flexible display corresponds to the first housing, and the second area of the flexible display corresponds to the second housing.

Various embodiments may provide an electronic device, wherein the plurality of elements include at least one first element having a first attribute and at least one second element having a second attribute, wherein the first area is set to be associated with the first attribute, and the second area is set to be associated with the second attribute, and wherein the at least one processor is configured, when instructions stored in the memory are executed, to: identify coordinate information associated with an area between the first area and the second area, and based on the identified coordinate information, move the at least one first element having the first attribute to the first area and the at least one second element having the second attribute to the second area.

Various embodiments may provide an electronic device, wherein the at least one processor is configured, when instructions stored in the memory are executed, to: change at least one of a size, a brightness, a resolution, a contrast, or a shape of at least one of the at least one first element to be moved or the at least one second element to be moved.

Various embodiments may provide an electronic device, wherein the at least one processor is configured, when instructions stored in the memory are executed, to: based on the angle falling within the predetermined range, identify whether a surface of the first housing or a surface of the second housing is in contact with the support surface, based on identifying that the surface of the first housing or the surface of the second housing is not in contact with the support surface, control the flexible display to display an icon on the first execution screen, and control the flexible display to display the second execution screen when the icon is selected.

Various embodiments may provide an electronic device, wherein, based on identifying that the surface of the first housing is in contact with the support surface and that the surface of the second housing is not in contact with the support surface, the second execution screen includes the at least one element displayed in the first area and the at least one second element displayed in the second area.

Various embodiments may provide an electronic device, wherein the at least one processor is configured, when instructions stored in the memory are executed, to: identify whether a surface of the first housing or a surface of the second housing is in contact with a support surface, based on identifying that a surface of the first housing or a surface of the second housing is in contact with the support surface and the angle falls within a first range, control the flexible display to display the second execution screen, and based on identifying that the surface of the first housing or the surface of the second housing is not in contact with the support surface and when the angle falls within a second range different from the first range, control the flexible display to display the second execution screen.

Various embodiments may provide an electronic device further including at least one communication circuit, wherein the at least one processor is configured, when instructions stored in the memory are executed, to control the at least one communication circuit to receive at least one piece of data, based on the angle falling within the predetermined range, execute a second application corresponding to the at least one piece of data when the angle falls within the predetermined range, and control the flexible display to display an execution screen of the executed second application corresponding to the predetermined range.

Various embodiments may provide an electronic device further including a plurality of housings, wherein the flexible display is disposed on the plurality of housings, and wherein the at least one processor is configured, when instructions stored in the memory are executed, to identify an angle between each two adjacent ones of the plurality of housings using the at least one sensor, and display a third execution screen of the first application associated with the angle between each two adjacent ones of the plurality of housings.

Various embodiments may provide an electronic device, wherein the first execution screen includes a plurality of elements, and wherein the at least one processor is configured, when instructions stored in the memory are executed, to identify coordinates of an area between each two adjacent ones of the plurality of areas of the flexible display corresponding to the plurality of housings, and move the plurality of elements such that the plurality of elements is displayed on the plurality of areas based on the identified coordinates.

Various embodiments may provide a method of operating an electronic device including a first housing, a second housing, and a flexible display disposed on the first housing and the second housing, the method including displaying a first execution screen of a first application on the flexible display, based on an angle between the first housing and the second housing, which is identified using at least one sensor of the electronic device, falling within a predetermined range, identifying whether the first application supports changing of an execution screen according to a change in the angle, and based on the first application supporting the changing of the execution screen according to the change in the angle, displaying a second execution screen of the first application associated with the predetermined range instead of the first execution screen on the flexible display.

Various embodiment may provide a method of operating an electronic device, wherein the first execution screen and the second execution screen correspond to one state of the first application.

Various embodiment may provide a method of operating an electronic device, further including executing a second application in a background mode, wherein, based on the angle between the first housing and the second housing, which is identified using the at least one sensor, falling within the predetermined range, performing control such that an execution screen of the second application is changed to an execution screen associated with the predetermined range.

Various embodiments may provide a method of operating an electronic device including displaying the execution screen associated with the predetermined range of the second application when the second application, which is running in the background mode, is executed in a foreground mode.

Various embodiments may provide the electronic device including: a first housing, a second housing foldably connected with the first housing, a flexible display disposed on the first housing and the second housing, at least one sensor, a memory, and at least one processor operatively connected to the flexible display, the at least one sensor, and the memory, wherein the at least one processor is configured, when instructions stored in the memory are executed, to control the flexible display to display a first execution screen of a first application, based on an angle between the first housing and the second housing, which is identified using the at least one sensor, falling within a predetermined range, identify a plurality of graphic elements included in the first application, and control the flexible display to display, among the plurality of graphic elements, a first graphic element having a first attribute in a first area and a second graphic element having a second attribute in a second area, wherein the first area corresponds to the first housing, and the second area corresponds to the second housing.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a first housing;
a second housing foldably connected with the first housing;
a flexible display disposed on the first housing and the second housing;
at least one sensor;
at least one processor; and
memory storing instructions, that, when executed by the at least one processor, cause the electronic device to:
control the flexible display to display a first execution screen of a first application, which is executing in a foreground of the electronic device while executing a second application in a background of the electronic device, when the first housing and the second housing are in a partially folded state,
identify a user input to execute the second application in the foreground,
wherein the second application is configured to change an execution screen based on an angle between the first housing and the second housing, which is identified using the at least one sensor, falling within a predetermined range of the partially folded state, and
based on identifying the user input, control the flexible display to display a second execution screen of the second application associated with the predetermined range instead of the first execution screen,
wherein the second execution screen is configured to display a preview screen captured by a camera on a first portion of the flexible display corresponding to the first housing and to display, below the preview screen, a plurality of first UI elements and a plurality of second UI elements on a second portion of the flexible display corresponding to the second housing.

2. The electronic device of claim 1, wherein the second application includes a camera application.

3. The electronic device of claim 1, wherein the second execution screen corresponds to a half-folded mode of the electronic device.

4. The electronic device of claim 3, wherein the instructions, when executed by the at least one processor, cause the electronic device to:
control the flexible display not to display an executing screen of the second application while executing the second application in the background of the electronic device.

5. The electronic device of claim 1, wherein the memory stores a list of at least one designated application, and the at least one designated application is configured to provide an execution screen associated with the predetermined range.

6. The electronic device of claim 1, wherein the first UI elements and the second UI elements are classified as elements for providing specific functions while the preview screen is classified as an element for providing a visual view.

7. The electronic device of claim 6,
wherein the elements for providing the specific functions comprises a button, preferably a toggle button or a radio button, or an object including one or more of a tool bar, a dial, a slider, an input field, a drop-down menu, and a progress bar.

8. The electronic device of claim 1, wherein the flexible display comprises a first area corresponding to the first housing and a second area corresponding to the second housing.

9. The electronic device of claim 8, wherein the preview screen of the second execution screen is displayed on the first area, the first UI elements and the second UI elements of the second execution screen are displayed in the second area.

10. The electronic device of claim 1, wherein the instructions, when executed by the at least one processor, further cause the electronic device to:
based on identifying the user input while in an unfolded state, control the flexible display to display a third execution screen of the second application associated with the unfolded state by displaying the preview screen captured by the camera between the plurality of first UI elements and the plurality of second UI elements.

11. A method of operating an electronic device comprising a first housing, a second housing, and a flexible display disposed on the first housing and the second housing, the method comprising:
displaying, on the flexible display, a first execution screen of a first application which is executing in a foreground of the electronic device while executing a second application in a background of the electronic device, when the first housing and the second housing are in a partially folded state;
identifying a user input to execute the second application in the foreground;
wherein the second application is configured to change an execution screen based on an angle between the first housing and the second housing, which is identified using at least one sensor of the electronic device, falling within a predetermined range of the partially folded state; and
based on identifying the user input, displaying a second execution screen of the second application associated with the predetermined range instead of the first execution screen on the flexible display,
wherein the second execution screen is configured to display a preview screen captured by a camera on a first portion of the flexible display corresponding to the first housing and to display, below the preview screen, a plurality of first UI elements and a plurality of second UI elements on a second portion of the flexible display corresponding to the second housing.

12. The method of claim 11, wherein the second application includes a camera application.

13. The method of claim 11, wherein the second execution screen corresponds to a half-folded mode of the electronic device.

14. The method of claim 11,
wherein a list of at least one designated application is stored in a memory of the electronic device, and
wherein the at least one designated application is configured to provide an execution screen associated with the predetermined range.

15. The method of claim 11, wherein the first UI elements and the second UI elements are classified as elements for providing specific functions while the preview screen is classified as an element for providing a visual view.

16. The method of claim 15, wherein the elements for providing the specific functions comprises a button, preferably a toggle button or a radio button, or an object including one or more of a tool bar, a dial, a slider, an input field, a drop-down menu, and a progress bar.

17. The method of claim 11, wherein the flexible display comprises a first area corresponding to the first housing and a second area corresponding to the second housing.

18. The method of claim 17,
wherein the preview screen of the second execution screen is displayed on the first area, and
wherein the first UI elements and the second UI elements of the second execution screen are displayed in the second area.

* * * * *